United States Patent
Baras et al.

(10) Patent No.: US 10,469,486 B2
(45) Date of Patent: Nov. 5, 2019

(54) METHOD AND APPARATUS FOR AUTHENTICATING DEVICE AND FOR SENDING/RECEIVING ENCRYPTED INFORMATION

(71) Applicant: UNIVERSITY OF MARYLAND, COLLEGE PARK, College Park, MD (US)

(72) Inventors: John S. Baras, Potomac, MD (US); Vladimir Iankov Ivanov, Hyattsville, MD (US)

(73) Assignee: UNIVERSITY OF MARYLAND, College Park, MD (US)

( * ) Notice: Subject to any disclaimer, the term of this patent is extended or adjusted under 35 U.S.C. 154(b) by 230 days.

(21) Appl. No.: 15/482,759

(22) Filed: Apr. 8, 2017

(65) Prior Publication Data
US 2017/0295014 A1    Oct. 12, 2017

Related U.S. Application Data

(60) Provisional application No. 62/320,277, filed on Apr. 8, 2016.

(51) Int. Cl.
   *H04L 29/06* (2006.01)
   *G06K 9/00* (2006.01)
   (Continued)

(52) U.S. Cl.
   CPC ...... *H04L 63/0861* (2013.01); *G06K 9/00006* (2013.01); *G06K 9/527* (2013.01);
   (Continued)

(58) Field of Classification Search
   CPC . H04L 63/0861; H04L 9/0866; H04L 9/3231; H04L 63/0435; G06K 9/00006;
   (Continued)

(56) References Cited

U.S. PATENT DOCUMENTS

5,499,294 A    3/1996 Friedman
5,787,186 A    7/1998 Schroeder
(Continued)

OTHER PUBLICATIONS

Author Unknown, "Personal Identity Verification (PIV) Image Quality Specifications for Single Finger Capture Devices," FBI ens, Jul. 2006, pp. 1-8.
(Continued)

*Primary Examiner* — Matthew Smithers
*Assistant Examiner* — Zoha Piyadehghibi Tafaghodi
(74) *Attorney, Agent, or Firm* — Muir Patent Law, PLLC

(57) ABSTRACT

Methods and apparatuses for authenticating communication devices and securely transmitting and/or receiving encrypted voice and data information. A biometric scanner, for example a fingerprint scanner, is utilized for authenticating the communication device and for generating the encryption key. The fingerprint scanner can be an area or swipe type of scanner is registered to a particular user and has unique intrinsic characteristics (the scanner pattern) that are permanent over time and can identify the scanner even among scanners of the same manufacturer and model. The unique scanner pattern of the scanner generates a unique encryption key that cannot be reproduced using another fingerprint scanner.

24 Claims, 14 Drawing Sheets

(51) Int. Cl.
 *G06K 9/52* (2006.01)
 *G06K 9/62* (2006.01)
 *H04L 9/08* (2006.01)
 *H04L 9/32* (2006.01)

(52) U.S. Cl.
 CPC .......... *G06K 9/6277* (2013.01); *H04L 9/0866* (2013.01); *H04L 9/3231* (2013.01); *H04L 63/0435* (2013.01); *G06K 2009/00583* (2013.01)

(58) Field of Classification Search
 CPC ................ G06K 9/527; G06K 9/6277; G06K 2009/00583
 USPC ...................................................... 713/168
 See application file for complete search history.

(56) References Cited

U.S. PATENT DOCUMENTS

| | | | |
|---|---|---|---|
| 5,841,886 | A | 11/1998 | Rhoads |
| 5,845,008 | A | 12/1998 | Katoh et al. |
| 5,862,218 | A | 1/1999 | Steinberg |
| 6,023,522 | A | 2/2000 | Draganoff et al. |
| 6,868,173 | B1 | 3/2005 | Sakai et al. |
| 6,898,299 | B1 | 5/2005 | Brooks |
| 6,995,346 | B2 | 2/2006 | Johanneson et al. |
| 7,129,973 | B2 | 10/2006 | Raynor |
| 7,161,465 | B2 | 1/2007 | Wood et al. |
| 7,181,042 | B2 | 2/2007 | Tian |
| 7,317,814 | B2 | 1/2008 | Kostrzewski et al. |
| 7,360,093 | B2 | 4/2008 | deQueiroz |
| 7,616,237 | B2 | 11/2009 | Fridrich et al. |
| 7,724,920 | B2 | 5/2010 | Rhoads |
| 8,577,091 | B2 | 11/2013 | Ivanov et al. |
| 8,942,430 | B2 | 1/2015 | Ivanov et al. |
| 8,942,438 | B2 | 1/2015 | Ivanov et al. |
| 8,953,848 | B2 | 2/2015 | Ivanov et al. |
| 9,087,228 | B2 | 7/2015 | Ivanov et al. |
| 9,141,845 | B2 | 9/2015 | Ivanov et al. |
| 9,208,370 | B2 | 12/2015 | Ivanov et al. |
| 2002/0191091 | A1 | 12/2002 | Raynor |
| 2004/0113052 | A1 | 6/2004 | Johanneson et al. |
| 2006/0036864 | A1 | 2/2006 | Parulski et al. |
| 2006/0050996 | A1 | 3/2006 | King et al. |
| 2006/0269097 | A1 | 11/2006 | Mihcak et al. |
| 2008/0044096 | A1 | 2/2008 | Cowburn |
| 2008/0291996 | A1 | 11/2008 | Pateux et al. |
| 2011/0013814 | A1 | 1/2011 | Ivanov et al. |
| 2012/0300988 | A1* | 11/2012 | Ivanov ............... G06K 9/00006 382/115 |
| 2013/0263238 | A1* | 10/2013 | Bidare ............... G07C 9/00087 726/7 |
| 2017/0085562 | A1* | 3/2017 | Schultz ............... H04L 63/0861 |

OTHER PUBLICATIONS

Bartlow et al., "Identifying Sensors from Fingerprint Images", 2009 IEEE Computer Society Conference on Computer Vision and Pattern Recognition Workshops, Jun. 20-25, 2009, pp. 78-84.
Bartlow, "Establishing the Digital Chain of Evidence in Biometric Systems", Ph.D. thesis, 2009, West Virginia University, Morgantown W.Va, 195 pages.
Bayram et al. "Source Camera Identification Based on CFA Interpolation", Dept. of Electrical Computer Engineering, IEEE International Conference on Image Processing 2005 (ICIP 2005), vol. 3, pp. III-69-72, Sep. 2005.
Bayram et al., "Improvements on Source Camera-Model Identification Based on CFA Interpolation", Proceedings of Working Group 11.9 Int. Conf. Digital Forensics, FL, 2006, 9 pages.
Blaise Gassend, et al., "Identification and Authentication of Integrated Circuits", Concurrency and Computation: Practice and Experience, vol. 16, Issue 11, pp. 1077-1098, Sep. 2004.
Blythe et al., "Secure Digital Camera", Department of Electrical and Computer Engineering, Digital Forensic Research Workshop, Baltimore, MD, Aug. 2004, 12 pages.
Bozhao et al., "Liveness Detection for Fingerprint Scanners Based on the Statistics of Wavelet Signal Processing", Proceedings of the 2006 Conference on Computer Vision and Pattern Recognition Workshop, (CVPRW'06), Jun. 17-22, 2006, New York, NY, 8 pages.
Cappelli et al., "On the Operational Quality of Fingerprint Scanners", IEEE Transactions on Information Forensics and Security, vol. 3, No. 2, pp. 192-202, Jun. 2008.
Celiktutan et al., "Blind Identification of Source Cell-Phone Model", IEEE Transactions on Information Forensics and Security, Sep. 2008, vol. 3, No. 3, pp. 553-566.
Chen et al. "Determining Image Origin and Integrity Using Sensor Noise", IEEE Transactions on Information Forensics and Security, vol. 3, Issue 1, pp. 74-90, Mar. 2008.
Chen et al., "Digital Imaging Sensor Identification (Further Study)," Proceedings of the SPIE, vol. 6505, Electronic Imaging, Security, Steganography, and Watermarking of Multimedia Contents IX, Jan. 2007, 13 pages.
Chen et al., "Source Digital Camcorder Identification Using Sensor Photo Response Non-Uniformity", Proceedings of SPIE Electronic Imaging, Photonics West, Jan. 2007, pp. 1G-1H.
Chuang et al., "Tampering Identification U sing Empirical Frequency Response", Department of Electrical and Computer Engineering, University of Maryland, IEEE International Conference on Acoustics, Speech and Signal Processing, 2009. ICASSP 2009,Apr. 19-24, 2009, pp. 1517-1520.
Dirik et al., "Source Camera Identification Based on Sensor Dust Characteristics", Polytechnic University, Department of Electrical and Computer Engineering, Proc. Signal Processing Applications Public Security Forensics, Apr. 2007, pp. 1-6.
Farid et al., "Higher-Order Wavelet Statistics and their Application to Digital Forensics", IEEE Workshop on Statistical Analysis in Computer Vision and Pattern Recognition, Madison, WI, Jun. 2003, pp. 1-8.
Filler et al. "Using Sensor Pattern Noise for Camera Model Identification", Proceedings of International Conference on Image Processing 2008, San Diego, CA, Oct. 2008, 4 pages.
Fridrich, "Digital Image Forensics, Introducing Methods that Estimate and Detect Sensor Fingerprint", IEEE Signal Processing Magazine, vol. 26, No. 2, Mar. 2009, pp. 26-37.
Fry et al., "Fixed-pattern Noise in Photomatrices", IEEE Journal of Solid-State Circuits, vol. 5, No. 5, pp. 250-254, Oct. 1970.
Gamal et al., "Modeling and Estimation of F PN Components in CMOS Image Sensors", Proceedings of SPIE, vol. 3301, pp. 168-177, 1 998.
Geradts et al., "Methods for Identification of Images Acquired with Digital Cameras", Enabling Technologies for Law Enforcement and Security, Feb. 2001, Proc. SPIE vol. 4232, pp. 505-512.
Goljan et al., "Camera Identification from Cropped and Scaled Images", Proceedings of SPIE, vol. 6819, 68190E (2008), Electronic Imaging Forensics, Security, Steganography and Watermarking of Multimedia Contents X, San Jose, CA, Kan. 2008, 13 pages.
Goljan et al., "Large Scale Test of Sensor Fingerprint Camera Identification", Proc. SPIE, Electronic Imaging, Media Forensics and Security XI, San Jose, CA, Jan. 18-22., 2009, 12 pages.
Goljan et al., "Managing a Large Database of Camera Fingerprints", Proc. SPIE, Electronic Imaging, Media Forensics and Security XII, San Jose, CA, Jan. 17-21, 2010, pp. 08-01-08-12.
Gou et al., "Intrinsic Sensor Noise Features for Forensic Analysis on Scanners and Scanned Images", IEEE Transactions on Information Forensics and Security, Sep. 2009, vol. 4, Issue 3, pp. 476-491.
Gou et al., "Robust Scanner Identification Based on Noise Features", IS&T SPIE Conference on Security, Steganography and Watermarking of Multimedia Contents IX; San Jose, CA, Jan. 2007.
Gou et al., "Noise Features for Image Tampering Detection and Steganalysis", Proceedings of IEEE International Conference on Image Processing 2007 (ICIP '07), San Antonio, TX, Sep. 2007, 4 pages.
Holotyak et al., "Blind Statistical Steganalysis of Additive Steganography Using Wavelet Higher Order Statistics", Proc. of the 9th

(56) References Cited

OTHER PUBLICATIONS

IFIP TC-6 TC-11 Conference on Communications and Multimedia Security, Sep. 19-21, 2005, Salzburg, Austria, 12 pages.
Jain et al., "An introduction to biometric recognition," Circuits and Systems for Video Technology, IEEE Transactions on 14.1 (2004): 4-20.
Khanna et al., "Forensic Classification of Imaging Sensor Types", SPIE Int. Conf. SPIE Security, Steganography and Watermarking of Multimedia Contents IX, San Jose, CA, vol. 6505, Jan. 2007, 9 pages.
Khanna et al., "Scanner Identification Using Sensor Pattern Noise", Proceedings of SPIE Security, Steganography and Watermarking of Multimedia Contents IX, San Jose, CA, Jan. 2007.
Khanna et al., "A Survey of Forensic Characterization Methods for Physical Devices", Proceedings of the 6th Annual Digital Forensic Research Workshop (DFRWS'06), vol. 3, pp. S17-S28, Sep. 2006.
Kharrazi et al., "Blind Source Camera Identification", International Conference on Image Processing (ICIP) 2004, vol. 1, pp. 709-712, Oct. 2004.
Kivanc et al., "Spatially Adaptive Statistical Modeling of Wavelet Image Coefficients and its Application to Denoising", Proc. IEEE Int. Conf. Acoustics, Speech, and Signal Processing, Phoenix, Arizona, vol. 6, pp. 3253-3256, Mar. 1999.
Kivanc et al., "Low-Complexity Image Denoising Based on Statistical Modeling of Wavelet Coefficients", IEEE Signal Processing Letters, Dec. 1999, vol. 6, No. 12, pp. 300-303.
Kurosawa et al., "CCD Fingerprint Method—Identification of a Video Camera from Videotaped Images", Proceedings of IEEE International Conference on Image Processing, Oct. 1999, vol. 3, pp. 537-540.
Lim, "Two-dimensional Image and Signal Processing", Prentice Hall PTR, 1989, Sections 9.21 Weiner filtering, Section 9.2.2 Variations of Wiener filtering, Section 9.2.4 The adaptive Wiener filter and Section 9.2.7 Edge-sensitive adaptive image restoration textbook on two-dimensional image and signal processing, 18 pages.
Lukas et al, "Digital Camera Identification from Sensor Pattern Noise", IEEE Transactions on Information Forensics and Security, vol. 1, Issue 2, pp. 205-214, Jun. 2006.
Lukas et al., "Detecting Digital Image Forgeries Using Sensor Pattern Noise", Proc. of SPIE Electronic Imaging, Photonics West, Jan. 2006, 11 pages.
Lukas et al., "Digital Bullet Scratches for Images", Proc. ICIP 2005, Sep. 11-14, 2005, Genova, Italy, 4 pages.
Lyu at al., "Detecting Hidden Messages Using Higher-Order Statistics and Support Vector Machines", Lecture Notes in Computer Science, Springer, ISSN 0302-9743 (Print), 1611-3349 (Online) vol. 2578/2003, pp. 340-354, Jan. 1, 2003.
Lyu et al., "Steganalysis Using Higher-Order Image Statistics", IEEE Transactions on Information Forensics and Security, vol. 1, No. 1, pp. 111-119, Jan. 2006.
Maeda, et al., "An Artificial Fingerprint Device (AFD): A Study of Identification Number Applications Utilizing Characteristics Variation of Polycrystalline Silicon TFTs" IEEE Transactions on Electron Devices, vol. 50, No. 6, pp. 1451-1458, Jun. 2003.
Sencar et al., "Overview of State-of-the-Art in Digital Image Forensics", Book chapter, 2007, Available online at: http://isis.poly.edu/ forensics/pubs/sencar_memon_chapter.pdf, pp. 1-20.
Swaminathan et al., "Component Forensics: Theory, Methodologies and Applications", IEEE Signal Processing Magazine, Mar. 2009, pp. 38-48.
Swaminathan et al., "Nonintrusive Component Forensic of Visual Sensors Using Output Images", IEEE Transactions on Information Forensics and Security, vol. 2, No. 1, pp. 91-106, Mar. 2007.
Swaminathan et al. "Image Tampering Identification Using Blind Deconvolution", IEEE International Conference on Image Processing (ICIP'06), Atlanta, Georgia, pp. 2309-2312, Oct. 2006.
Swaminathan et al., "Digital Image Forensics via Intrinsic Fingerprints", IEEE Transactions on Information Forensics and Security, vol. 3, No. 1, Mar. 2008, pp. 101-117.
Tsai et al. "Camera/Mobile Phone Source Identification for Digital Forensics", Proceedings of IEEE International Conference on Acoustics, Speech, and Signal Processing 2007, pp. 11-221-11-224.

* cited by examiner

| SCENARIO | APPLIED OBJECT FOR SCANNER ENROLMENT | APPLIED OBJECT FOR SCANNER VERIFICATION | PROVIDED SECURITY |
|---|---|---|---|
| A | PREDETERMINED | PREDETERMINED | WEAK |
| B | PREDETERMINED | FINGERTIP | MEDIUM |
| C | FINGERTIP | FINGERTIP | STRONG |

METHOD AND APPARATUS FOR AUTHENTICATING DEVICE AND FOR SENDING/RECEIVING ENCRYPTED INFORMATION

DOMESTIC BENEFIT CLAIM

This application claims the benefit of the U.S. Provisional Application 62/320,277 filed on Apr. 8, 2016 which is incorporated herein by reference in its entirety.

GOVERNMENT SUPPORT

The subject matter disclosed herein was made with partial government funding and support under MURI W911-NF-0710287 awarded by the United States Army Research Office (ARO). The government has certain rights in this invention.

FIELD OF TECHNOLOGY

The exemplary implementations described herein relate to systems and methods for secure wireless or wired transmission of information and, more particularly, to methods and systems for transmitting and/or receiving encrypted voice and data information using biometric scanners, especially fingerprint scanners, for generating encryption keys.

BACKGROUND

As the use of hand held mobile devices have increasingly been used for sending or receiving sensitive voice and data information through wireless and/or wired communication links, it has become imperative to provide such mobile devices with effective but compact security or encryption schemes to safeguard and secure the data communicated. Biometric information has been used to secure the operation of the mobile devices themselves, but such systems do not prevent the interception of sensitive information transmitted between handheld mobile devices.

The information about human physiological and behavioral traits, collectively called biometric information or simply biometrics, can be used to identify a particular individual with a high degree of certainty and therefore can authenticate this individual's use of the device by measuring, analyzing, and using these traits. Well-known types of biometrics include face photographs, fingerprints, iris and retina scans, palm prints, and blood vessel scans. A great variety of specific devices, hereinafter referred to as biometric scanners, are used to capture and collect biometric information, and transform the biometric information into signals for further use and processing.

Despite all advantages (e.g., convenience) of using biometrics over using other methods for authentication of people, the biometric information can have significant weaknesses. For example, the biometric information has a low level of secrecy because it can be captured surreptitiously by an unintended recipient and without the consent of the person whom it belongs to. Furthermore, if once compromised, the biometric information is not easily changeable or replaceable, and it cannot be revoked. Another problem is that the biometric information is inexact, may change over time, and is "noisy" (e.g., it is not like a password or a PIN code) as it cannot be reproduced exactly from one measurement to another, and therefore it can be matched only approximately, which gives rise to authentication errors. All these weaknesses and problems imperil the confidence in the reliable use of biometrics in everyday life.

One of the most widely used biometrics is the fingerprint. It has been used for identifying individuals for over a century. The surface of the skin of a human fingertip consists of a series of ridges and valleys that form a unique fingerprint pattern. The fingerprint patterns are highly distinct, they develop early in life, and their details are relatively permanent over time. In the last several decades, the extensive research in algorithms for identification based on fingerprint patterns has led to the development of automated biometric systems using fingerprints for various applications, including law enforcement, border control, enterprise access, and access to computers and to other portable devices. Although fingerprint patterns change little over time, changes in the environment (e.g., humidity and temperature changes), cuts and bruises, dryness and moisture of the skin, and changes due to aging pose certain challenges for the identification of individuals by using fingerprint patterns in conjunction with scanners. However, similar problems also exist when identifying individuals by using other biometric information.

Using biometric information for identifying individuals typically involves two steps: biometric enrollment and biometric verification. For example, in case of fingerprints, a typical biometric enrollment requires acquiring one or more (typically three) fingerprint images with a fingerprint scanner, extracting from the fingerprint image information that is sufficient to identify the user, and storing the extracted information as template biometric information for future comparison with subsequently acquired fingerprint images. A typical biometric verification involves acquiring another, subsequent image of the fingertip and extracting from that image query biometric information which is then compared with the template biometric information. If the two pieces of information are sufficiently similar, the result is deemed to be a biometric match. In this case, the user's identity is verified positively and the user is authenticated successfully. If the compared information is not sufficiently similar, the result is deemed a biometric non-match, the verification of the user's identity is negative, and the biometric authentication fails.

One proposed way for improving or enhancing the security of the systems that use biometric information is by using digital watermarking—embedding information into digital signals that can be used, for example, to identify the signal owner or to detect tampering with the signal. The digital watermark can be embedded in the signal domain, in a transform domain, or added as a separate signal. If the embedded information is unique for every particular originator (e.g., in case of image, the originator is the camera or the scanner used to acquire the image), the digital watermark can be used to establish the authenticity of the digital signal by using methods taught in the prior art. However, robust digital watermarking, i.e., one that cannot be easily detected, removed, or copied, requires computational power that is typically not available in biometric scanners and, generally, comes at high additional cost. In order to ensure the uniqueness of the originator (e.g., the camera or the scanner), the originator also needs an intrinsic source of randomness.

To solve the problem of associating a unique number with a particular system or a device, it has been proposed to store this number in a flash memory or in a mask Read Only Memory (ROM). The major disadvantages of this proposal are the relatively high added cost, the man-made randomness of the number, which number is usually generated during device manufacturing, and the ability to record and track this number by third parties. Prior art also teaches methods that introduce randomness by exploiting the variability and randomness created by mismatch and other physical phenomena in electronic devices or by using physically unclonable functions (PUF) that contain physical components with sources of randomness. Such randomness can be explicitly introduced (as a design by the system designer) or intrinsically present (e.g., signal propagation delays within batches of integrated circuits are naturally different). However, all of these proposed methods and systems come at additional design, manufacturing, and/or material cost.

The prior art teaches methods for identification of digital cameras based on the two types of sensor pattern noise: fixed pattern noise and photo-response non-uniformity. However, these methods are not suited to be used for biometric authentication using fingerprints because said methods require many (in the order of tens to one hundred) images. These prior art methods also use computationally intensive signal processing with many underlying assumptions about the statistical properties of the sensor pattern noise. Attempts to apply these methods for authentication of optical fingerprint scanners have been made in laboratory studies without any real success and they are insufficiently precise when applied to capacitive fingerprint scanners, because the methods implicitly assume acquisition models that are specific for the digital cameras but which models are very different from the acquisition process of capacitive fingerprint scanners. The attempts to apply these methods to capacitive fingerprint scanners only demonstrated their unsuitability, in particular for systems with limited computational power. In addition, these methods are not suited for a big class of fingerprint scanners known as swipe (also slide or sweep) fingerprint scanners, in which a row (or a column) of sensing elements sequentially, row by row (or column by column), scan the fingertip skin, from which scans a fingerprint image is then constructed. The acquisition process in digital cameras is inherently different as cameras typically acquire the light coming from the object at once, e.g., as a "snapshot," so that each sensing element produces the value of one pixel in the image, not a whole row (or column) of pixels as the swipe scanners do. The prior art also teaches methods for distinguishing among different types and models of digital cameras based on their processing artifacts (e.g., their color filter array interpolation algorithms), which is suited for camera classification (i.e., determining the brand or model of a given camera), but not for camera identification (i.e., determining which particular camera has acquired a given image).

Aside from the high cost associated with the above described security proposals, another disadvantage is that they cannot be used in biometric scanners that have already been manufactured and placed into service. In addition to these problems there also exists the possibility that data or voice information transmitted or received by the devices can be intercepted during its transmission over wireless and/or wired communication links.

SUMMARY

In order to overcome the security problems associated with biometric scanners and systems in the prior art, the present inventors discovered methods and apparatuses which enhance or improve the security of existing or newly manufactured biometric scanners and systems by authenticating the biometric scanner itself in addition to authenticating the submitted biometric information. These discovered methods and apparatuses are described in, for example, U.S. Pat. Nos. 9,141,845 and 9,208,370 issued to Ivanov et al. which are incorporated herein in their entireties by reference and which, respectively, disclose the use of area and swipe fingerprint scanners. Moreover, to solve the problem of data and/or voice information being intercepted during transmission over wireless and/or wired communication links an encryption scheme is proposed that utilizes the aforementioned biometric scanners, described in the above referenced patents, to also generate an encryption key to secure the transmitted information.

The biometric scanner converts the biometric information into signals, e.g. as sequence of numbers, that can be used by a system, e.g., a computer, a smart phone, or a door lock, to automatically verify the identity of a person. For example, a fingerprint scanner, a type of biometric scanner, converts the surface or subsurface of the skin of a fingertip into one or several images. In practice, this conversion process can never be made perfect. The imperfections induced by the conversion process can be classified into two general categories: imperfections that are largely time invariant, hereinafter referred to as scanner pattern, and imperfections that change over time, hereinafter referred to as scanner noise. As will be described herein, the scanner pattern is unique to a particular scanner and, therefore, it can be used to verify the identity of the scanner; this process hereinafter is referred to as scanner authentication. In the exemplary embodiments briefly described below and more completely described in the above referenced patents, the uniqueness of the scanner pattern in the system device is used to authenticate the fingerprint scanner in the device and is now further proposed to generate a unique encryption key to securely transmit and/or receive information when using the system devices.

By requiring authentication of both the biometric information and the biometric scanner, the submission of counterfeit images—obtained by using a different biometric scanner or copied by other means and then replayed—can be detected, thereby preventing authentication of the submitted counterfeit biometric images. In this way, attacks on the biometric scanner or on the system that uses the biometric information can be prevented, improving the overall security of the biometric authentication. In addition by using the unique scanner pattern of the particular system device as an encryption key, information communications can be transmitted or received securely without interception by third parties. The unique scanner pattern is estimated solely from one or more images that are acquired by the scanner. As will be recognized by those skilled in the art, the greater the complexity or the resolution of the estimated scanner pattern the greater the security provided by the scanner pattern when also used to generate an encryption key.

The scanner authentication and security system comprises: (1) a scanner enrollment, e.g., estimating from one or more digital images and then storing the scanner pattern of a legitimate, authentic scanner; (2) a scanner verification, e.g., extracting the scanner pattern from a digital image and comparing it with the stored scanner pattern to verify if the digital image has been acquired with the authentic fingerprint scanner or not; and (3) using a sequence of numbers that represents the scanner pattern to generate an encryption key. As will be appreciated by those skilled in the art, the unique scanner pattern authentication will provide an increased level of security of the biometric authentication that the person using the device is authorized to do so and the encryption key generated from the unique scanner pattern will secure information transmitted to or from the authenticated device from being intercepted by unauthorized parties.

For example, the scanner authentication can detect attacks on the fingerprint scanner, such as detecting an image containing the fingerprint pattern of the legitimate user and acquired with the authentic fingerprint scanner that has been replaced by another image that still contains the fingerprint pattern of the legitimate user but has been acquired with another, unauthentic fingerprint scanner. This type of attack has become an important security threat as the widespread use of biometric technologies makes the biometric information essentially publicly available. In addition to authenticating the use of the device, information transmitted from or received to the device can be protected by utilizing the unique scanner pattern to generate an encryption key for use in virtually any type of encryption scheme including, but not limited to, symmetric-key, public-key, and group-key encryption schemes.

More particularly, the herein described illustrative non-limiting implementations of scanner authentication and information transmission security can be used in any system that authenticates users based on biometric information, especially in systems that operate in uncontrolled (i.e., without human supervision) environments, in particular in portable devices, such as PDAs, cellular phones, smart phones, multimedia phones, wireless handheld devices, and generally any mobile devices, including laptops, notebooks, netbooks, etc., because these devices can be easily stolen, giving to an attacker physical access to them or the ability to intercept information transmitted from them and thus the opportunity to interfere with the secure information flow between the biometric scanner and the system. The general but not limited areas of application of the exemplary illustrative non-limiting implementations described herein are in bank applications, mobile commerce, for access to health care anywhere and at any time, for access to medical records, etc.

In one exemplary implementation of the herein described subject matter, a machine-implemented method for estimating the scanner pattern of a biometric scanner comprises processing at least one digital image, produced by the biometric scanner. The scanner pattern is estimated from this at least one digital image by using a wavelet decomposition and reconstruction, masking as useful at most all pixels by comparing their magnitude with a predetermined threshold, and storing these useful pixels for future use. The estimated scanner pattern can be used to authenticate the scanner use and to generate an encryption key for transmitted and received information.

In another exemplary implementation of the herein described subject matter, a machine-implemented method for authenticating biometric scanners comprises processing at least one digital image, produced by the biometric scanner. The biometric scanner is first enrolled by estimating the scanner pattern from this at least one digital image by using wavelet decomposition and reconstruction, masking as useful at most all pixels by comparing their magnitude with a predetermined threshold, and then storing these useful pixels as a template scanner pattern for future comparison. The biometric scanner is verified by subsequently processing at least one digital image and processing them to estimate a query scanner pattern by using a wavelet decomposition and reconstruction and masking as useful at most all pixels by comparing their magnitude with a predetermined value, and storing these useful pixels as a query scanner pattern. The template scanner pattern and the query scanner pattern are then matched and a decision is made as to whether the images have been acquired with the same biometric scanner or with different biometric scanners. The scanner pattern is used to authenticate the scanner's use and for encrypting communications.

In another exemplary implementation of the herein described subject matter, a machine-implemented method for estimating the scanner pattern of a biometric scanner comprises processing at least one digital image, produced by the biometric scanner. The scanner pattern is then estimated from this at least one digital image by averaging pixels of the image to compute a line (vector) of pixels, filtering this line (vector) of pixels, and storing this line (vector) of pixels for future use. The scanner pattern is used to authenticate the scanner's use and for encrypting communications.

In another exemplary implementation of the herein described subject matter, a machine-implemented method for authenticating biometric scanners comprises processing at least one digital image, produced by the biometric scanner. The biometric scanner is first enrolled by estimating the scanner pattern from this at least one digital image by averaging pixels of the image to compute a line (vector) of pixels, filtering this line (vector) of pixels, and storing this line (vector) of pixels as a template scanner pattern for future comparison. The biometric scanner is verified by subsequently processing at least one digital image to estimate a query scanner pattern by averaging pixels of the image to compute a line (vector) of pixels, filtering this line (vector) of pixels, and storing this line (vector) of pixels as a query scanner pattern. The template scanner pattern and the query scanner pattern are then matched and a decision is made as to whether the images have been acquired with the same biometric scanner or with different biometric scanners. The scanner pattern is used to authenticate the scanner's use and for encrypting communications.

The above described methods can be implemented by an electronic processing circuit configured to perform the enumerated processes or operations. Suitable electronic processing circuits for performing these methods include processors including at least one CPU and associated inputs and outputs, memory devices, and accessible programmed instructions for carrying out the methods, programmable gate arrays programmed to carry out the methods, and ASICs specially designed hardware devices for carrying out the methods.

In addition, the line vector of pixels represent a sequence of numbers that can be used as an encryption key or a de-encryption key, respectively, for transmission or reception by the device having the fingerprint sensor. In a symmetric-key encryption scheme, the sequence of numbers is used to generate a key for encrypting the information transmitted from the transmitting device and for de-encrypting the information received at the receiving device. The de-encrypting key can be transmitted to the receiving device from the transmitting device. In a public-key encryption scheme, a public key and a private key can be derived from the scanner pattern, i.e. the generated sequence of numbers. The public key can be used for encrypting transmitted information and the private key can be provided to the intended recipient device so that only that intended recipient can de-encrypt the transmitted information. Group-key encryption schemes (i.e. multicast, broadcast, etc.) generate a key similarly to symmetric-key encryption schemes, that can be used for both encryption and de-encryption.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Figure 1:
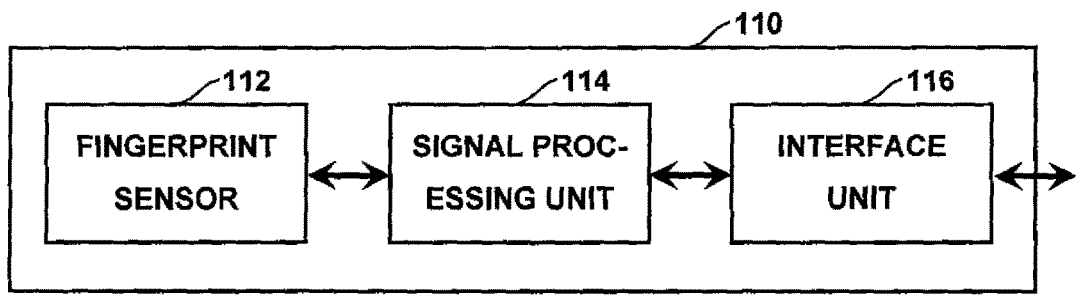
FIG. 1 is a block diagram of a fingerprint scanner used for system authentication and securing information transmission and reception.

A typical fingerprint scanner, shown as block 110 in FIG. 1 generally comprises a fingerprint sensor 112, which reads the fingerprint pattern, a signal processing unit 114, which processes the reading of the sensor and converts it into an image, and an interface unit 116, which transfers the image to system (not shown in the figure) that uses it. The system that uses the image includes, but is not limited to, a desktop or server computer, a door lock for access control, a portable or mobile device such as a laptop, PDA or cellular telephone, hardware token, or any other access control device.

Figure 2:
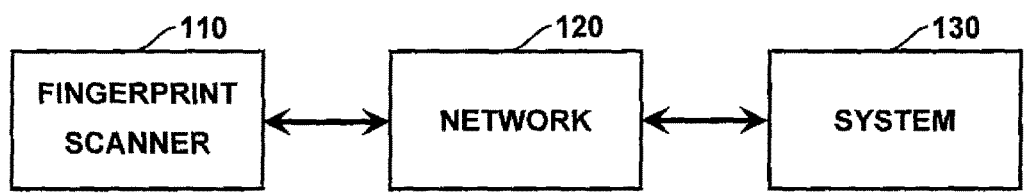
FIG. 2 is a block diagram of a fingerprint scanner connected over a network to a system that uses the image acquired with the fingerprint scanner.
Figure 3:
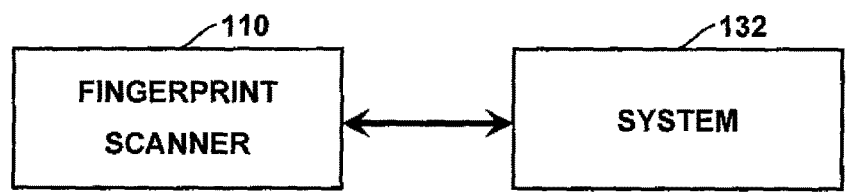
FIG. 3 is a block diagram of a fingerprint scanner connected directly to a system that uses the image acquired with the fingerprint scanner.
Figure 4:
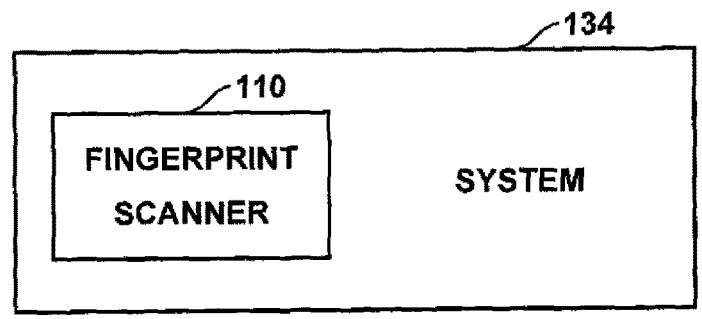
FIG. 4 is a block diagram of a fingerprint scanner that is part of a system that uses the image acquired with the fingerprint scanner.

As shown in FIG. 2, the fingerprint scanner 110 can be connected to the system 130 that uses the image via wireless or wired links and a network 120. The network 120 can be, for example, the Internet, a wireless "Wi-Fi" network, a cellular telephone network, a local area network, a wide area network, or any other network capable of communicating information between devices. As shown in FIG. 3, the fingerprint scanner 110 can be directly connected to the system 132 that uses the image. As shown in FIG. 4, the fingerprint scanner 110 can be an integral part of the system 134 that uses the image.

Nevertheless, in any of the cases shown in FIGS. 2-4, an attacker who has physical access to the system can interfere with the information flow between the fingerprint scanner and the system in order to influence the operation of the authentication algorithms that are running on the system, for example, by replacing the image that is acquired with the fingerprint scanner by another image that has been acquired with another fingerprint scanner or by an image that has been maliciously altered (e.g., tampered with).

The system 130 in FIG. 2, the system 132 in FIG. 3, and the system 134 in FIG. 4, may have Trusted Computing (TC) functionality; for example, the systems may be equipped with a Trusted Platform Module (TPM) that can provide complete control over the software that is running and that can be run in these systems. Thus, once the image, acquired with the fingerprint scanner, is transferred to the system software for further processing, the possibilities for an attacker to interfere and maliciously modify the operation of this processing become very limited. However, even in a system with such enhanced security, an attacker who has physical access to the system can still launch an attack by replacing the image acquired with a legitimate, authentic fingerprint scanner, with another digital image. For example, an attacker who has obtained an image of the fingerprint of the legitimate user can initiate an authentication session with the attacker's own fingerprint and then, at the interface between the fingerprint scanner and the system, the attacker can replace the image of attacker's fingerprint with the image of the fingerprint of the legitimate user. Most authentication algorithms today will not detect this attack but will report that the user authentication to the system is successful.

Figure 5:
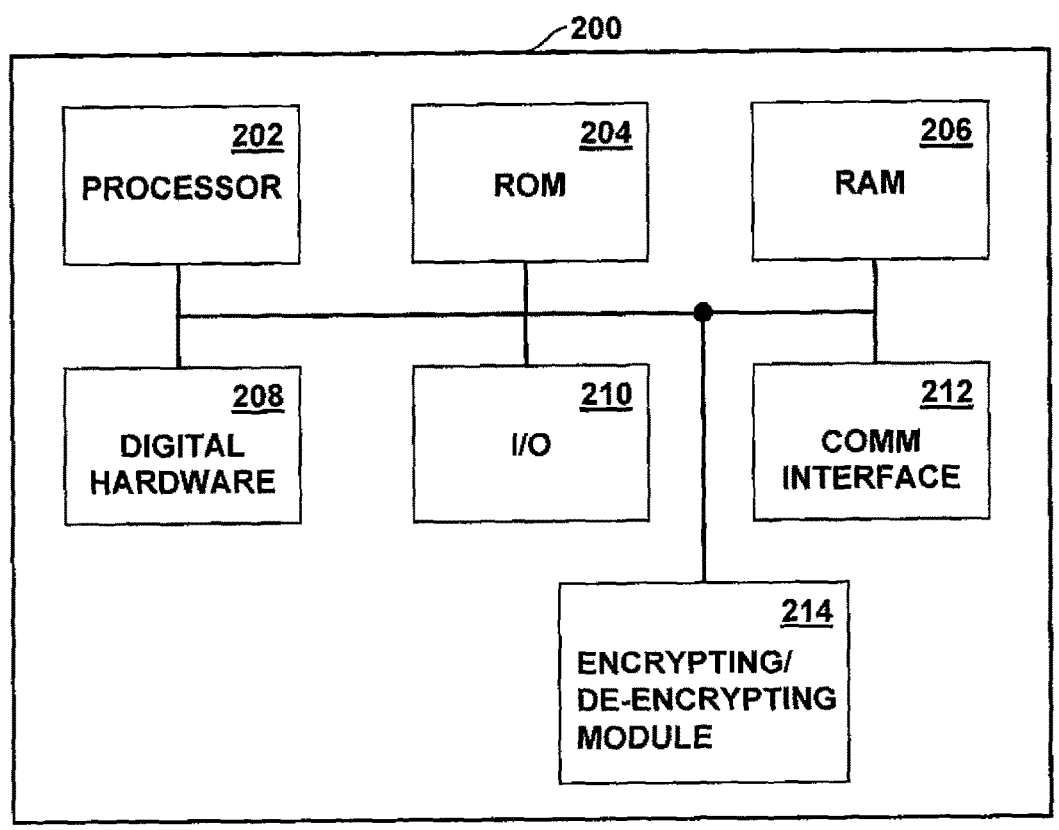
FIG. 5 is an exemplary block diagram of a system that uses biometric information for authenticating access to the system and for encrypting/de-encrypting information transmitted or received.

FIG. 5 illustrates a typical system 200 that uses biometric information to implement the methods and apparatuses disclosed herein and includes one or more processors 202, which comprise but are not limited to general-purpose microprocessors (including CISC and RISC architectures), signal processors, microcontrollers, or other types of processors executing instructions, with their associated inputs and outputs. The system 200 may also have a read-only memory (ROM) 204, which includes but is not limited to PROM, EPROM, EEPROM, flash memory, or any other type of memory used to store computer instructions and data. The system 200 may further have random-access memory (RAM) 206, which includes but is not limited to SRAM, DRAM, DDR, or any other memory used to store computer instructions and data. The system 200 can also have electronic processing circuit and digital hardware 208, which includes but is not limited to programmable field arrays with suitable programming by blown fuses, field-programmable gate arrays (FPGA), complex programmable logic devices (CPLD), programmable logic arrays (PLA), programmable array logic (PAL), application-specific integrated circuits (ASIC), designed and fabricated to perform specific functions, or any other type of hardware that can perform computations and process signals. The system may further include an encryption/de-encryption module 214 for encrypting transmitted information or de-encrypting received information. The system 200 may further have one or several input/output interfaces (I/O) 210, which include but are not limited to a keypad, a keyboard, a touchpad, a mouse, speakers, a microphone, one or several displays, USB interfaces, interfaces to one or more biometric scanners, digital cameras, or any other interfaces to peripheral devices. The system 200 may also have one or several communication interfaces 212 that connect the system to wired networks, including but not limited to Ethernet or fiber-optical links, and wireless networks, including but not limited to CDMA, GSM, WiFi, GPRS, WiMAX, IMT-2000, 3GPP, or LTE. The system 200 may also have storage devices (not shown), including but not limited to hard disk drives, optical drives (e.g., CD and DVD drives), or floppy disk drives. The system 200 may also have TC functionality; for example, it may be equipped with a TPM that can provide complete control over the software that is running and that can be run in it.

Today, many low-cost and small-size live-scan fingerprint scanners are available and used in various biometric systems. Depending on the sensing technology and the type of the sensor used for image acquisition, fingerprint scanners fall into one of the three general categories: optical, solid-state (e.g., capacitive, thermal, based on electric field, and piezo-electric), and ultrasound. Another classification of fingerprint scanners is based on the method of applying the fingertip to the scanner. In the first group, referred to as touch or area fingerprint scanners, the fingertip is applied to the sensor and then the corresponding digital image is acquired without relative movement of the fingertip over the sensor, taking a "snapshot" of the fingertip skin. This is simple but has several disadvantages: the sensor may become dirty, a latent fingerprint may remain on the surface that may impede the subsequent image acquisition, and there are also hygienic concerns. Furthermore, the size of the sensor area (which is large) is directly related to the cost of the scanner.

In the second group, referred to as swipe, sweep, or slide fingerprint scanners, after applying the fingertip to the scanner, the fingertip is moved over the sensor so that the fingertip skin is scanned sequentially, row by row (or column by column), and then the signal processing unit constructs an image of the fingerprint pattern from the scanned rows (or columns). Swiping overcomes the major disadvantages of the touching mode and can significantly reduce the cost as the sensor can have height of only several pixels. The swipe fingerprint scanners are particularly suited for portable devices because of their small size and low cost.

Fingerprint scanners essentially convert the biometric information, i.e., the surface or subsurface of the skin of a fingertip, into one or several images. In practice, this conversion process can never be made perfect. The imperfections induced by the conversion process can be classified into two general categories: (a) imperfections that are persistent and largely do not change over time, which are hereinafter referred to as scanner pattern, and (b) imperfections that change rapidly over time, which are hereinafter referred to as scanner noise.

Figure 6:
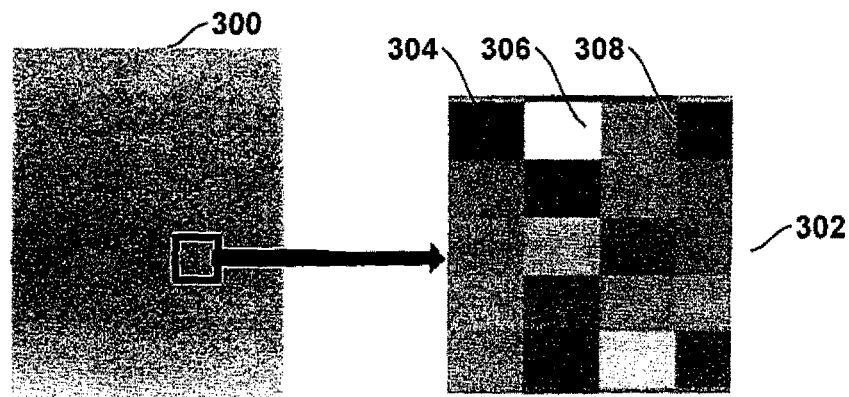
FIG. 6 shows an example of scanner imperfections.

The scanner pattern can be a function of many and diverse factors in the scanner hardware and software, e.g., the specific sensing method, the used semiconductor technology, the chip layout, the circuit design, and the post-processing. Furthermore, pinpointing the exact factors, much less quantifying them, can be difficult because such information typically is proprietary. Nevertheless, our general observation is that the scanner pattern stems from the intrinsic characteristics of the conversion hardware and software and is mainly caused by non-idealities and variability in the fingerprint sensor; however, the signal processing unit and even the interface unit (see FIG. 1) can also contribute to it. The intrinsic characteristics that cause the scanner pattern remain relatively unchanged over time. Variations in these intrinsic characteristics, however, may still exist and may be caused by environmental changes such as changes in the temperature, air pressure, and air humidity, and sensor surface moisture; material aging; scratches, liquid permeability, and ESD impact on the sensor surface, changes in the illumination (for optical scanners); etc. The scanner noise is generally caused by non-idealities in the conversion process that vary considerably within short periods of time. Typical examples for scanner noise are the thermal noise, which is inherently present in any electronic circuit, and the quantization noise, e.g., the signal distortion introduced in the conversion of an analog signal into a digital signal. An example for the combined effect of such imperfections (i.e., the scanner pattern and the scanner noise) is shown in FIG. 6. The image 300, shown on the left side of FIG. 6, is an image acquired with no object applied to the scanner platen. A small rectangular block of pixels from the image 300 is enlarged and shown on the right side of FIG. 6 as block 302. The three adjacent pixels 304, 306, and 308 of block 302 have different scales of the gray color: pixel 304 is darker than pixel 308 and pixel 306 is brighter than pixel 308.

Generally, the scanner pattern of a fingerprint scanner can be estimated from two types of images depending on the type of the object applied to the fingerprint scanner:

A predetermined, known a priori, object. Since the object is known, the differences (in the general sense, not limited only to subtraction) between the image acquired with the predetermined object and the theoretical image that would be acquired if the fingerprint scanner were ideal reveal the scanner pattern because the image does not contain a fingerprint pattern.

A fingertip of a person that, generally, is not known a priori. The acquired image in this case is a composition of the fingerprint pattern, the scanner pattern, and the scanner noise.

The scanner pattern is a sufficiently unique, persistent, and unalterable intrinsic characteristic of the fingerprint scanners even to those of exactly the same technology, manufacturer, and model. The methods and apparatuses disclosed herein are able to distinguish the pattern of one scanner from the pattern of another scanner of exactly the same model by estimating the pattern from a single image, acquired with each scanner. In this way, the scanner pattern can be used to enhance the security of a biometric system by authenticating the scanner, used to acquire a particular fingerprint image, and thus detect attacks on the scanner, such as detecting an image containing the fingerprint pattern of the legitimate user and acquired with the authentic fingerprint scanner replaced by another image that still contains the fingerprint pattern of the legitimate user but has been acquired with another, unauthentic fingerprint scanner. The scanner pattern can also be used by itself as a source of randomness, unique for each scanner (and also for the system if the scanner is an integral part of it), that identifies the scanner, in other security applications, both already present today and in the future.

The process of matching involves the comparison of a sample of an important feature from an object under test (also known as query) with a stored template of the same feature representing its normal representation (also known as enrolled feature). One or more images can be used to generate the sample under test, using different methods. Similarly, one or more images can be used to generate the normal representation using different methods. The performance of the match (as measured for example by scores) will depend on the number of images used for the sample, the number of images used to generate the normal representation, the signal processing and the methods used for matching. These should be selected carefully as the best combination will vary depending on the device and the signal processing methodology used. For example for the wavelet methods disclosed herein, it is better to average scores, while for the averaging methods, it is better to average the scanner pattern estimates. In the context and applications of the present invention, it is possible to have the following sets of images that are being matched:

1. One enrolled image and one query image. A similarity score is computed between the scanner pattern of the enrolled image and the query image, which score is then compared with a threshold.

2. Many enrolled images and one query image. In this case, the matching can be done in two ways:

The similarity scores for the scanner patterns of each pair {enrolled image, query image} are computed and then these scores are averaged to produce a final similarity score, which average is then compared with a threshold to make a decision;

The scanner patterns of the enrolled images are computed and these scanner patterns are averaged to compute an average scanner pattern, which is then used to compute a similarity score with the scanner pattern of the query image. The resulting score is compared with a threshold.

3. Many enrolled images and many query images. Four cases can be defined:

The similarity scores for the scanner patterns of each pair {enrolled image, query image} are computed and then these scores are averaged to produce a final score, which is compared with a threshold.

The scanner patterns of the enrolled images are computed and then they are averaged to compute an average scanner pattern, which is then used to compute a similarity score with the scanner pattern of each pair {average scanner of the enrolled images, the scanner pattern of a query image}. The resulting scores are then averaged, and this final score is compared with a threshold.

The scanner patterns of the query images are computed and then they are averaged to compute an average scanner pattern, which is then used to compute a similarity score with the scanner pattern of each pair {scanner pattern of an enrolled image, average scanner pattern of the query images}. The resulting scores are then averaged, and this final score is compared with a threshold.

The average scanner pattern of the enrolled images is computed and the average scanner pattern of the query images is computed. Then a similarity score between the two average patterns is computed, and this final score is compared with a threshold. The performance in this case, however, when masking is used, may be suboptimal because the number of common pixels in the two average patterns may be small.

D.1 Signal Models

The actual function describing the relationship among the scanner pattern, the scanner noise, and the fingerprint pattern (when present) can be very complex. This function depends on the particular fingerprint sensing technology and on the particular fingerprint scanner design and implementation, which are usually proprietary. Furthermore, even if the exact function is known or determined, using it for estimating the scanner pattern may prove difficult, mathematically intractable, or require computationally intensive and extensive signal processing. However, this function can be simplified into a composition of additive/subtractive terms, multiplicative/dividing terms, and combinations of them by taking into account only the major contributing factors and by using approximations. This simple, approximate model of the actual function is henceforth referred to as the "signal model."

In developing signal models for capacitive fingerprint scanners, we used readily available commercial devices sold by AuthenTec, Inc. (Melbourne, Fla., USA) and Verdicom, Inc. (now defunct). Both the area and the swipe capacitive fingerprint scanners of AuthenTec used herein have been developed by UPEK, Inc. (formerly from Emeryville, Calif., USA, now part of AuthenTec); after the merger of UPEK with AuthenTec in 2010, these capacitive fingerprint scanners were integrated into the product line of AuthenTec. The technology of the capacitive fingerprint scanners of Veridicom have been acquired and later scanners manufactured and sold by Fujitsu (Tokyo, Japan).

When the image, acquired with the fingerprint scanner, is not compressed or further enhanced by image processing algorithms to facilitate the biometric authentication, or is compressed or enhanced but the scanner pattern information contained in it is not substantially altered, the pixel values g(i, j) of the image (as saved in a computer file) at row index i and column index j can be expressed as one of the two models:

a) Signal Model A:

$$g(i, j) = \frac{s(i, j)}{1 + s(i, j)f(i, j)} + n(i, j, t) \quad (1)$$

b) Signal Model B:

$$g(i, j) = \frac{s(i, j)}{1 + f(i, j)} + n(i, j, t) \quad (2)$$

where f(i, j) is the fingerprint pattern, s(i, j) is the scanner pattern, and n(i, j, t) is the scanner noise, which also depends on the time t because the scanner noise is time varying (by definition). All operations in Equations (1) and (2), i.e., the addition, the multiplication, and the division, are element by element (i.e., pixel by pixel) because the Point Spread Function of these fingerprint scanners, viewed as a two-dimensional linear space-invariant system, can be well approximated with a Dirac delta function. Signal Model A is better suited for the capacitive fingerprint scanners of UPEK/AuthenTec, while Signal Model B is better suited for the capacitive fingerprint scanners of Veridicom/Fujitsu. The typical range of g(i, j) is from 0 to 255 grayscale levels (8 bits/pixel), although some scanner implementations may produce narrower range of values and thus make estimating the scanner pattern less accurate. Furthermore, some scanners may produce images with spatial resolution that is different from their native spatial resolution (i.e., the resolution determined by the distance between the sensing elements and used to acquire the image), for example, by interpolating between the pixel values of the image to produce pixel values corresponding to a different spatial resolution. These examples of signal processing may significantly alter the scanner pattern in the image and/or make its estimation particularly difficult.

D.1.1 Signal Characteristics

D.1.1.1 Scanner Noise

Henceforth the term scanner noise refers to the combined effect of time-varying factors that result in short-term variations, i.e., from within several seconds to much faster, in the pixel values of consecutively acquired images under the same acquisition conditions (e.g., when the fingertip applied to the scanner is not changed in position, the force with which the fingertip is pressed to the scanner platen is kept constant, and the skin moisture is unchanged) and the under exactly the same environmental conditions (e.g., without changes in the temperature, air humidity, or air pressure). Examples for factors contributing to the scanner noise are the thermal, shot, flicker, and so on noises that are is present in any electronic circuit, and the quantization noise, which is the distortion introduced by the conversion of an analog signal into a digital signal. Other contributing noise sources may also exist. A plausible assumption is that the combined effect of all such factors is similar to the combined effect of many noise sources, which is modeled as a (temporal additive) noise in, for example, communication systems. Therefore, of importance are the statistical characteristics only of this aggregation of all short-term temporal noise sources.

Viewed as a one-dimensional signal represented as a function of time t (i.e., as its temporal characteristics) at a given pixel, the scanner noise can be approximated as having a Gaussian probability distribution with zero mean $N(0, \sigma_n^2)$. This Gaussian model can also be used to approximate the scanner noise across the scanner platen (e.g., along columns or rows) at a given time t, i.e., the scanner noise spatial characteristics. The variance of the scanner noise may vary across the scanner platen of one scanner, may vary across different scanners even of the same model and manufacturer, and may vary with the environmental conditions (especially with the temperature). We estimated that the scanner noise variance $\sigma_n^2$, both in time and in space, on average can be approximately assumed about 1.77 for Scanner Model A and about 0.88 for Scanner Model B. Deviations from the Gaussian distribution of the amplitude probability distribution of the scanner noise, such as outliers, heavy tails, burstiness, and effects due to the coarse quantization, may also be present, requiring robust signal processing algorithms as disclosed herein.

D.1.2 Scanner Pattern

Because of the presence of scanner noise, which is time varying, it is only possible to estimate the scanner pattern. The scanner pattern, viewed as a two-dimensional random process, i.e., a random process dependent on two independent spatial variables, can be well approximated by a Gaussian random field, i.e., a two-dimensional random variable that has a Gaussian distribution $N(\mu, \sigma_s^2)$, where $\mu_s$ is the mean and $\sigma_s^2$ is the variance of the scanner pattern. This random field is not necessarily stationary in the mean, i.e., the mean $\mu_s$ may vary across one and the same image (e.g., as a gradient effect). The scanner pattern may also change roughly uniformly (e.g., with an approximately constant offset) for many pixels across the scanner platen among images acquired with the same fingerprint scanner under different environmental conditions, e.g., under different temperatures or different moistures (i.e., water). Because of the variable mean $\mu_s$ and this (nonconstant) offset, the absolute value of the scanner pattern may create problems for the signal processing. We incorporate these effects in the following model of the scanner pattern s(i, j) as a sum of two components:

$$s(i,j)=\mu_s(i,j)+s_v(i,j).$$

The first component, $\mu_s(i, j)$, is essentially the mean of the scanner pattern. It slowly varies in space (i.e., across the scanner platen) but may (considerably) change over time in the long term and also under different environmental conditions and other factors. As it is not reliably reproducible, it is difficult to be used as a persistent characteristic of each scanner, and therefore it needs to be removed from consideration; its effect can be mitigated and in certain cases completely eliminated. The second component, $s_v(i, j)$, rapidly varies in space but is relatively invariant in time (in both the short and the long term) and under different environmental conditions. This variable part $s_v(i, j)$ of the scanner pattern mean does not change significantly and is relatively stable under different conditions. It is sufficiently reproducible and can serve as a persistent characteristic of the scanner. Furthermore, it determines the variance $\sigma_s^2$, which, therefore, is relatively constant. This type of permanence of the scanner pattern is a key element of the exemplary implementations. In addition to the variable mean and offset, however, the scanner pattern s(i, j) may also exhibit other deviations from the theoretical Gaussian distribution, such as outliers and heavy tails. A specific peculiarity that can also be attributed as scanner pattern are malfunctioning (i.e., "dead") pixels that produce constant pixel values regardless of the object applied to the scanner platen at their location; the pixel values they produce, however, may also change erratically. All these effects required choosing robust signal processing as disclosed herein.

For area scanners, the scanner pattern s(i, j) depends on two parameters (i and j) which are the row index and column index, respectively. For swipe scanners, a line, being a row or a column, of sensor elements performs an instant scan of a tiny area of the fingertip skin and converts the readings into a line of pixels. In case when a row of sensor elements scans the fingertip, since the row is only one, the scanner pattern for all rows (i.e., along columns) is the same, i.e., s(i, j)=s(j) for all i. Similarly, when a column of sensor elements scans the fingertip, the scanner pattern for all columns (i.e., along rows) is the same, i.e., s(i, j)=s(i) for all j. Although the methodology for estimating the scanner pattern and its parameters as disclosed herein is specified for area scanners, its application to swipe scanners becomes straightforward by using these simplifications.

The mean $\mu_s$ and the variance $\sigma_s^2$ of the scanner pattern are critical parameters, and they can be determined in two ways:

One or both of the parameters are computed before the fingerprint scanner is placed into service, i.e., they are predetermined and fixed to typical values that are computed by analyzing a single image or a plurality of images of the same fingerprint scanner or a batch of scanners of the same type and model;

One or both of the parameters are computed dynamically during the normal operation of the fingerprint scanner by analyzing a single image or a plurality of images of the same fingerprint scanner. Since these computed values will be closer to the actual, true values of the parameters for a particular fingerprint scanner, the overall performance may be higher than in the first method. However, this increase in the performance may come at higher computational cost and weaker security.

Nevertheless, either way of computing either one of the parameters, i.e., $\mu_s$ or $\sigma_s^2$, leads to computing estimates of the actual, true values of these parameters because of two reasons: (i) the scanner pattern itself is a random field for which only a finite amount of data, i.e., image pixels, is available, and (ii) there is presence of scanner noise, which is a time-varying random process.

D.1.1.2.1 Scanner Pattern Mean and Variance

Estimates of the scanner pattern mean and scanner pattern variance can be computed from a single image or from a plurality of images acquired with a predetermined object applied to the scanner platen. The preferred predetermined object for Signal Model A and Signal Model B is air, i.e., no object is applied to the scanner platen, but other predetermined objects are also possible, e.g., water. When the object is predetermined, i.e., not a fingertip of a person, and is air, then $f(i, j)=0$. Furthermore, for either one of the signal models, the pixel value at row index i and column index j of an image acquired with a predetermined object applied to the scanner is:

$$g^{(po)}(i,j)=s(i,j)+n(i,j,t).$$

Averaging many pixel values $g^{(po)}(i, j)$ acquired sequentially with one and the same fingerprint scanner will provide the best estimate of the scanner pattern $s(i, j)$, because the average over time of the scanner noise $n(i, j, t)$ at each pixel will tend to 0 (subject to the law of large numbers), as with respect to time, the scanner noise is a zero-mean random process. Thus, if $g_k^{(po)}(i, j)$ is the pixel value of the k-th image acquired with a particular fingerprint scanner, then the estimate of the scanner pattern $\hat{s}(i, j)$ at row index i and column index j is:

$$\hat{s}(i, j) = \frac{1}{K}\sum_{k=1}^{K} g_k^{(po)}(i, j)$$

where K is the number of images used for averaging (K can be as small as ten). Then, an estimate $\bar{s}$ of the mean $\mu_s$ of the scanner pattern can be computed using the formula for the sample mean:

$$\bar{s} = \frac{1}{I \cdot J}\sum_{i=1}^{I}\sum_{j=1}^{J} \hat{s}(i, j)$$

where I is the total number of rows and J is the total number of columns in the image. The estimate $\hat{\sigma}_s^2$ of the scanner pattern variance $\sigma_s^2$ can then be computed using:

$$\hat{\sigma}_s^2 = \frac{1}{I \cdot J}\sum_{i=1}^{I}\sum_{j=1}^{J} (\hat{s}(i, j) - \bar{s})^2.$$

Instead of the biased estimate in Equation 0, it is also possible to compute the unbiased estimate by dividing by $(I-1) \cdot (J-1)$ instead of by $(I \cdot J)$ as in Equation 0:

$$\hat{\sigma}_s^2 = \frac{1}{(I-1) \cdot (J-1)}\sum_{i=1}^{I}\sum_{j=1}^{J} (\hat{s}(i, j) - \bar{s})^2.$$

However, since the mean $\mu_s$ of the scanner pattern is not constant and also depends on the temperature and the moisture, using $\bar{s}$ in the computation of the estimate of the scanner pattern variance may be suboptimal. Therefore, it is better to compute the local estimates $\hat{\mu}_s(i, j)$ of the sample mean of the scanner pattern for each pixel at row index i and column index j by averaging the pixel values in blocks of pixels:

$$\hat{\mu}_s(i, j) = \frac{1}{L \cdot R}\sum_{l=-\lfloor\frac{L}{2}\rfloor}^{\lfloor\frac{L-1}{2}\rfloor}\sum_{r=-\lfloor\frac{R}{2}\rfloor}^{\lfloor\frac{R-1}{2}\rfloor} \hat{s}(i+l, j+r)$$

where the integers L and R define the dimensions of the block over which the local estimate is computed and $\lfloor \cdot \rfloor$ is the floor function (e.g., $\lfloor 2.6 \rfloor=2$ and $\lfloor -1.4 \rfloor=-2$). Setting L and R in the range from about 5 to about 20 yields the best performance, but using values outside this range is also possible. When the index (i+l) or the index (j+r) falls outside the image boundaries, the size of the block is reduced to accommodate the block size reduction in the particular computation; i.e., fewer pixels are used in the sums in Equation 0 for averaging to compute the corresponding local estimate $\hat{\mu}_s(i, j)$.

In another exemplary implementation, the local estimate $\hat{\mu}_s(i, j)$ of the sample mean $\mu_s$ is computed in a single dimension instead of in two dimensions (i.e., in blocks) as in Equation 0. This can be done along rows, along columns, or along any one-dimensional cross section of the image. For example, computing the local estimate $\hat{\mu}_s(i, j)$ for each pixel with row index i and column index j can be done by averaging the neighboring pixels in the column j, reducing Equation 0 to:

$$\hat{\mu}_s(i, j) = \frac{1}{L}\sum_{l=-\lfloor\frac{L}{2}\rfloor}^{\lfloor\frac{L-1}{2}\rfloor} \hat{s}(i+l, j).$$

When the index (i+l) in Equation 0 falls outside the image boundaries, i.e., for the pixels close to the image edges, the number of pixels L used for averaging in Equation 0 is reduced to accommodate the block size reduction in the computation of the corresponding local estimate $\hat{\mu}_s(i, j)$.

Finally, the estimate $\hat{\sigma}_s^2$ of the scanner pattern variance $\sigma_s^2$ can be computed over all pixels in the image using the following Equation 0:

$$\hat{\sigma}_s^2 = \frac{1}{I \cdot J}\sum_{i=1}^{I}\sum_{j=1}^{J} (\hat{s}(i, j) - \hat{\mu}_s(i, j))^2.$$

Instead of the biased estimate of the variance of the scanner pattern as given in Equation 0, it is also possible to compute an unbiased estimate by dividing by (I−1)(J−1) instead of by (I·J) as in Equation 0:

$$\hat{\sigma}_s^2 = \frac{1}{(I-1)\cdot(J-1)} \sum_{i=1}^{I} \sum_{j=1}^{J} (\hat{s}(i,j) - \hat{\mu}_s(i,j))^2.$$

In another exemplary implementation, the estimate $\hat{\sigma}_s^2$ of the scanner pattern variance $\sigma_s^2$ can be computed using only some of the pixels in the image, not all pixels as in Equation 0 or Equation 0. For example, the averaging in these equations can be done only over a block of pixels, only along predetermined rows, only along predetermined columns, only along predetermined cross-sections of the image, or any combinations of these. This approach may decrease the accuracy of the estimate $\hat{\sigma}_s^2$, but it may be beneficial because it will reduce the requirements for computational power.

The estimate $\hat{\sigma}_s^2$ of the scanner pattern variance depends on the particular fingerprint scanner and the particular signal model. It also depends on the method for computing the estimate because due to the specifics of the sensing process in each scanner type and the particular hardware and software design of each scanner type and model, the estimates $\hat{\sigma}_s^2$ for one and the same scanner when computed over blocks of pixels, over columns of pixels, and over rows of pixels may differ from one another. To compute the local mean estimate $\hat{\mu}_s(i, j)$, we used a 11-tap moving-filter along columns, i.e., L=11 in Equation 0. Using it, for Signal Model A, we found that the estimate $\hat{\mu}_s^2$ typically falls in the range from about 12 to about 20, and for Signal Model B from about 7 to about 17.

The estimate $\bar{s}$ of the mean $\mu_s$ of the scanner pattern and the local mean estimate $\hat{\mu}_s(i, j)$ may depend on the particular scanner and the conditions under which they are estimated (e.g., temperature and moisture). The local mean estimate $\hat{\mu}_s(i, j)$ also changes across the image area, i.e., it is not constant in function of i and j. The estimates $\bar{s}$ and $\hat{\mu}_s(i, j)$ also depend on the signal model, and for Signal Model A they are in the range from about 150 to about 220 grayscale levels and for Signal Model B in the range from about 200 to about 250 grayscale levels.

A disadvantage of this approach for estimating the scanner pattern variance is that it requires additional images acquired with a predetermined object applied to the scanner platen. This may require that during the scanner enrollment two groups of images be acquired: one group with a predetermined object applied to the scanner and another group with user's fingerprint applied to the scanner. This may increase the computational time and may weaken the security as the legitimate scanner may be replaced between the acquisitions of the two groups of images. About 10 images acquired with a predetermined object applied to the scanner pattern are sufficient to yield an accurate estimate of the scanner pattern variance.

The above described exemplary implementations for estimating the scanner pattern mean and variance can be done either during the scanner enrollment or prior to the scanner enrollment.

In one exemplary implementation, the estimate of the scanner pattern variance in case when it is computed and set before a particular fingerprint scanner is placed into service is computed by averaging the estimates of the scanner pattern variances of a batch of M scanners. Thus, if $\hat{\sigma}_{s,m}^2$ is the estimate of the scanner pattern variance of the m-th scanner in the batch, then the average estimate of the scanner pattern variance is:

$$\hat{\sigma}_s^2 = \frac{1}{M} \sum_{m=1}^{M} \hat{\sigma}_{s,m}^2.$$

We used Equation 0 and determined that a sufficiently accurate estimate $\hat{\sigma}_s^2$ of the scanner pattern variance for Signal Model A is about 15.5 (with a batch of 22 scanners) and for Signal Model B is about 8.6.

Computing and using an accurate estimate of the scanner pattern variance is important, but the methods disclosed in the exemplary implementations are sufficiently robust against wide deviations of the estimate $\hat{\sigma}_s^2$ from the true value of the scanner pattern variance $\sigma_s^2$, i.e., the overall performance remains relatively unchanged. Furthermore, separating the variable part of the scanner pattern from the scanner noise is virtually impossible because both of them are approximately Gaussian processes and for the methods disclosed herein of importance is the variance of the scanner pattern and the scanner noise. Our analysis showed that this combined variance is approximately equal to the sum of $\hat{\sigma}_s^2$ and $\hat{\sigma}_n^2$, and for Signal Model A, it is from about 13.5 to about 21, with an average about 17, and for Signal Model B—about 9.5 on average.

D.1.1.2.2 Scanner Pattern Spatial Dependence

The random field of the scanner pattern s(i, j) can be approximately modeled as white, i.e., its one-dimensional and its two-dimensional autocorrelation functions can be approximated by a Dirac delta function, one-dimensional and two-dimensional, respectively. The accuracy of this approximation depends on the particular signal model. This accuracy may also be different along the two main axes of the two-dimensional autocorrelation function due to the specifics in the hardware and software implementations of the particular fingerprint scanner type and model, including but not limited to its sensing technology and the addressing of its sensing elements. For example, for Signal Model A, the two-dimensional autocorrelation function along its column axis is typically closer to the Dirac delta function than it is along its row axis, and although it does exhibit some correlation, this correlation is limited and justifies the assumption for being largely uncorrelated. The two-dimensional autocorrelation function of Signal Model B along its column axis is as close to the Dirac delta function as it is along its row axis, although it exhibits non-negligible oscillations along both axes with frequency very close to π radians, which is a noticeable departure from the Dirac delta function and implies correlation within the scanner pattern along columns and rows.

D.1.1.3 Fingerprint Pattern

Henceforth we refer to the two-dimensional function f(i, j) as introduced in Equation (1) for Signal Model A and in Equation (2) for Signal Model B as a fingerprint pattern.

The surface of the fingertip skin (as well as its subsurface) is a sequence of ridges and valleys. This surface is read by the fingerprint scanner and represented as a two-dimensional signal via the image acquisition. Along with other imperfections introduced by the fingerprint scanner in this representation, the acquisition process may also include nonlinear transformations, such as projection of the three-dimensional fingertip onto the two-dimensional scanner platen and a sensing process that reads the ridges and valleys and converts these readings into electrical signals, which signals are further processed and converted into a digital image. As result of such nonlinear transformations, the fingerprint pattern f(i, j) may become a nonlinear function of the actual surface (and/or subsurface) of the fingertip skin.

For our purposes, the fingerprint pattern f(i, j), in each of its two dimensions, can be roughly viewed as one dominant, single-frequency oscillation along with its harmonics. The frequency of this oscillation depends on the width of the ridges and valleys, which are specific for each individual. This frequency also depends on the particular type of finger (e.g., thumbs typically have wider ridges and deeper valleys than little fingers have, on the hands of one and the same person). Also typically, index fingers have narrower ridges and valleys than thumbs, and wider than little fingers. This frequency also depends on the gender (male fingers typically have wider ridges and valleys than female fingers have) and on the age (adults usually have wider ridges and valleys than children have). Finally, this frequency may even vary within one and the same fingerprint. As a very approximate model, a frequency of about 0.63 radians per pixel is sufficiently representative for modeling purposes in the context of the exemplary implementations.

Figure 7:
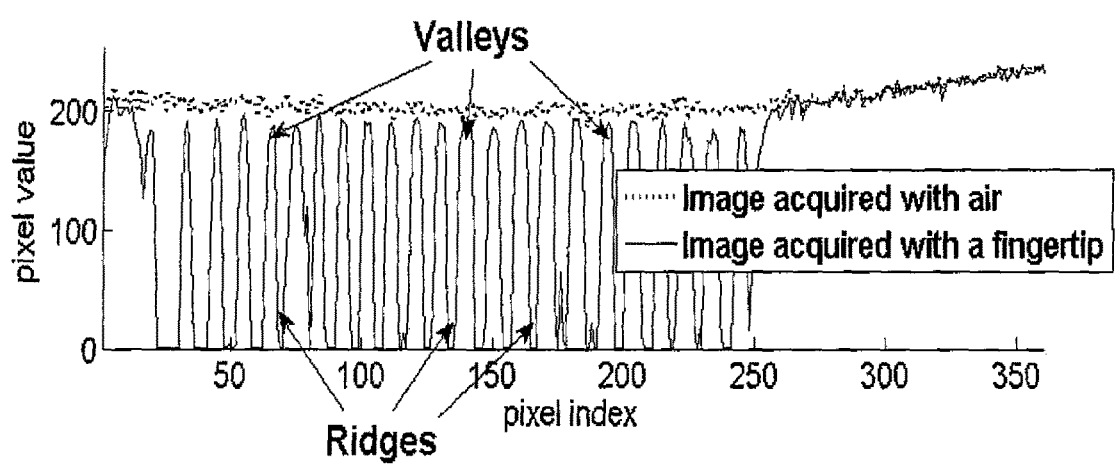
FIG. 7 shows columns of pixels from two images: one acquired with air and another one acquired with a fingertip applied to the scanner platen.

FIG. 7 is a representative figure depicting the pixel values (in grayscale levels) of a column of pixels from two images: one image acquired with no object applied to the scanner platen (i.e., with air), shown in dotted gray curve, and another image acquired with a fingertip applied to the scanner platen, shown in solid black curve. The regions that correspond to valleys and to ridges in the image acquired with a fingertip applied to the scanner platen are also shown. One important observation in this figure is that the pixel values in certain ridges are constant (equal to grayscale level 1), i.e., the scanner becomes saturated and the signal "clips." We observed that this saturation can be due to several reasons: (a) strong pressure of the fingertip to the scanner platen (which is typical for thumb fingers as they are stronger), (b) wide ridges (also typical for thumbs and to some extent for the middle fingers as they are naturally larger than the other fingers), and (c) highly moisturized fingers. While this saturation of the signal to 1 is not a problem for the fingerprint recognition, estimating the scanner pattern from such saturated regions is not possible and, therefore, it is very important that such regions are excluded from further processing.

The range of the fingerprint pattern f(i, j), as it is introduced in Equations (1) and (2), is (0, 1]. The pixel values g(i, j) at row index i and column index j for the two general regions of the fingertip skin, ridges and valleys, taking into account that s(i, j)>>1 for either signal model, are approximately as follows:

In the regions with ridges, f(i, j) is close to 1. Hence:
for Signal Model A:

$$g^{(r)}(i, j) \approx \frac{s(i, j)}{1+s(i, j)} + n(i, j, t) \approx 1 + n(i, j, t)$$

for Signal Model B:

$$g^{(r)}(i, j) \approx \frac{s(i, j)}{1+1} + n(i, j, t) \approx \frac{s(i, j)}{2} + n(i, j, t)$$

In the regions with valleys, f(i, j) is close to 0. Hence:
for Signal Model A:

$$g^{(v)}(i, j) \approx \frac{s(i, j)}{1+0} + n(i, j, t) \approx s(i, j) + n(i, j, t)$$

for Signal Model B:

$$g^{(v)}(i, j) \approx \frac{s(i, j)}{1+0} + n(i, j, t) \approx s(i, j) + n(i, j, t)$$

Therefore, in the regions with valleys, for either one of the signal models (see Equation 0):

$$g^{(v)}(i,j) \approx s(i,j) + n(i,j,t) = g^{(po)}(i,j).$$

D.2 Signal Inversion

Equations (1) and (2) model the relationship between the scanner pattern s(i, j) and the fingerprint pattern f(i, j). Because of the division and the multiplication operations in them, directly separating s(i, j) from f(i, j) is difficult. In order to facilitate this separation, the pixel values g(i, j) in the image can be inverted. Thus, for every row index i and column index j, we define h(i, j):

$$h(i, j) \triangleq \begin{cases} \dfrac{1}{g(i, j)} & \text{for } g(i, j) \neq 0 \\ 1 & \text{for } g(i, j) = 0 \end{cases}$$

This inversion applied to Signal Model A transforms differently the relationship between the scanner pattern and the fingerprint pattern from the same inversion applied to Signal Model B, but the end result of the inversion for the regions with valleys is very similar for the two signal models because (a) the scanner noise n(i, j, t) is much weaker a signal than the scanner pattern s(i, j) and (b) the value of the scanner pattern f(i, j) in the regions with valleys is close to 0. Hence, for Signal Model A:

$$h(i, j) = \frac{1}{\dfrac{s(i, j)}{1+s(i, j)\cdot f(i, j)} + n(i, j, t)} \approx \frac{1}{s(i, j)} + f(i, j)$$

and for Signal Model B:

$$h(i, j) = \frac{1}{\dfrac{s(i, j)}{1+f(i, j)} + n(i, j, t)} \approx \frac{1}{s(i, j)} + \frac{f(i, j)}{s(i, j)}.$$

Since the mean $\mu_s$ (which in this case is the local mean $\mu_s(i, j)$) of the scanner pattern s(i, j) is much larger than its standard deviation $\sigma_s$ and the mean $\mu_s$ only varies slowly, the variations of the scanner pattern s(i, j) about its local mean are small. Therefore, the term $$\frac{f(i, j)}{s(i, j)}$$

in Equation 0 is approximately equal to $$\frac{f(i, j)}{\mu_s},$$

which implies that locally, the fingerprint pattern f(i, j) essentially is simply scaled down by an almost constant factor $\mu_s$, but its waveform shape as such is preserved; we refer to this scaled down version of the fingerprint pattern as f'(i, j). Hence, using this approximation, Equation 0 becomes similar to Equation 0 and it is:

$$h(i, j) \approx \frac{1}{s(i, j)} + \frac{f(i, j)}{\mu_s} \approx \frac{1}{s(i, j)} + f'(i, j).$$

Because of its importance in the analysis that follows, we also define t(i, j) as the inverse of the scanner pattern:

$$t(i, j) \triangleq \frac{1}{s(i, j)}.$$

Thus, by applying the signal inversion of Equation 0, the multiplicative relationship between the scanner pattern s(i, j) and the fingerprint pattern f(i, j) in Equations (1) and (2) is transformed into a sum of two terms, one of which represents the scanner pattern and the other one—the fingerprint pattern:

$$h(i,j) \approx t(i,j) + f(i,j).$$

This makes their separation possible using simple signal processing. In addition, we developed a Gaussian approximation for the inverse of a Gaussian random variable, according to which t(i, j) has approximately a Gaussian distribution $N(\mu_t, \sigma_t^2)$ with:

$$\mu_t = \frac{1}{\mu_s} \text{ and } \sigma_t^2 = \frac{\sigma_s^2}{\mu_s^4},$$

where $\mu_s$ is the mean and the $\sigma_s^2$ is the variance of the scanner pattern s(i, j). This approximation is sufficiently accurate when $\mu_s > 100$ and $\mu_s \gg \sigma_s$, both of which hold true for both signal models. Using the range of values for the scanner pattern mean $\mu_s$ and standard deviation $\sigma_s$ for Signal Model A, $\mu_t$ falls in the range from about $4.54 \cdot 10^{-3}$ to about $6.67 \cdot 10^{-3}$ with a typical value of about $5.0 \cdot 10^{-3}$, and $\sigma_t$ falls in the range from about $0.72 \cdot 10^{-4}$ to about $1.99 \cdot 10^{-4}$ with a typical value of about $0.98 \cdot 10^{-4}$. For Signal Model B, $\mu_t$ falls in the range from about $4.0 \cdot 10^{-3}$ to about $5.0 \cdot 10^{-3}$ with a typical value of about $4.54 \cdot 10^{-3}$, and $\sigma_t$ falls in the range from about $0.42 \cdot 10^{-4}$ to about $1.03 \cdot 10^{-4}$ with typical value of about $0.61 \cdot 10^{-4}$. Note: because of the inevitable presence of scanner noise, which we have neglected in the current discussion about the inversion, of importance for the signal processing of the pixels in the valleys is not the variance $\sigma_s^2$ of the scanner pattern alone, but the variance of the combined scanner pattern and spatial scanner noise. Since the scanner pattern and the spatial scanner noise can both be assumed to be approximately Gaussian, their sum is also a Gaussian, and, therefore, the inversion approximation is still applicable, but has to be used with the sum of their variances, i.e., $\sigma_s^2 + \sigma_n^2$.

In summary, the problem of separating the scanner pattern and the fingerprint pattern, which are in a complex relationship with each other, is thus reduced to separating a Gaussian signal from an additive and roughly sinusoidal signal, which can be done in a straight forward and computationally-efficient way. Because of this simplification, the signal modeling in Equations (1) and (2) and the signal inversion in Equation 0 are key elements of the exemplary implementations described herein. Two downsides of this inversion, however, are that (a) the inversion may require care in implementing it in digital precision-limited systems, e.g., with fixed-point arithmetic, because of possible roundoff errors, and (b) it may also create other types of nonlinear effects. Finally, using the inversion also requires additional computations, which may be undesirable in certain cases.

Even without the inversion, in the regions with valleys, i.e., where f(i, j)≈0, for both signal models, the scanner pattern can also be relatively easily estimated because then g(i, j)≈s(i, j). However, f(i, j) may be as close to 0 as to make the approximation g(i, j)≈s(i, j) sufficiently accurate only for very small part of the pixels in an image containing a fingerprint. In this case, therefore, the subsequent signal processing may use only that part of the image for which this approximation is sufficiently accurate or use larger part of the image where the approximation is not. Either approach may degrade the overall performance but is still possible and can be used in certain cases.

D.3 Scanner Authentication Modules for the 2D Wavelet Method

The two-dimensional (2D) wavelet method is suited for area scanners (also known as touch scanners). For these scanners, the fingertip is placed on the scanner platen without the fingertip being moved, and the scanner acquires a static image (a "snapshot") of the fingerprint such that each pixel of the digital image represents a miniscule area at a unique location of the fingerprint.

Figure 8:
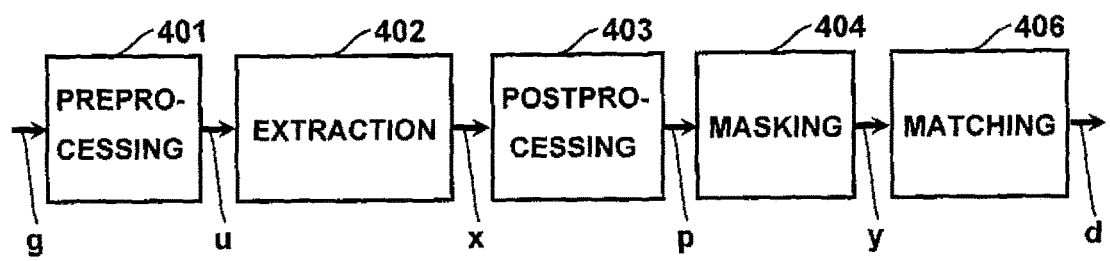
FIG. 8 is a conceptual signal flow diagram of operation of the signal processing modules of one of the methods disclosed in the present invention.

FIG. 8 shows a conceptual diagram of signal processing modules in which the signal g, the image, is processed to produce the signal d, the scanner verification decision, along with the interface signals among the modules.

D.3.1 Preprocessing Module

The Preprocessing Module is shown as block 401 in FIG. 8, and has as input the signal g, which represents the pixel values g(i, j) of the image, and as output the signal u, which is a two-dimensional signal with the same size as g.

In one exemplary implementation, henceforth referred to as direct signal mode of the Preprocessing Module, the output signal is equal to its input signal:

$$u(i,j) = g(i,j).$$

In an alternative exemplary implementation, henceforth referred to as inverse signal mode of the Preprocessing Module, the output signal is the inverse of the input signal:

$$u(i, j) = \begin{cases} \frac{1}{g(i, j)} & \text{for } g(i, j) \neq 0 \\ 1 & \text{for } g(i, j) = 0 \end{cases}$$

The preferred implementation uses the inverse mode of the Preprocessing Module.

D.3.2 Extraction Module

The Extraction Module is shown as block 402 in FIG. 8, and has as input the signal u, which represents the pixel values u(i, j) of the image, and as output the signal x, which is a two-dimensional signal of the same size as u. However, the Extraction Module may process only part of the input signal u, in which case the output the signal x will have a different size than the input signal u.

Wavelets are mathematical functions which are scaled and translated copies of a finite-length waveform. The representation of signals by wavelets is called wavelet transform and is used to analyze signals by simultaneously revealing their frequency and location characteristics. The discrete wavelet transform decomposes a signal into frequency subbands at different scales, and in this way, it allows the signal characteristics in each subband to be analyzed separately and modified on purpose so that the signal will possess certain desired properties after it is reconstructed.

Figure 19:
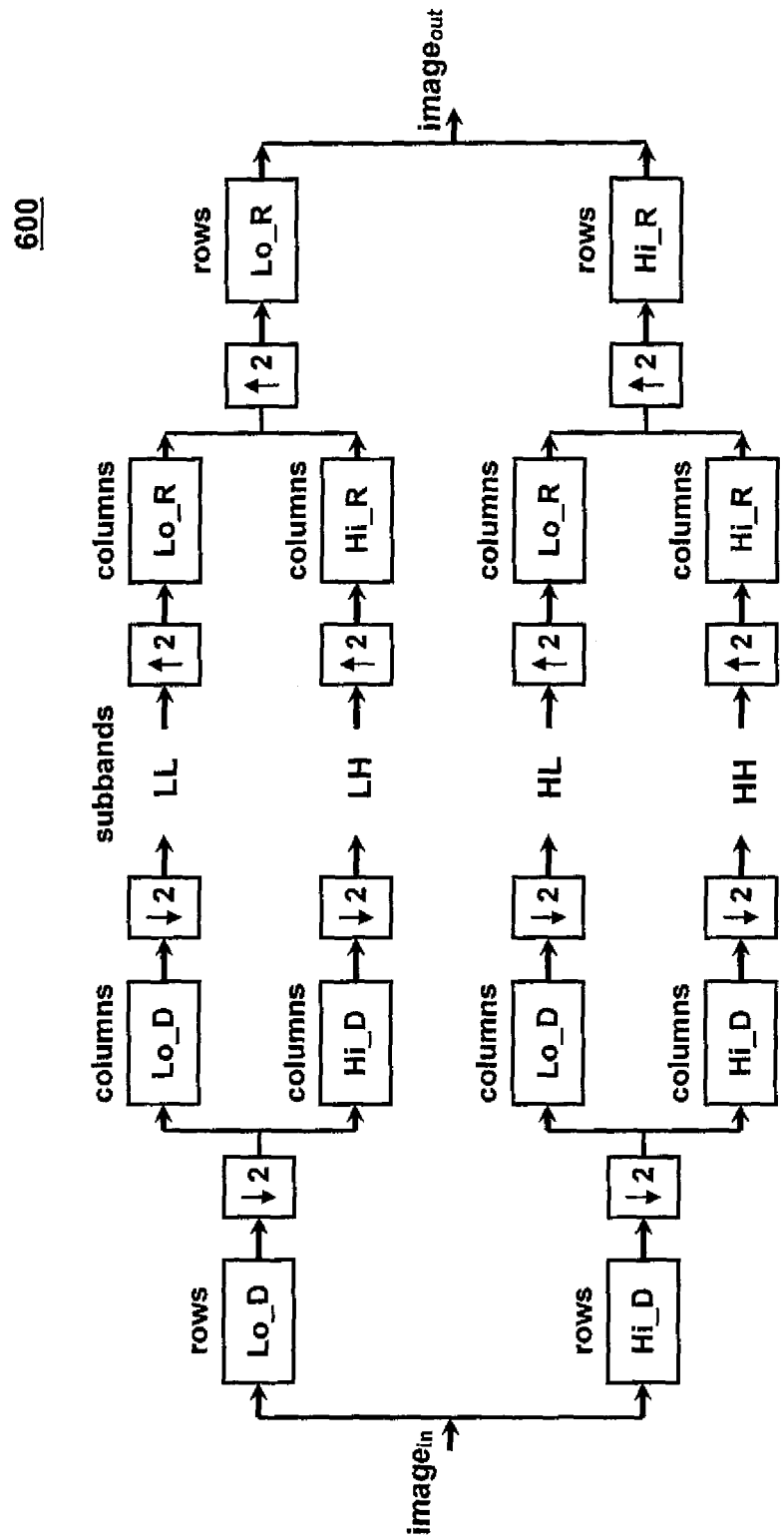
FIG. 19 shows an exemplary illustrative architecture of a single-level two-dimensional discrete wavelet decomposition and reconstruction.

FIG. 19 shows an exemplary illustrative architecture of a single-level two-dimensional discrete wavelet decomposition and reconstruction. Lo_D and Hi_D are the low-pass and high-pass decomposition filters, respectively, and Lo_R and Hi_R are the low-pass and high-pass reconstruction filters, respectively. The coefficients of these filters are specifically designed such that as to perform the desired wavelet processing of the signal. The input image is filtered sequentially by rows and by columns, and also downsampled, which results into computing the wavelet coefficients in the corresponding subbands. After that, it is again filtered, and also upsampled, to reconstruct the output image. Today, this architecture can be implemented efficiently both in hardware and in software.

The input signal u is decomposed by processing it with single-level two-dimensional (2-D) discrete wavelets and then is reconstructed after setting to zero the wavelet coefficients of at least the LL (low-low) subband (i.e., the approximation coefficients); the wavelet coefficients of the LH (low-high) subband, the HL (high-low) subband, and the HH (high-high) subband, and any combination of any two, but not all three, of these three subbands can also be set to zero. The reconstructed in this way signal is henceforth referred to as residual and corresponds to signal x in FIG. 8.

Using biorthogonal wavelets with decomposition order 5 and reconstruction order 1 provides excellent results, but other orders can also be used. Using other types of wavelets such as Daubechies or symlets also provides very good results when their order is 2 (i.e., 4-tap filter length); however, other orders of these wavelets can also be used. In addition, the present invention is not limited to the wavelets specified herein and other wavelets can also be used. The present invention is also not limited to using single-level wavelet decomposition and reconstruction as using higher levels is also possible; however, a wavelet decomposition and reconstruction at a higher level is typically more computationally expensive.

D.3.3 Postprocessing Module

The Postprocessing Module is shown as block 403 in FIG. 8, and has as input the signal x and as output the signal P, which is a two-dimensional signal with the same size as x.

In one exemplary implementation, henceforth referred to as direct signal mode of the Postprocessing Module, the output signal is equal to its input signal:

$p(i,j)=x(i,j)$.

In an alternative exemplary implementation, henceforth referred to as inverse signal mode of the Postprocessing Module, the output signal is the inverse of the input signal:

$$p(i, j) = \begin{cases} \frac{1}{x(i, j)} & \text{for } x(i, j) \neq 0 \\ 1 & \text{for } x(i, j) = 0 \end{cases}.$$

D.3.4 Masking Module

The Masking Module is shown as block 404 in FIG. 8, and has as input the signal p and as output the signal y, which is a two-dimensional signal of the same size as p.

The output signal y is constructed by taking those pixels from the input signal p that have magnitudes smaller than or equal to a predetermined value θ and marking the rest of pixels as not useful:

$$y(i, j) = \begin{cases} 1 & \text{if } |p(i, j)| \leq \theta \\ 0 & \text{otherwise} \end{cases}$$

When y(i, j)=1 in Equation 0, the corresponding pixel will be used in further processing; otherwise, when y(i, j)=0 the pixel will not be used. The predetermined value θ is chosen as result of optimization for a desired False Accept Rate and False Reject Rate, and it depends on the type and order of wavelets used in the Extraction Module. For Signal Model A, θ can be chosen from about 2 to about 6 (θ is not necessarily integer); for biorthogonal wavelets with decomposition order 5 and reconstruction order 1, choosing θ=4 provides a good overall performance. For the inverse mode of the Preprocessing Module when using these wavelets, choosing θ from about 0.00005 to about 0.0003 is possible, with good results achieved at about 0.0001.

D.3.5 Matching Module

The Matching Module is shown as block 406 in FIG. 8, and has as input the signal y, which represents the pixel values y(i, j), and as output the signal d.

Let $x_e$ denote the output signal of the Extraction Module and $y_e$ denote the output signal of the Masking Module when the input signal g is an image acquired during the scanner enrollment. Let $x_q$ denote the output signal of the Extraction Module and $y_q$ denote the output signal of the Masking Module when the input signal g is an image acquired during the scanner verification. When the inverse mode of the Postprocessing Module is used, $p_e$ and $p_q$ are used instead of $x_e$ and $x_q$, respectively. Using the signals $x_e$, $y_e$, $x_q$, and $y_q$, the Matching Module: (i) selects the common pixel indices marked as useful in the signals $y_e$ and $y_q$, (ii) quantifies in a score the similarity between the two signals $x_e$ and $x_q$ for these common pixel indices, and (iii) produces a decision via the output signal d as to whether the two images have been acquired with the same fingerprint scanner by comparing this score with a threshold. When the output signal d takes the value 1, this indicates scanner match; when it takes value 0, this indicates scanner non-match; and when it takes value (−1), this indicates that a decision on matching/non-matching cannot be made and a new query image must be acquired. If multiple images are used for the scanner enrollment and/or the scanner verification, the methods for computing the score are as previously disclosed.

The two-dimensional signals $x_e$, $y_e$, $x_q$, and $y_q$, each having I rows and J columns, are read column-wise, column by column, and transformed into the one-dimensional signals $x'_e$, $y'_e$, $x'_q$, and $y'_q$, respectively, each having (I·J) elements. For example:

$x'_e(1) = x_e(1, 1); \quad x'_e(I+1) = x_e(1, 2);$ $x'_e(2) = x_e(2, 1); \quad x'_e(I+2) = x_e(2, 2);$

...

$x'_e(I) = x_e(I, 1); \quad x'_e(2 \cdot I) = x_e(I, 2);$ etc.

Reading the elements row-wise is also possible.

The selection of the common pixel indices marked as useful in the signals $y'_e$ and $y'_q$ produces the signal $y'_m$ defined as:

$$y'_m(k) = \begin{cases} 1 & \text{if } y'_e(k) = 1 \text{ and } y'_q(k) = 1 \\ 0 & \text{otherwise} \end{cases}$$

where the index k is an integer running from 1 to (I·J). Let D be the set of all indices k for which $y'_m(k)=1$, and let $N_D$ be the number of elements in this set D.

If $N_D$ is less than about 100, the Matching Module produces (−1) as the output signal d, which indicates that the number of common pixel indices is insufficient to compute a reliable similarity score and to make a decision thereof. In this case, acquiring a new query image is necessary.

Quantifying in a score the similarity between the two signals $x'_e$ and $x'_q$ for the common pixel indices as computed in the signal $y'_m$ can be done in many ways; three possible implementations are specified below. Recommending specific decision thresholds for each of them, however, is difficult. Conventionally, the decision threshold is the result of optimization and tests with many images and depends on the desired False Accept Rate and False Reject Rate. In the methods disclosed herein, the mean of the distribution of the scores for images acquired with the same scanner when different implementations of modules are used and their parameters are set may vary in wide ranges: from about 0.15 to over 0.6, and although the mean of distribution of the scores for images acquired with the different scanners is typically close to 0, providing general guidelines for the decision thresholds is difficult. Therefore, we recommend determining the thresholds after experimentation and tests.

D.3.5.1 Normalized Correlation Implementation

First, the norms of the signals $x'_e$ and $x'_q$ for the indices in the set D are computed by:

$$\|x'_e\| = \sqrt{\sum_{k \in D} |x'_e(k)|^2}$$

$$\|x'_q\| = \sqrt{\sum_{k \in D} |x'_q(k)|^2}.$$

If any of the norms $\|x'_e\|$ or $\|x'_q\|$ are equal to zero, the Matching Module produces 0 as an output signal d and does not perform further computations. Otherwise, the similarity score $z^{(nc)}$ is computed by:

$$z^{(nc)} = \frac{\sum_{k \in D} x'_e(k) x'_q(k)}{\|x'_e\| \cdot \|x'_q\|}.$$

The output signal d is then computed by comparing the similarity score $z^{(nc)}$ with a predetermined threshold:

$$d = \begin{cases} 1 & \text{if } z^{(nc)} \geq \tau^{(nc)} \\ 0 & \text{otherwise} \end{cases}$$

The decision threshold $\tau^{(nc)}$ is result of optimization and tests with many images and depends on the desired False Accept Rate and False Reject Rate.

D.3.5.2 Correlation Coefficient Implementation

First, the zero-mean signals $\tilde{x}'_e$ and $\tilde{x}'_q$ for the indices k in the set D are computed by:

$$\tilde{x}'_e(k) = x'_e(k) - \frac{1}{N_D} \sum_{k \in D} x'_e(k)$$

$$\tilde{x}'_q(k) = x'_q(k) - \frac{1}{N_D} \sum_{k \in D} x'_q(k)$$

where the index k runs through all elements in the set D. The values of $\tilde{x}'_e(k)$ and $\tilde{x}'_q(k)$ for indices k that do not belong to the set D can be set to 0 or any other number because they will not be used in the computations that follow.

Next, the norms of the signals $\tilde{x}'_e$ and $\tilde{x}'_q$ for the indices k in the set D are computed by:

$$\|\tilde{x}'_e\| = \sqrt{\sum_{k \in D} |\tilde{x}'_e(k)|^2}$$

$$\|\tilde{x}'_q\| = \sqrt{\sum_{k \in D} |\tilde{x}'_q(k)|^2}.$$

If any of the norms $\|\tilde{x}'_e\|$ or $\|\tilde{x}'_q\|$ are equal to zero, the Matching Module produces 0 as an output signal d and does not perform further computations. Otherwise, the similarity score $z^{(cc)}$ is computed by:

$$z^{(cc)} = \frac{\sum_{k \in D} \tilde{x}'_e(k) \tilde{x}'_q(k)}{\|\tilde{x}'_e\| \cdot \|\tilde{x}'_q\|}$$

The output signal d is then computed by comparing the similarity score $z^{(cc)}$ with a predetermined threshold:

$$d = \begin{cases} 1 & \text{if } z^{(cc)} \geq \tau^{(cc)} \\ 0 & \text{otherwise} \end{cases}$$

The decision threshold $\tau^{(cc)}$ is result of optimization and tests with many images and depends on the desired False Accept Rate and False Reject Rate. It lies in the range from about 0.05 to about 0.30 for Signal Model A in direct mode of the Preprocessing and Postprocessing Modules when the Extraction Module uses biorthogonal wavelets with decomposition order 5 and reconstruction order 1 and θ=4. It also lies in the range from about 0.10 to about 0.50 for Signal Model A in inverse mode of the Preprocessing and direct mode of the Postprocessing Module when the Extraction Module uses biorthogonal wavelets with decomposition order 5 and reconstruction order 1 and θ=0.0001.

The preferred implementation uses the Correlation Coefficient Implementation.

D.3.5.3 Relative Mean Square Error Implementation

First, the norm of the signal $x'_e$ for the indices in the set D is computed as specified by:

$$\|x'_e\| = \sqrt{\sum_{k \in D} |x'_e(k)|^2}.$$

If the norm $\|x'_e\|$ is equal to zero, the Matching Module produces 0 as an output signal d and does not perform further computations. Otherwise, the similarity score $z^{(rmse)}$ is computed by:

$$z^{(rmse)} = \frac{\sqrt{\sum_{k \in D} [x'_e(k) - x'_q(k)]^2}}{\|x'_e\|}.$$

The output signal d is then computed by comparing the similarity score $z^{(rmse)}$ with a predetermined threshold:

$$d = \begin{cases} 1 & \text{if } z^{(rmse)} \leq \tau^{(rmse)} \\ 0 & \text{otherwise} \end{cases}$$

The decision threshold $z^{(rmse)}$ is result of optimization and tests with many images and depends on the desired False Accept Rate and False Reject Rate.

D.3.6 Using Multiple Images

The exemplary implementations described in Section D.3 are capable of using a single image for the scanner enrollment and a single image for the scanner verification and this is preferred because (a) it requires the least amount of computations and (b) it is the most secure as it determines if two images are taken with the same scanner or not without any additional images. However, variations are also possible. For example, it is typical for the biometric systems to capture three images and use them for enrolling the biometric information. Similarly, another exemplary implementation allows using multiple images for the scanner enrollment and/or multiple images for the scanner verification. This may improve the overall accuracy of the scanner authentication.

In general, the methods for processing multiple images are as previously disclosed. Herein, we disclose several exemplary illustrative implementations. Let the number of enrolled images be E and the output signals of the Extraction Module (or the Postprocessing Module, in which case the signal is P instead of x) and the Masking Module, when the enrolled image with index r is being processed, be $x_r$ and $y_r$, respectively. In the preferred exemplary implementation, the similarity scores for each pair consisting of one enrolled image and the query image are averaged and the resulting average similarity score is used to produce a decision. Thus, if the similarity score between the query image and the enrolled image with index r is denoted by $z_r$ which is computed using Equation 0, 0, or 0, then the average similarity score $z_a$ is:

$$z_a = \frac{1}{E} \sum_{r=1}^{E} z_r.$$

Finally, the output signal d of the Matching Module is computed using Equation 0, 0, or 0, depending on which implementation of the Matching Module is used for computing the similarity scores $z_r$.

Another implementation computes an "average" enrolled scanner pattern from all enrolled images and uses this "average" enrolled scanner pattern in the Matching Module. First, the "average" mask $y'_a$ is computed by:

$$y'_a(k) = \prod_{r=1}^{E} y'_r(k)$$

where k is an integer running from 1 to (I·J). Then the "average" scanner pattern is computed by:

$$x'_a(k) = \frac{1}{N_a} \sum_{r=1}^{E} y'_a(k) x'_r(k)$$

where $N_a$ is the number of elements in $y'_a$ for which $y'_a(k)=1$. Next, $x'_a$ is used instead of the signal $x'_e$ and $y'_a$ is used instead of the signal $y'_e$ in the Matching Module. The performance of this implementation may possibly be suboptimal in some cases because of two reasons: (1) since the signals $y'_r$ for different indices r (and thus different enrolled images) may be considerably different from one another, the "average" mask $y'_a$, which essentially is a logical AND of all $y'_r$, may have very few non-zero elements, which in turn may result in fewer than the sufficient number of pixels to be used in the Matching Module, and (2) the "average" signal $x'_a$ may become considerably distorted for some pixels and this may result in false scanner match or false scanner non-match decisions.

All implementations of the Matching Module can be used in combination with the implementations of the modules that precede it in the conceptual signal flow diagram shown in FIG. 8. However, different combinations of module implementations may provide different overall performance.

D.3.7 Implementations and Performance

All implementations of the {Preprocessing Module, Extraction Module, Postprocessing Module, Masking Module, Matching Module} can be used in combination with any of the implementations of the modules that precede this current module in the conceptual signal flow diagram depicted in FIG. 8. However, different combinations of module implementations may provide different overall performance.

Figure 10:
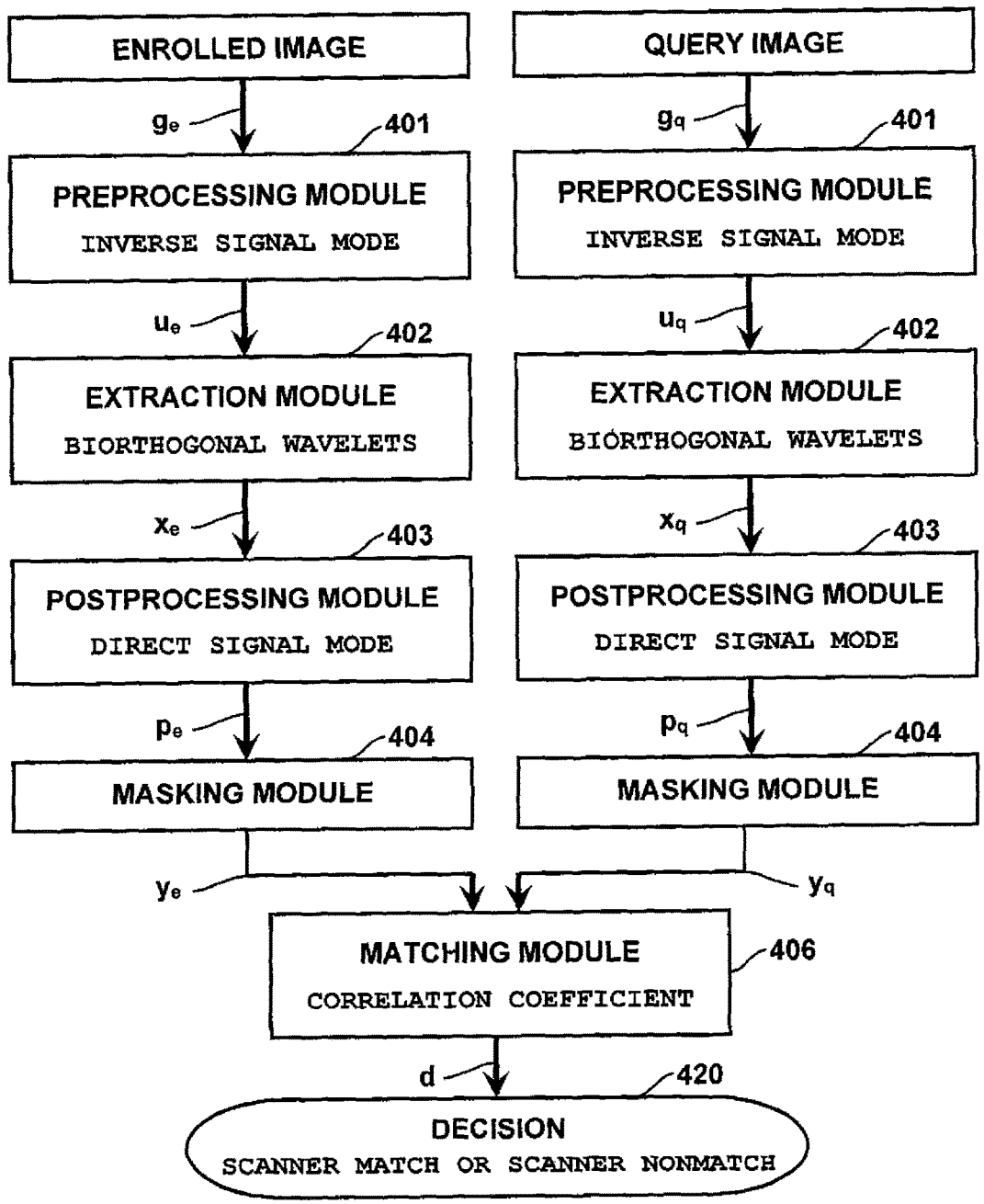
FIG. 10 is a flow diagram of the signal processing steps of one exemplary implementation.

One well-performing exemplary illustrative non-limiting combination of module implementations is shown in FIG. 10. The flowchart 450 discloses the signal processing of this implementation using a single enrolled image $g_e$, acquired and processed during the scanner enrollment, and a single query image $g_q$, acquired and processed during the scanner verification. Although $g_e$ and $g_q$ are processed at different times, the consecutive processing steps are identical, and therefore herein they are discussed simultaneously. $g_e$ and $g_q$ are first processed by the Preprocessing Module 401, operating in its inverse signal mode. Its output signals $u_e$ and $u_q$ are then processed by the Extraction Module 402 that uses biorthogonal wavelets with decomposition order 5 and reconstruction order 1 with the LL subband coefficients set to zero. Its output signals $x_e$ and $x_q$ are processed by the Postprocessing Module 403, operating in its direct signal mode. Its output signals $p_e$ and $p_q$ are processed by the Masking Module 404 using 0.0001 for the predetermined value θ. Finally, the Matching Module 406 computes the correlation coefficient and produces the signal d, based on which a decision for scanner match or scanner nonmatch is made.

The disclosed herein signal processing modules can be implemented in the exemplary system 200 shown in FIG. 5 entirely by software programming of the processor 202, entirely in hardware, or some modules by software programming of the processor 202 and some modules in hardware. For example, the Extraction Module and the Masking Module can be implemented in the digital hardware 208, while the Preprocessing Module, the Postprocessing Module, and the Matching Module can be implemented in software that runs on one or more processors 202.

Figure 16:
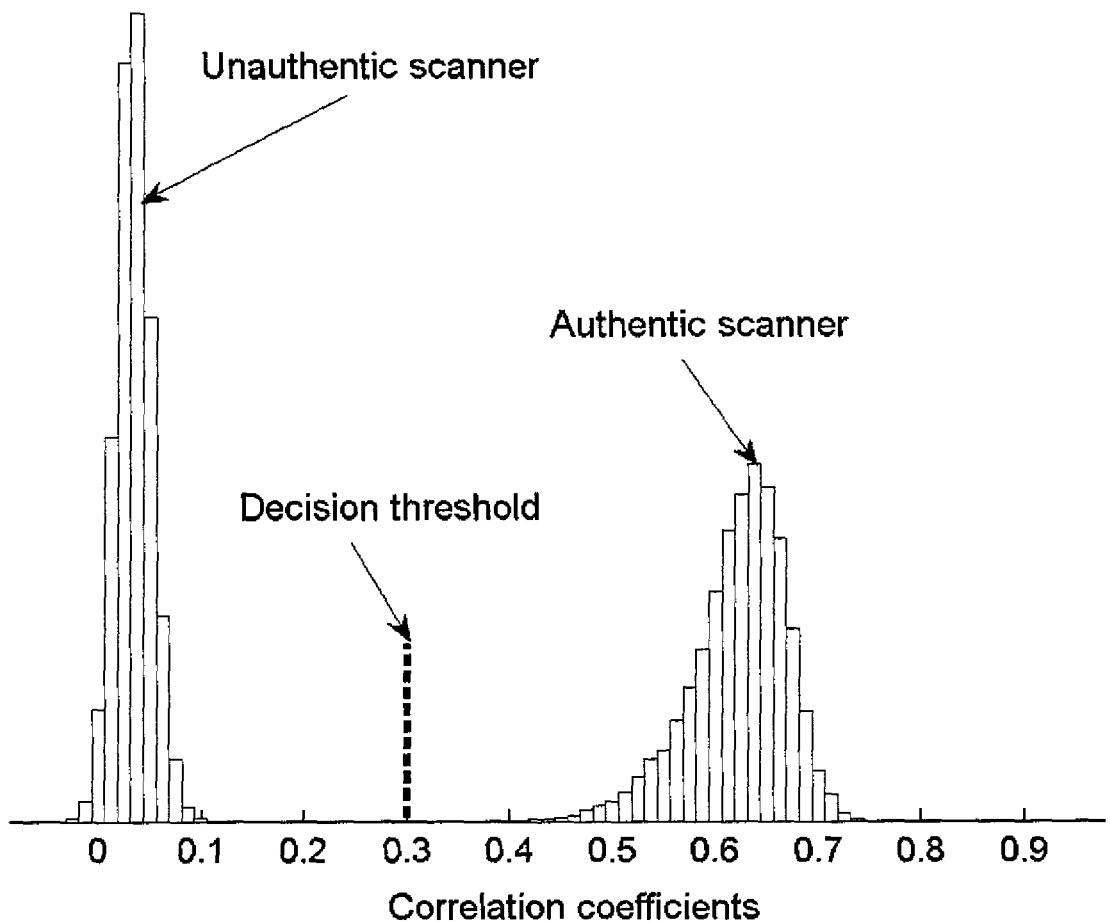
FIG. 16 shows the scanner authentication decisions in one exemplary implementation of the 2D Wavelet Method which employs the correlation coefficient as a similarity score.

FIG. 16 shows the normalized histograms (integrating to 1) of the correlation coefficients and the scanner authentication decisions of the exemplary implementation shown in FIG. 10 when the query image has been acquired with the authentic scanner and when the query image has been acquired with an unauthentic scanner. The tested images have been acquired with 22 area capacitive scanners of AuthenTec, taken from all 10 fingers of 2 individuals, with 2 images per finger (880 images in total). Only a single image was used for scanner enrollment and a single image for scanner verification and each image was matched against all other images. As the figure shows, the two histograms are clearly separated and far apart from each other. With the exemplary decision threshold of 0.30 (also shown in FIG. 16), no decision errors are made.

The performance (as accuracy) of the exemplary implementations we just described earlier is not the best one possible the methods disclosed herein can deliver; rather, it is just an example for their potential. The methods should be considered as a set of tools for achieving the purpose of scanner authentication. Therefore, the modules and their modes as to be implemented in a particular target application should be chosen and their parameters optimized once the specific application requirements and constraints are defined.

The wavelet method disclosed herein may provide higher accuracy in certain applications and environments. It is also universal as it does not assume any specific signal model and its parameters, and therefore it may work with other types of fingerprints scanners and even other image acquisition devices. Furthermore, although developed for area scanners, it may also prove to be suited for certain swipe scanners. In addition, the wavelet processing may come with little additional cost as many fingerprint systems currently used already implement wavelet transforms. Its simplicity and computational efficiency among methods of similar type also make it attractive. A possible downside is that, although it operates on images containing fingerprints, it may rely on the areas of the image that are not covered by the fingerprint pattern, possibly lightening its security. Its robustness under different environmental conditions may also need to be further studied.

As the methods do not require changes in the fingerprint scanners, they can be implemented in systems that have already been manufactured and even sold to customers by software and/or programmable hardware upgrades. Furthermore the implementations of the methods disclosed herein do not incur additional material and manufacturing costs.

D.4 Scanner Authentication Modules for the Averaging Method

The averaging method is suited for swipe scanners (also known as slide or sweep scanners). In these scanners, a line, being a row or a column, of sensor elements performs an instant scan of a tiny area of the fingertip skin and converts the readings into a line (a vector) of pixels. As the fingertip is swiped over this line of sensor elements, a sequence of such lines of pixels is produced, which sequence is then assembled (and possibly further enhanced) to construct a two-dimensional fingerprint image.

The signal processing modules for this method have been designed assuming that the signals follow Signal Model A and tested with the swipe capacitive fingerprint scanners of AuthenTec. In comparison with the area fingerprint scanners, the swipe fingerprint scanners have three major differences: (a) they have much fewer number of sensing elements (in the order of 100 to 200, typically 144), in contrast with the area scanners which typically have tens of thousands, (b) acquiring images with a predetermined object (e.g., air) cannot be done for all pixel elements at once, and (c) the images constructed by combining the scanned lines sometimes may contain artifacts from this construction and possibly also image enhancements.

The swipe scanners we used, however, have two favorable properties: (a) the pixels in the image never saturate ("clip") and (b) in a single image, each sensing element produces many (e.g., hundreds) pixel values, not only one pixel value as the area scanners do, and in this way, the scanner pattern of each sensing element gets "incorporated" in many pixels of the image, thus facilitating the process of estimating it. The swipe scanners we used scan rows of pixels, and, therefore, by averaging along the columns of pixels, the scanner pattern for each sensing pixel becomes "stronger" and easier to estimate; this is the basis of the averaging method.

Figure 9:
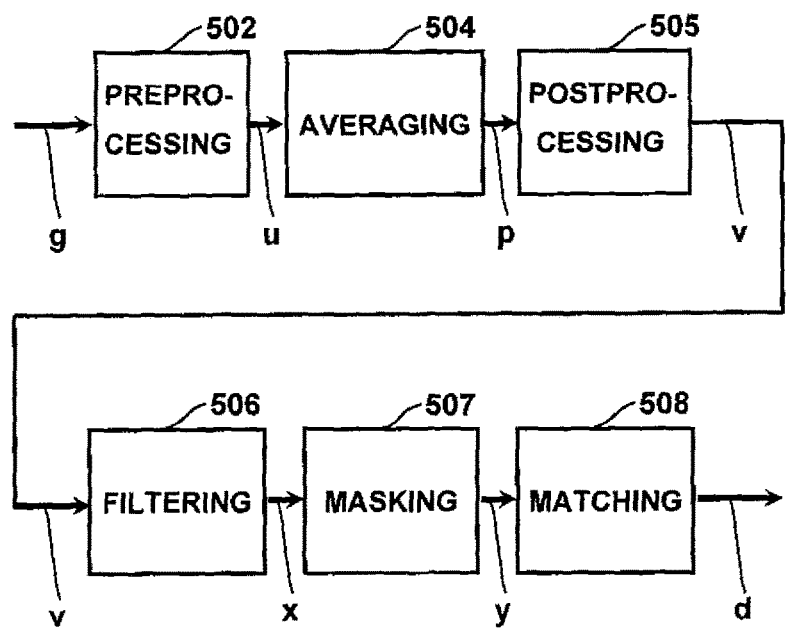
FIG. 9 is a conceptual signal flow diagram of operation of the signal processing modules of another method disclosed in the present invention.

FIG. 9 shows a conceptual diagram of signal processing modules in which the signal g, the image, is processed to produce the signal d, the scanner verification decision, along with the main interface signals between the modules.

D.4.1 Preprocessing Module

The Preprocessing Module is shown as block 502 in FIG. 9, and has as input the signal g, which represents the pixel values $g(i, j)$ of the image, and as output the signal u, which is a two-dimensional signal with the same size as g.

In one exemplary implementation, henceforth referred to as direct signal mode of the Preprocessing Module, the output signal is equal to its input signal:

$$u(i,j)=g(i,j).$$

In an alternative exemplary implementation, henceforth referred to as inverse signal mode of the Preprocessing Module, the output signal is the inverse of the input signal:

$$u(i,j) = \begin{cases} \frac{1}{g(i,j)} & \text{for } g(i,j) \neq 0 \\ 1 & \text{for } g(i,j) = 0 \end{cases}.$$

D.4.2 Averaging Module

The Averaging Module is shown as block 504 in FIG. 9. It computes the average values of the pixels along columns (or along rows, depending on the scanning direction of the line of sensor elements) from its input signal u and produces these average values as its output signal p to be processed further in the subsequent modules. Thus, the input signal u is two dimensional, whereas the output signal p is one dimensional, i.e., a vector (a line) of values.

Let I be the total number of rows and J be the total number of columns in g. Typically, the line of sensor elements in most swipe scanners is perpendicular to the length of the finger, and therefore the finger is swept over the scanner in the direction of finger's length. In this case, the sequentially produced lines of pixels form rows in the two-dimensional image g. Thus, the pixels in each column of g are produced by one and the same sensing element, i.e., for a given (and fixed) column j and for all row indices i from 1 through I, the pixels g(i, j) are produced by the sensing element with index j in the line of J sensing elements. Alternatively, in scanners where the orientation of the line of sensor elements is along the length of the finger, for a given (and fixed) row i and for all column indices j from 1 through J, the pixels g(i, j) are produced by the sensing element with index i in the line of I sensing elements.

The Averaging Module computes the average of the pixel values produced by one and the same sensor element (in direct or in inverse, depending on the mode of the Preprocessing module). Thus, for scanners in which the line of sensor elements is perpendicular to the length of the finger, the averaging is along columns and the output signal p is:

$$p(j) = \frac{1}{I}\sum_{i=1}^{I} u(i, j)$$

where j is from 1 to J. For scanners in which the orientation of the line of sensor elements is along the length of the finger, the averaging is along rows and the output signal p is:

$$p(i) = \frac{1}{J}\sum_{j=1}^{J} u(i, j)$$

where i is from 1 to I. For clarity, in the discussion that follows, we describe the case when the line of sensor elements is perpendicular to the length of the finger and thus the output signal is p(j) where j is from 1 to J. The alternative case is analogous.

The first key observation behind the averaging is that, in both direct and inverse modes of the Preprocessing Module, the output signal p can be approximated as comprising two additive components: (1) the first one representing the scanner pattern s(j) at each column j and (2) the second one representing the average fingerprint row $f_{avg}$ (j), i.e., the average of the fingerprint pattern along each column j. In inverse signal mode, this is straightforward; for example, by averaging h(i, j) of Equation 0 along columns, we obtain the average row $h_{avg}$(j):

$$h_{avg}(j) \approx \frac{1}{s(j)} + f_{avg}(j)$$

The second key observation behind the averaging is that $f_{avg}$ (j) is a slowly varying function of the column index j due to the high spatial scanning resolution of scanners in comparison with the rate of change of the fingerprint pattern f(i, j) (i.e., the sequence of valleys and ridges) along rows (and also along columns). Consequently, the pixel values g(i, j) (as well as their inverses h(i, j)) at adjacent columns cannot differ by much, and more importantly, the averages along adjacent columns are close in value to each other.

Next, as already disclosed, the scanner pattern along rows (i.e., s(j) in this case) has approximately a Gaussian distribution, and consequently, its inverse 1/s(j) has also approximately a Gaussian distribution for the range of values in our case (see Equation 0). Since $f_{avg}$(j) is slowly varying in function of the column index j, 1/s(j) is approximately Gaussian in function of the column index j, and the two are independent, separating them can be done with simple signal processing, as disclosed in the Filtering Module herein.

This averaging works similarly also in the direct mode of the Preprocessing Module, but the analysis is much more involved. By averaging along columns, the average row $g_{avg}$(j) can also be approximated as comprising two additive components, the first one being a function of the scanner pattern s(j) and the second one—of the average fingerprint row $f_{avg}$(j):

$$g_{avg}(j) \approx A[s(j)] + B[f_{avg}(j)]$$

where the functions A[·] and B[·] are approximately A[s(j)]≈$const_1$·s(j) and B[$f_{avg}$(j)]≈$const_2$·($f_{avg}$(j)−$const_3$), for some constants $const_1$, $const_2$, and $const_3$. The second component, B[$f_{avg}$(j)], is believed to be very small or at least slowly varying with the index j, which component a filter can remove and produce the first component A[s(j)], which in turn represents the scanner pattern. It is important to note, however, that the approximation in Equation 0 and the approximations for A[s(j)] and B[$f_{avg}$(j)] are sufficiently accurate not in general, but only: (a) for the characteristics and value ranges of the scanner pattern and of the fingerprint pattern f (j) (which in this case varies from 0 to about 0.005) in the swipe capacitive scanners that we used and (b) in the context of the operation of the Filtering Module disclosed herein.

It is not necessary to average all rows (and respectively, columns) in an image, but only a few of them, which can save computational time. The minimum number of rows used in the averaging needs to be determined experimentally and depending on the available computational power and time, but for achieving a good performance, we recommend that at least 100 rows (and respectively, columns) be averaged.

Some swipe scanners may employ more than one line of pixels, in which case the process of constructing a fingerprint image from the sequence of lines of pixels may involve sophisticated signal processing, which is typically manufacturer proprietary.

D.4.3 Postprocessing Module

The Postprocessing Module is shown as block 505 in FIG. 9, and has as input the signal p, which is the output signal of the Averaging Module, and as output the signal v which is a one-dimensional signal with the same size as p.

In one exemplary implementation, henceforth referred to as direct signal mode of the Postprocessing Module, the output signal is equal to its input signal:

$$v(j) = p(j).$$

In an alternative exemplary implementation, henceforth referred to as inverse signal mode of the Postprocessing Module, the output signal is the inverse of the input signal:

$$v(j) = \begin{cases} \frac{1}{p(j)} & \text{for } p(j) \neq 0 \\ 1 & \text{for } p(j) = 0 \end{cases}.$$

D.4.4 Filtering Module

The Filtering Module is shown as block 506 in FIG. 9. The Filtering Module filters the input signal v to produce the output signal x, which signal x contains the scanner pattern. Due to the operation of the Averaging Module and also to the inverse mode of the Preprocessing Module when used, this filtering is performed using simple signal processing and essentially comprises two operations: (1) a smoothing operation F(·) that smoothes the input signal v and (2) a subtraction operation that subtracts this smoothed signal from the input signal v, producing the output signal x:

$$x = v - F(v).$$

In this way, the smoothing also removes the (variable) mean of the scanner pattern and yields only the variable part of it. This variable part can then be used in the Matching Module by comparing it to a similarly produced signal that is derived from another image or as a source of randomness that is unique to the particular scanner, acquired the former image.

Let N denote the number of elements of the input signal v. For scanners in which the line of sensor elements is perpendicular to the length of the finger, N=J, whereas for scanners in which the orientation of the line of sensor elements is along the length of the finger, N=I.

D.4.4.1 Padding and Windowing

Because of the finite length N of the input signal v, the signal processing of the discontinuity at the beginning and at the end of v may lead to unwanted artifacts, and, therefore, it is preferable that techniques are employed to avoid these artifacts. Three such techniques are included in this disclosure, henceforth referred to as computation shortening, replica padding, and constant padding, although using other techniques is also possible. The replica padding method and constant padding method are specified next. The computation shortening method is specific for the particular implementation of the Filtering Module and specified in the appropriate sections (see sections D.4.4.2 and D.4.4.3).

Replica Padding

The vector v is extended to include zero and negative indices and indices larger than N such that the added elements are symmetric about the first and the last indices of v:

$$v(j) = v(2-j) \quad \text{for } j \text{ from } \left(-\left\lfloor\frac{M}{2}\right\rfloor\right) \text{ to } 0$$
$$v(j) = v(2N-j) \quad \text{for } j \text{ from } (N+1) \text{ to } \left(N+\left\lfloor\frac{M-1}{2}\right\rfloor\right)$$

The added elements in this extension can also be copies of the first and last elements, respectively, of the vector v in the same order as they appear in v.

Constant Padding

The vector v is extended to include zero and negative indices and indices larger than N such that the added elements are set to constants. The constants can be the first and last elements, respectively, as follows:

$$v(j) = v(1) \quad \text{for } j \text{ from } \left(-\left\lfloor\frac{M}{2}\right\rfloor\right) \text{ to } 0$$
$$v(j) = v(N) \quad \text{for } j \text{ from } (N+1) \text{ to } \left(N+\left\lfloor\frac{M-1}{2}\right\rfloor\right).$$

The constants can also be other numbers in the grayscale level range (from 0 to 255), but we recommend that the constants are chosen to be close in value to the values of the first and the last elements, respectively, as choosing constants significantly different from them may lead to considerably degraded overall performance.

Incorporating such techniques to avoid edge effect artifacts may seem unjustified, but actually it is important because the length N of signal v is relatively small (in the order of one to several hundreds) and such artifacts may affect the estimate of the scanner pattern of about 10 pixels, which is not negligible and may decrease the performance.

Furthermore, because applying a fingertip tightly in the regions around the boundaries of the scanner platen area (and in the two ends of the line of sensor elements in this respect) is difficult, the image pixels in these regions typically contain no fingerprint pattern. Hence, the estimate of the scanner pattern in these regions can be made very accurate if such unwanted artifacts are avoided as disclosed herein.

Another important aspect of the processing in this module that may increase the overall performance is using a windowing function applied to the signal being processed. By multiplying the pixel values by a windowing function (for example, see w(j) in Equation 0), the pixels close to the current index of the signal being processed have higher weight in the computation. This is a technique for controlling the level of the smoothing effect by placing larger weight on the pixels around the center pixel than on the distant pixels and thus reducing the effect of the latter.

The windowing function w(j) of size M, for j being an integer from $$-\left\lfloor\frac{M}{2}\right\rfloor \text{ to } \left\lfloor\frac{M-1}{2}\right\rfloor,$$

can be:

A rectangular window (also known as Dirichlet window): w(j)=1

A triangular window (also known as Bartlett window):

$$w(j) = 2\left(1 - \frac{2}{M}|j|\right)$$

A Hann window (also known as Hanning or raised-cosine window):

$$w(j) = 1 + \cos\left(\frac{2j\pi}{M}\right)$$

A Hamming window:

$$w(j) = 2\left(0.54 + 0.46 \cdot \cos\left(\frac{2j\pi}{M}\right)\right)$$

A Gaussian window:

$$w(j) = 2 \cdot \exp\left(-\frac{1}{2}\left(\frac{j}{\frac{w_0(M-1)}{2}}\right)^2\right),$$

where $w_0$ is a suitably chosen value below 0.5.

Using other windowing functions is also possible. The windowing function of choice has to satisfy or be normalized as to satisfy the normalization condition:

$$\sum_{\substack{\text{for all } j \text{ for which} \\ w(j) \text{ is used}}} w(j) = M$$

D.4.4.2 Low-Pass Filter Implementation of the Filtering Module

The smoothing operation in this implementation is performed by a low-pass filter whose cutoff frequency, order, and attenuation in the different frequency bands are optimized for best performance. This low-pass filter includes, but is not limited to, Butterworth, Chebyshev, elliptic, and Bessel filters and filters having finite impulse response (FIR) and filters having infinite impulse response (IIR).

The low-pass filter of choice and disclosed herein is the windowed moving-average filter because of its extreme implementation simplicity and the corresponding excellent overall performance. Generally, for a pixel with index k sufficiently far from the beginning and end of the input signal v (which is a vector), i.e., such that the index (k+j) does not address elements outside the vector v, the local mean $v^{(lm)}$ is computed by:

$$v^{(lm)}(k) = \frac{1}{M} \sum_{j=-\lfloor \frac{M}{2} \rfloor}^{\lfloor \frac{M-1}{2} \rfloor} w(j) \cdot v(k+j)$$

where M is a positive integer and determines the size of the moving-average window, w is a windowing function, and $\lfloor \cdot \rfloor$ is the floor function. Preferably, M is selected to be odd so that the window becomes symmetric about the index k, but selecting M to be even is also possible. Selecting M about 3 gives optimal results, but good overall performance is also achieved for M in the range from 2 to about 7. Once the windowing function is selected, the size M of the moving-average window may need to be adjusted for achieving optimal overall performance.

For the pixels that are close to the beginning or the end of the vector v, three techniques for computing the local mean $v^{(lm)}$ are included in the present disclosure; using other techniques, however, is also possible:

Computation Shortening

The sum in Equation 0 and the denominator in the coefficient in front of it are adjusted so that only elements of the vector v are used in the computation. Thus, for the index k where $$k \le \left\lfloor \frac{M}{2} \right\rfloor \text{ or } k \ge \left( N - \left\lfloor \frac{M-1}{2} \right\rfloor + 1 \right),$$

the local mean vector $v^{(lm)}$ is computed by:

$$v^{(lm)}(k) = \frac{1}{(j_{max} - j_{min} + 1)} \sum_{j=j_{min}}^{j_{max}} w_k(j) \cdot v(k+j)$$

where $j_{min} = \max\left(-\left\lfloor \frac{M}{2} \right\rfloor, 1-k\right)$ and $j_{max} = \min\left(\left\lfloor \frac{M-1}{2} \right\rfloor, N-k\right).$ In this case, the windowing function depends on the index k because the window is truncated and needs to be renormalized so that the sum of its elements equals $(j_{max}-j_{min}+1)$. Therefore, for all values of j from $j_{min}$ to $j_{max}$ as defined by Equation 0:

$$w_k(j) = \frac{(j_{max} - j_{min} + 1) \cdot w(j)}{M},$$

where w is the chosen normalized windowing function. The computation shortening may lead to a slight degradation in the accuracy of the local mean estimate for the pixels where it is applied, but the distortion the computation shortening introduces is the smallest in comparison with the other techniques.

Replica Padding

The vector v is extended to include zero and negative indices and indices larger than N as specified in Equations 0 and 0. The added elements in this extension can also be copies of the first and last elements, respectively, of the vector v in the same order as they appear in v. Then the local mean vector $v^{(lm)}$ is computed using Equation 0.

Constant Padding

The vector v is extended to include zero and negative indices and indices larger than N as specified in Equations 0 and 0. Then the local mean vector $v^{(lm)}$ is computed using Equation 0.

Finally, the output signal x of the Filtering Module in this implementation is the difference between the input signal v and the local mean signal $v^{(lm)}$:

$$x(k) = v(k) - v^{(lm)}(k)$$

where k is the current pixel index, an integer from 1 to N.

Figure 11:
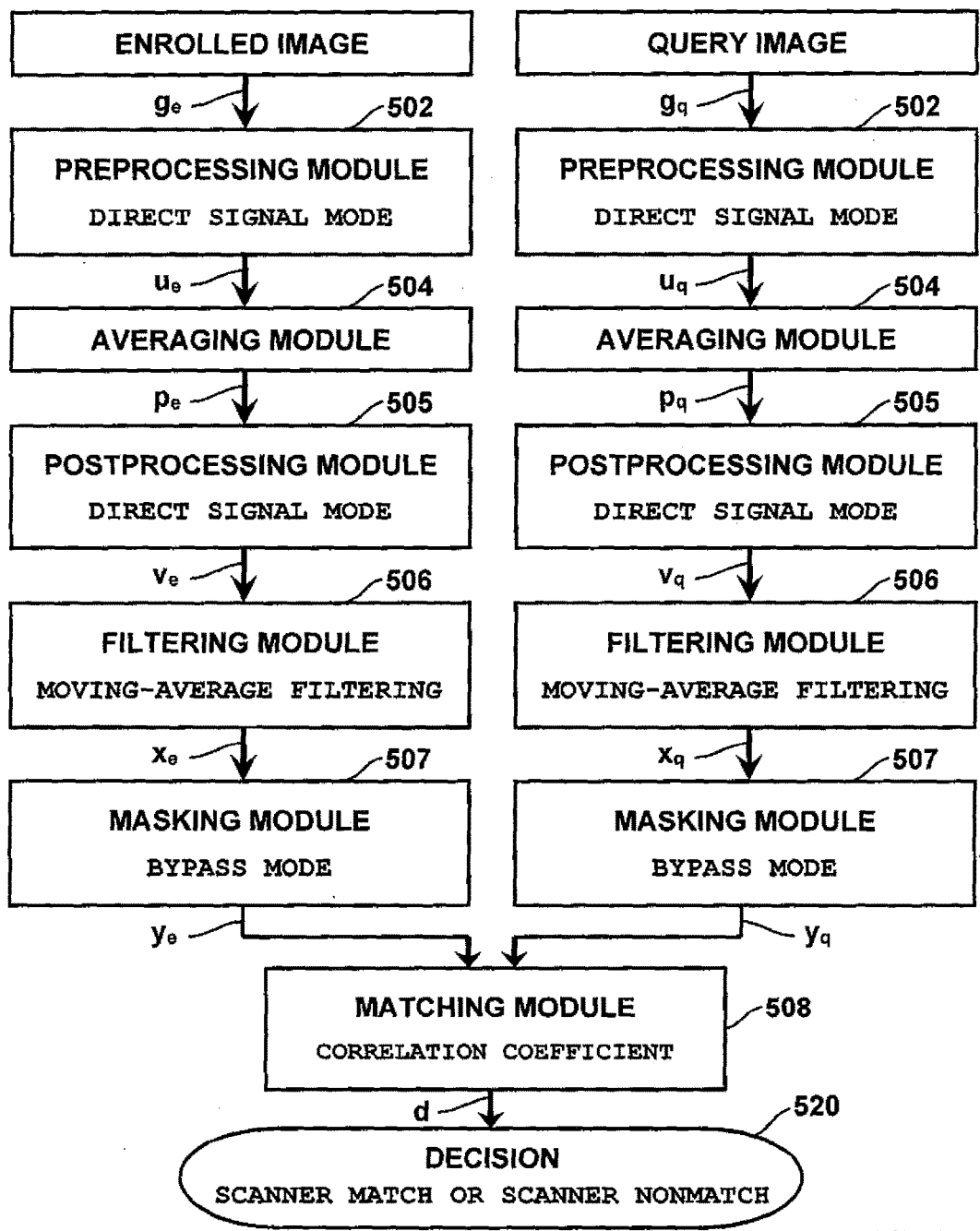
FIG. 11 is a flow diagram of the signal processing steps of another exemplary implementation.
Figure 17:
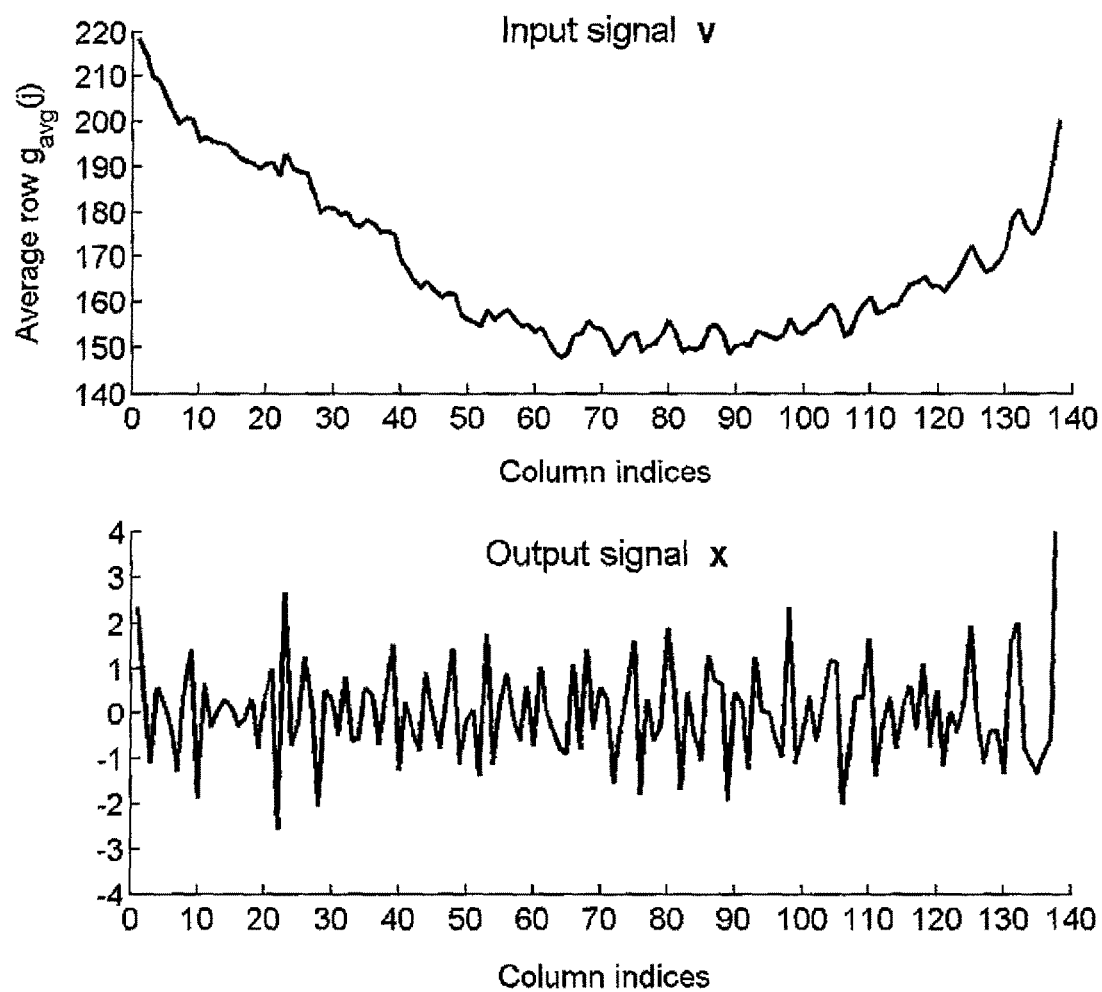
FIG. 17 shows the input signal and the output signal of an one exemplary implementation of the Filtering Module of the Averaging Method.

FIG. 17 shows the input signal v and the output signal x of the exemplary implementation shown in FIG. 11, in which the Filtering Module uses a moving-average filter and both the Preprocessing Module and the Postprocessing Module operate in their direct signal modes.

D.4.4.3 Adaptive Wiener Filter Implementation of the Filtering Module

Herewith we incorporate a summary of the theory of Wiener filters as developed in Jae Lim, "Two-dimensional Image and Signal processing" for the one-dimensional case. Let a signal p(k) and an additive noise q(k), where k is an integer, are two zero-mean second-order stationary discrete-time random processes, linearly independent of each other, and the noisy observation r(k) is: r(k)=p(k)+q(k). The objective is finding that linear time-invariant (or space-invariant) filter with a possibly infinite and possibly non-causal impulse response b(k) such that the linear estimate $\hat{p}(k)$ given the observation r(k), i.e., $\hat{p}(k)=r(k)*b(k)$, is closest to the signal p(k) in mean-square error sense: $E[|p(k)-\hat{p}(k)|^2]$. The discrete-time Fourier transform of the linear time-invariant filter b(k) that minimizes the mean square error is:

$$B(\omega) = \frac{S_p(\omega)}{S_p(\omega) + S_q(\omega)},$$

where $S_p(\omega)$ and $S_q(\omega)$ are the power spectral densities of the signal p(k) and the noise q(k), respectively, and ω is the angular frequency. If p(k) and q(k) are Gaussian random processes, then the Wiener filter is also the optimal nonlinear mean-square error estimator.

In essence, the Wiener filter preserves the high SNR frequency components and suppresses the low SNR frequency components. If we define $$\rho(\omega) \triangleq \frac{S_p(\omega)}{S_q(\omega)}$$

to be the signal-to-noise ratio (SNR) in function of the frequency, then the Wiener filter transfer function is:

$$B(\omega) = \frac{\rho(\omega)}{\rho(\omega)+1}.$$

At the frequencies where the signal is much stronger than the noise, i.e., where $\rho(\omega) \gg 1$, $t_he$ transfer function is $B(\omega) \approx 1$, and the observation r(k) passes through the filter almost unchanged. On the other hand, the Wiener filter almost completely suppresses, i.e., $B(\omega) \approx 0$, the frequency components at which the signal is much weaker than the noise, i.e., where $\rho(\omega) \approx 0$. If the signal p(k) has a nonzero mean $\mu_p$ and the noise q(k) has a nonzero mean $\mu_q$, they have to be subtracted from the observation r(k) before filtering it.

When the impulse response of the Wiener filter changes depending on the local characteristics of the signal that is being processed, the filter becomes time variant (or space variant). Thus, instead of using constant (for all indices k) power spectral densities for the signal and the noise, they can be estimated locally; furthermore, the means of the signal and the noise can be estimated locally as well. Depending on how these quantities are estimated, many variations are possible, but the simplest one is when the local power spectral densities of both the signal and the noise are constant in function of the frequency, i.e., the signal and the noise are "white." When the signal and the noise are zero mean, their power spectral densities are equal to their (local) variances:

$$S_p(\omega) = \sigma_p^2 \text{ and } S_q(\omega) = \sigma_q^2$$

where $\sigma_p^2$ and $\sigma_q^2$ are the variances of the signal and the noise, respectively. In this case, the frequency response of the Wiener filter is constant in function of the frequency, and thus its impulse response is a scaled Dirac delta function:

$$b(k) = \frac{\sigma_p^2}{\sigma_p^2 + \sigma_q^2} \delta(k)$$

where $\delta(k)$ is the Dirac delta function. Moreover, the filtering also depends on the relative relationship between the local variance of the signal and the noise: where the signal local variance $\sigma_p^2$ is smaller than the noise local variance $\sigma_q^2$, the filter suppresses the noise and thus the filter output is approximately equal to the local mean of the signal. On the other hand, where the signal local variance $\sigma_p^2$ is larger than the noise local variance $\sigma_q^2$, the filter leaves the input signal almost unchanged. Since the signal (local) variance is not known and generally is difficult to be estimated, in practice an estimate for the variance of the noisy observation r(k) is used instead because $\sigma_r^2 = \sigma_p^2 + \sigma_q^2$. Putting all things together yields the following expression for the estimate $\hat{p}(k)$ of the signal p(k);

$$\hat{p}(k) = \mu_p(k) + \frac{\max(0, \sigma_r^2(k) - \sigma_q^2)}{\max(\sigma_r^2(k), \sigma_q^2)}(p(k) - \mu_p(k))$$

where $\sigma_r^2(k)$ is the local variance of the observation r(k), and $\mu_p(k)$ is the local mean of the signal p(k), which is also equal to the local mean $\mu_r(k)$ of the observation r(k) since the noise q(k) is zero mean. Assumed to be known is only the variance $\sigma_q^2$ of the noise; $\sigma_r^2(k)$ and $\mu_r(k)$ (and thus also $\mu_p(k)$) are estimated from the observation r(k). The output of the adaptive Wiener filter is the estimate $\hat{p}(k)$, which is a smoothed version of the signal p(k).

The input signal (and vector) v is processed in the following five steps:

D.4.4.3.1 Computing the Local Mean

Generally, for a pixel with index k sufficiently far from the beginning and the end of v, i.e., such that the index (k+j) does not address elements outside v, the local mean vector $v^{(lm)}$ is computed by:

$$v^{(lm)}(k) = \frac{1}{M} \sum_{j=-\lfloor \frac{M}{2} \rfloor}^{\lfloor \frac{M-1}{2} \rfloor} w(j) \cdot v(k+j)$$

where M is a positive integer and determines the size of the moving-average window, w is a windowing function, and $\lfloor \cdot \rfloor$ is the floor function. Preferably, M is selected to be odd so that the window becomes symmetric about the index k, but selecting M to be even is also possible. Selecting M to be about 3 gives optimal results, but good overall performance is also achieved for M in the range from 2 to about 7. Once the windowing function is selected, the size M of the moving-average window may need to be adjusted for achieving optimal overall performance.

For the pixels that are close to the beginning or the end of the vector v, three techniques for computing the local mean $v^{(lm)}$ are included in the exemplary implementations, although using other techniques is also possible:

Computation Shortening

The sum in Equation 0 and the denominator in the coefficient in front of it are adjusted so that only elements of the vector v are used in the computation. Thus, for the index k where $$k \leq \left\lfloor \frac{M}{2} \right\rfloor \text{ or } k \geq \left(N - \left\lfloor \frac{M-1}{2} \right\rfloor + 1\right),$$

the local mean vector $v^{(lm)}$ is computed by:

$$v^{(lm)}(k) = \frac{1}{(j_{max} - j_{min} + 1)} \sum_{j=j_{min}}^{j_{max}} w_k(j) \cdot v(k+j) \text{ where}$$

$$j_{min} = \max\left(-\left\lfloor \frac{M}{2} \right\rfloor, 1-k\right) \text{ and}$$

$$j_{max} = \min\left(\left\lfloor \frac{M-1}{2} \right\rfloor, N-k\right)$$

In this case, the windowing function depends on the index k because the window is truncated and needs to be renormalized so that the sum of its elements equals $(j_{max} - j_{min} + 1)$. Therefore, for all values of j from $j_{min}$ to $j_{max}$ as defined by Equation 0:

$$w_k(j) = \frac{(j_{max} - j_{min} + 1) \cdot w(j)}{M},$$

where w is the chosen normalized windowing function. The computation shortening may lead to slight degradation in the accuracy of the local mean estimate for the pixels where it is applied, but the distortion the computation shortening introduces is the smallest in comparison with the other techniques.

Replica Padding

The vector v is extended to include zero and negative indices and indices larger than N as specified in Equations 0 and 0. The added elements in this extension can also be copies of the first and last elements, respectively, of the vector v in the same order as they appear in v. Then the local mean vector $v^{(lm)}$ is computed using Equation 0.

Constant Padding

Each vector v is extended to include zero and negative indices and indices larger than N as specified in Equations 0 and 0. Then the local mean vector $v^{(lm)}$ is computed using Equation 0.

D.4.4.3.2 Computing the Local Square

Generally, for a pixel with index k sufficiently far from the beginning and the end of v, i.e., such that the index (k+j) does not address elements outside v, the local square vector $v^{(ls)}$ is computed by:

$$v^{(ls)}(k) = \frac{1}{M} \sum_{j=-\lfloor \frac{M}{2} \rfloor}^{\lfloor \frac{M-1}{2} \rfloor} w(j) \cdot v^2(k+j)$$

where M is a positive integer and determines the size of the window, w is a windowing function, and $\lfloor \cdot \rfloor$ is the floor function. Preferably, M is selected to be odd so that the window becomes symmetric about the index k, but selecting M to be even is also possible. Selecting M to be about 3 gives optimal results, but good overall performance is also achieved for M in the range from 2 to about 7. Once the windowing function is selected, the size M of the window may need to be adjusted for achieving optimal overall performance.

For the pixels that are close to the beginning or the end of v, three techniques for computing the local square vector $v^{(ls)}$ are included in the exemplary implementations, although using other techniques is also possible:

Computation Shortening

The sum in Equation 0 and the denominator in the coefficient in front of it are adjusted so that only elements of the vector v are used in the computation. Thus, for the index k where $$k \leq \left\lfloor \frac{M}{2} \right\rfloor \text{ or } k \geq \left(N - \left\lfloor \frac{M-1}{2} \right\rfloor + 1\right),$$

the local square vector $v^{(ls)}$ is computed by:

$$v^{(ls)}(k) = \frac{1}{(j_{max} - j_{min} + 1)} \sum_{j=j_{min}}^{j_{max}} w_k(j) \cdot v^2(k+j) \text{ where }$$

$$j_{min} = \max\left(-\left\lfloor \frac{M}{2} \right\rfloor, 1-k\right) \text{ and }$$

$$j_{max} = \min\left(\left\lfloor \frac{M-1}{2} \right\rfloor, N-k\right).$$

In this case, the windowing function depends on the index k because the window is truncated and needs to be renormalized so that the sum of its elements equals $(j_{max}-j_{min}+1)$. Therefore, for all values of j from $j_{min}$ to $j_{max}$ as defined by Equation 0:

$$w_k(j) = \frac{(j_{max} - j_{min} + 1) \cdot w(j)}{M},$$

where w is the chosen windowing function. The computation shortening may lead to slight degradation in the accuracy of the local square estimate for the pixels where it is applied, but the distortion the computation shortening introduces is the smallest in comparison with the other techniques.

Replica Padding

The vector v is extended to include zero and negative indices and indices larger than N as specified in Equations 0 and 0. The added elements in this extension can also be copies of the first and last elements, respectively, of the vector v in the same order as they appear in v. Then the local square $v^{(ls)}$ is computed using Equation 0.

Constant Padding

Each vector v is extended to include zero and negative indices and indices larger than N as specified in Equations 0 and 0. Then the local square $v^{(ls)}$ is computed using Equation 0.

D.4.4.3.3 Computing the Local Variance Vector

For each pixel with index k, where k is from 1 to N, each element of the local variance vector $v^{(lv)}$ is computed by:

$$v^{(lv)}(k) = v^{(ls)}(k) - (v^{(lm)}(k))^2$$

D.4.4.3.4 Computing the Scaling Coefficient Vector

For each pixel with index k, where k is from 1 to N, each element of the scaling coefficient vector d is computed by:

$$d(k) = \left(\frac{\max(0, v^{(lv)}(k) - \sigma_w^2)}{\max(v^{(lv)}(k), \sigma_w^2)}\right)^{\beta_w}$$

where $\sigma_w^2$ is the Wiener variance and $\beta_w$ is the Wiener beta coefficient. Since in Equation 0, the numerator is always smaller than the denominator, by raising the ratio to power $\beta_w$, chosen to be greater than 1, the scaling coefficient d(k) will be smaller than when $\beta_w$ is 1. Conversely, by raising the ratio to power $\beta_w$ chosen to be smaller than 1, the scaling coefficient d(k) will be greater then when $\beta_w$ is 1. Thus, the Wiener filter beta coefficient $\beta_w$ controls the relative weight put on the scaling factor with respect to the difference between the local variance $v^{(lv)}(k)$ and the Wiener filter variance $\sigma_w^2$. A Wiener filter beta coefficient $\beta_w$ of 1 provides good overall performance along with simple implementation since no raising to power is computed in this case, but other values of $\beta_w$ can also be used; $\beta_w$ is not necessarily integer.

The Wiener filter variance $\sigma_w^2$ is a critically important parameter that determines the overall performance. The best value for $\sigma_w^2$ is typically result of optimization and tests (with multiple scanners of the same type and under different environmental conditions) and depends on the desired tradeoff between False Accept Rate and False Reject Rate because $\sigma_w^2$ is a tradeoff parameter that controls the relationship between them. When performing such optimization is not feasible, as a very approximate guideline, herewith we disclose the possible ranges for $\sigma_w^2$ that we determined for the swipe capacitive scanners of AuthenTec. For the case of direct signal modes of the Preprocessing Module and of the Postprocessing Module, $\sigma_w^2$ can be chosen from about 2 to about 10, with very good results achieved for $\sigma_w^2$ equal to about 3; for $\sigma_w^2$ larger than about 15, the performance becomes closer to the one when the Low-pass Implementation of the Filtering Module is used. For the case of inverse signal mode of the Preprocessing Module or of the Postprocessing Module, $\sigma_w^2$ can be chosen from about $3 \cdot 10^{-9}$ to about $3 \cdot 10^{-8}$, with very good results achieved for $\sigma_w^2$ equal to about $1 \cdot 10^{-8}$; for $\sigma_w^2$ larger than about $1 \cdot 10^{-7}$, the performance becomes closer to the one when the Low-pass Implementation of the Filtering Module is used. Generally, the performance changes little when $\sigma_w^2$ varies within the ranges disclosed herein.

D.4.4.3.5 Computing the Smoothed Signal

For each pixel with index k, where k is from 1 to N, each element of the smoothed signal vector $v^{(s)}$ is computed by:

$$v^{(s)}(k) = v^{(lm)}(k) + d(k) \cdot (v(k) - v^{(lm)}(k)).$$

Finally, the output signal x of the Filtering Module in this implementation is the difference between the input signal v and the smoothed signal $v^{(s)}$, corrected with the Wiener mean $\mu_w$:

$$x(k) = v(k) - v^{(s)}(k) + \mu_w$$

where k is the current pixel index, an integer from 1 to N. In the preferred implementation, the Wiener filter mean $\mu_w$ is set to 0, but other values of $\mu_w$ are also possible as $\mu_w$ can be used to compensate in case when a fixed-valued offset is present so that the output signal v becomes zero mean.

D.4.5 Masking Module

The Masking Module is shown as block 507 in FIG. 9, and has as input the signal x, and as output the signal y, which is a one-dimensional signal of the same size as x. It has two implementations: Bypass Implementation and Magnitude Masking Implementation.

D.4.5.1 Bypass Implementation of the Masking Module

The output signal y in this implementation is constant 1 for, i.e., y(j)=1 for all j, and means that all pixels of x will be used in the further processing.

D.4.5.2 Magnitude Masking Implementation of the Masking Module

The output signal y in this implementation is constructed by taking those pixels from the input signal x that have magnitudes smaller than or equal to a predetermined value (criterion) $\theta$ and marking the rest of pixels as not useful:

$$y(j) = \begin{cases} 1 & \text{if } |x(j)| \leq \theta \\ 0 & \text{otherwise} \end{cases}$$

When y(j)=1 in Equation 0, the corresponding pixel will be used in further processing; otherwise, when y(j)=0 the pixel will not be used. The predetermined value $\theta$ is chosen as to exclude from further processing two groups of pixels. The first group includes those pixels close to the beginning and the end of signal x as they may have unacceptably inaccurate values as result of artifacts due to discontinuities associated with the processing of a finite-length signal. Although the techniques disclosed herein such as the replica and constant padding and the computation shortening significantly mitigate such artifacts, sometimes they cannot reduce them sufficiently, which in turn results into a very inaccurate matching score; therefore, excluding such pixels is necessary. Twice the length of the filter used in the Filtering Module can serve as a loose upper bound for the total number of pixels that this group may have. The second group of pixels includes pixels whose magnitudes are too large, because we observed that they provide a very inaccurate estimate of the scanner pattern due to various factors. The number of pixels in this group, masked as not to be used, is typically small (about several). Therefore, if the combined number of pixels from both groups becomes very large (in the order of tens), it is recommended that this be analyzed; a possible solution may be increasing the predetermined value $\theta$, although the problem may also be due to other reasons.

The optimal value of $\theta$ is determined by experimentation and tests. When performing such optimization is not feasible, as a very approximate guideline, herewith we disclose the possible ranges for $\theta$ that we determined for the swipe capacitive scanners of AuthenTec. For the case of direct signal modes of the Preprocessing Module and of the Postprocessing Module, $\theta$ can be chosen from about 2.5 to about 5, with very good results achieved for $\theta$ equal to about 3.5. For the case of inverse signal mode of the Preprocessing Module or of the Postprocessing Module, $\theta$ can be chosen from about $1 \cdot 10^{-4}$ to about $3 \cdot 10^{-4}$, with very good results achieved for $\theta$ equal to about $2.5 \cdot 10^{-4}$.

The Magnitude Masking Implementation is the preferred implementation of the Masking Module.

D.4.6 Matching Module

The Matching Module is shown as block 508 in FIG. 9. Let $x_e$ denote the output signal of the Filtering Module and $y_e$ denote the output signal of the Masking Module when the input signal g is an image acquired during the scanner enrollment and $x_q$ denote the output signal of the Filtering Module when the input signal g is an image acquired during the scanner verification. Using the signals $x_e$, $y_e$, $x_q$, and $y_q$, the Matching Module: (i) selects the common pixel indices marked as useful in the signals $y_e$ and $y_q$, (ii) quantifies the similarity between the two signals $x_e$ and $x_q$ for these common pixel indices in a score, and (iii) produces a decision via the output signal d as to whether the two images have been acquired with the same fingerprint scanner by comparing this score with a threshold. When the output signal d takes the value 1, this indicates scanner match; when it takes value 0, this indicates scanner non-match; and when it takes value (−1), this indicates that a decision on matching/non-matching cannot be made and a new query image must be acquired. If multiple images are acquired during the scanner enrollment, the Matching Module performs (i) and (ii) for each pair of one enrolled image and the query image, and computes the average of all scores, which average is used to perform (iii).

The selection of the common pixel indices marked as useful in the signals $y_e$ and $y_q$ produces the signal $y_m$ so that:

$$y_m(k) = \begin{cases} 1 & \text{if } y_e(k) = 1 \text{ and } y_q(k) = 1 \\ 0 & \text{otherwise} \end{cases}$$

where the index k is an integer running from 1 to N. Let D be the set of all indices k for which $y_m(k)=1$, and let $N_D$ be the number of elements in this set D.

If $N_D$ is less than a predetermined number, the Matching Module produces (−1) as the output signal d, which indicates that the number of common pixel indices is insufficient to compute a reliable similarity score and to make a decision thereof. In this case, acquiring a new query image is necessary. This predetermined number has to be established experimentally and generally it depends on the number of sensing elements of the swipe scanner. For the swipe capacitive scanners of AuthenTec which have about 150 sensing elements, we recommend that this predetermined number be about 50.

Quantifying the similarity between the two signals $x_e$ and $x_q$ for the common pixel indices as computed in the signal $y_m$ in a score can be done with the three implementations that follow; however, other implementations are also possible.

D.4.6.1 Normalized Correlation Implementation

First, the norms of the signals $x_e$ and $x_q$ for the indices in the set D are computed by:

$$\|x_e\| = \sqrt{\sum_{k \in D} |x_e(k)|^2}$$

$$\|x_q\| = \sqrt{\sum_{k \in D} |x_q(k)|^2}.$$

If any of the norms $\|x_e\|$ or $\|x_q\|$ is equal to zero, the Matching Module produces 0 as the output signal d and does not perform further computations. Otherwise, the similarity score $z^{(nc)}$ is computed by:

$$z^{(nc)} = \frac{\sum_{k \in D} x_e(k) x_q(k)}{\|x_e\| \cdot \|x_q\|}.$$

The output signal d is then computed by comparing the similarity score $z^{(nc)}$ with a predetermined threshold:

$$d = \begin{cases} 1 & \text{if } z^{(nc)} \geq \tau^{(nc)} \\ 0 & \text{otherwise} \end{cases}$$

The decision threshold $\tau^{(nc)}$ is the result of optimization and tests with many images and depends on the desired False Accept Rate and False Reject Rate. As a very approximate guideline, it is typically in the range from about 0.4 to about 0.6.

D.4.6.2 Correlation Coefficient Implementation

First, the zero-mean signals $\tilde{x}_e$ and $\tilde{x}_q$ for the indices k in the set D are computed by:

$$\tilde{x}_e(k) = x_e(k) - \frac{1}{N_D} \sum_{k \in D} x_e(k)$$

$$\tilde{x}_q(k) = x_q(k) - \frac{1}{N_D} \sum_{k \in D} x_q(k)$$

where the index k runs through all elements in the set D. The values of $\tilde{x}_e(k)$ and $\tilde{x}_q(k)$ for indices k that do not belong to the set D can be set to 0 or any other number because they will not be used in the computations that follow.

Next, the norms of the signals $\tilde{x}_e$ and $\tilde{x}_q$ for the indices k in the set D are computed by:

$$\|\tilde{x}_e\| = \sqrt{\sum_{k \in D} |\tilde{x}_e(k)|^2}$$

$$\|\tilde{x}_q\| = \sqrt{\sum_{k \in D} |\tilde{x}_q(k)|^2}.$$

If any of the norms $\|\tilde{x}_e\|$ or $\|\tilde{x}_q\|$ are equal to zero, the Matching Module produces 0 as an output signal d and does not perform further computations. Otherwise, the similarity score $z^{(cc)}$ is computed by:

$$z^{(cc)} = \frac{\sum_{k \in D} \tilde{x}_e(k) \tilde{x}_q(k)}{\|\tilde{x}_e\| \cdot \|\tilde{x}_q\|}$$

The output signal d is then computed by comparing the similarity score $z^{(cc)}$ with a predetermined threshold:

$$d = \begin{cases} 1 & \text{if } z^{(cc)} \geq \tau^{(cc)} \\ 0 & \text{otherwise} \end{cases}$$

The decision threshold $\tau^{(cc)}$ is result of optimization and tests with many images and depends on the desired False Accept Rate and False Reject Rate. As a very approximate guideline, it is typically in the range from about 0.4 to about 0.6.

The preferred implementation uses the Correlation Coefficient Implementation.

D.4.6.3 Relative Mean Square Error Implementation

First, the norm of the signal $x_e$ for the indices in the set D is computed as specified by:

$$\|x_e\| = \sqrt{\sum_{k \in D} |x_e(k)|^2}.$$

If the norm $\|x_e\|$ is equal to zero, the Matching Module produces 0 as output signal d and does not perform further computations. Otherwise, the similarity score $z^{(rmse)}$ is computed by:

$$z^{(rmse)} = \frac{\sqrt{\sum_{k \in D} [x_e(k) - x_q(k)]^2}}{\|x_e\|}.$$

The output signal d is then computed by comparing the similarity score $z^{(rmse)}$ with a predetermined threshold:

$$d = \begin{cases} 1 & \text{if } z^{(rmse)} \leq \tau^{(rmse)} \\ 0 & \text{otherwise} \end{cases}$$

The decision threshold $\tau^{(rmse)}$ is result of optimization and tests with many images and depends on the desired False Accept Rate and False Reject Rate. As a very approximate guideline, it is typically in the range from about 0.8 to about 1.1.

D.4.6.4 Combined Score

In order to improve the robustness of the score and the accuracy of the scanner authentication, it is recommended to compute several scores (instead of only one) between the signal $x_e$ and signal $x_q$ (along with their corresponding $y_e$ and $y_q$) and then combine these scores into a single, combined score that is compared with a predetermined threshold to determine the scanner match/nonmatch decision. Thus, instead of computing a single score z (for example, by using Equation 0, 0, or 0) by using all N pixels of the signals $x_e$ and $x_q$ (and their corresponding $y_e$ and $y_q$), the signals $x_e$ and $x_q$ (and their corresponding $y_e$ and $y_q$) can be split into two parts and the corresponding two scores be computed separately. For example, a score z' can be computed (for example, by using Equation 0, 0, or 0) for the pixels in $x_e$ and $x_q$ (and their corresponding $y_e$ and $y_q$) with the index k running from 1 to $\lfloor N/2 \rfloor$ and another score z" can be computed (for example, by using Equation 0, 0, or 0) for the pixels in $x_e$ and $x_q$ (and their corresponding $y_e$ and $y_q$) with the index k running from $\lceil N/2 \rceil$ to N. Then the two scores can be combined into one combined score. Using the quadratic mean (also known as a root mean square) to combine the two scores provides very good results, but other types of means can also be used. When using the quadratic mean, the combined score is computed by:

$$z_{combined} = \sqrt{\frac{(z')^2 + (z'')^2}{2}}.$$

The reason to use a combined score is because for the swipe capacitive scanners of AuthenTec, scores Z' and Z" computed as disclosed between two images acquired with one and the same scanner sometimes and for some scanners can substantially differ: one of the scores can be much larger than 0.5, while the other one—much smaller and even close to 0. Combining them by using a quadratic mean ensures that the combined score is sufficiently large so as to result in scanner match decision, thus reducing the probability of false reject. The quadratic mean also reduces the probability of false accept. Finally, it is not necessary to split the signals in even parts, although the even split provides very good results.

It is also possible to split the signal $x_e$ and signal $x_q$ (along with their corresponding $y_e$ and $y_q$) into more than two parts (e.g., into G parts) and similarly compute G scores. Then, if the quadratic mean is used to combine them, the combined score is:

$$z_{combined} = \sqrt{\frac{(z')^2 + (z'')^2 + \ldots (z^G)^2}{G}}.$$

Using a large number G, however, is discouraged as the scores z', z", etc., may become unreliable because the number of pixels used in their computation may become too small, which in turn may lead to increase (instead of decrease) of the overall accuracy and worsen the error rates.

Once the combined score is computed, it is compared with the predetermined threshold that corresponds to the types of scores as computed, for example, by Equation 0, 0, or 0. However, when using the combined score, it may be necessary to adjust the predetermined threshold in order to achieve the required error rates.

D.4.7 Using Multiple Images

All exemplary implementations described in Section D.4 are capable of using a single image for the scanner enrollment and a single image for the scanner authentication, and this is preferred because (a) it requires the least number of computations and (b) it is the most secure as it determines if two images are taken with the same scanner or not without any additional images. However, variations are also possible. For example, it is typical for the biometric systems to capture three images and use them for enrolling the biometric information. Similarly, another exemplary implementation allows using multiple images for the scanner enrollment and/or multiple images for the scanner verification. This may improve the overall accuracy of the scanner authentication.

In general, the methods for processing multiple images are as previously disclosed. Herein, we disclose several exemplary illustrative implementations.

Let the number of enrolled images be E and the output signals of the Filtering Module and the Masking Module, when the enrolled image with index r is being processed, be $x_r$ and $y_r$, respectively. In the preferred exemplary implementation, the similarity scores for each pair consisting of one enrolled image and the query image are averaged and the resulting average similarity score is used to produce a decision. Thus, if the similarity score between the query image and the enrolled image with index r is denoted by $z_r$, which is computed using Equation 0, 0, or 0, then the average similarity score $z_a$ is:

$$z_a = \frac{1}{E} \sum_{r=1}^{E} z_r.$$

Finally, the output signal d of the Matching Module is computed using Equation 0, 0, or 0, depending on which implementation of the Matching Module is used for computing the similarity scores $z_r$.

Another implementation computes an "average" enrolled scanner pattern from all enrolled images and uses this "average" enrolled scanner pattern in the Matching Module. First, the "average" scanner pattern is computed by:

$$x_a(k) = \frac{1}{E} \sum_{r=1}^{E} x_r(k)$$

where k is an integer running from 1 through N. Next, $x_a$ is used instead of the signal $x_e$. The performance of this implementation may be suboptimal in certain cases because the "average" signal $x_a$ may become considerably distorted for some pixels and this may result in decision errors.

D.4.8 Image Cropping

Some swipe scanners produce images that contain rows and/or columns of pixels with constant values around the area of the actual fingerprint pattern. Since the pixels with these constant values carry no information about the scanner pattern (and about the fingerprint pattern either), these pixels have to be detected and removed from the image before it is processed further, i.e., the image has to be cropped. These areas of constant values typically surround the area of the fingerprint pattern as rectangular pads on the top and bottom and on the left and right of the fingerprint pattern. Finding if a row falls within such a pad can be done by computing the absolute values of the differences between each two adjacent pixels along this particular row. If the maximum of these absolute values is 0, this indicates that all pixel values in the row are constant and thus this row of pixels has to be removed. Finding if a column falls within one of these pads can be done in a same way. This test is applied to each row and each column in the image and the detected rows and columns are removed. The image cropping can be done before or after the Preprocessing Module.

D.4.9 Implementations and Performance

All implementations of the {Preprocessing Module, Averaging Module, Postprocessing Module, Filtering Module, Masking Module, Matching Module} can be used in combination with any of the implementations of the modules that precede this current module in the conceptual signal flow diagram depicted in FIG. 9. However, different combinations of module implementations may provide different overall performance.

One very well performing, yet very simple, exemplary illustrative non-limiting combination of module implementations is shown in FIG. 11. The flowchart 452 discloses the signal processing of this implementation using a single enrolled image $g_e$, acquired and processed during the scanner enrollment, and a single query image $g_q$, acquired and processed during the scanner verification. Although $g_e$ and $g_q$ are processed at different times, the consecutive processing steps are identical, and therefore herein they are discussed simultaneously. $g_e$ and $g_q$ are first processed by the Preprocessing Module 502 operating in its direct signal mode. Its output signals $u_e$ and $u_g$ are processed by the Averaging Module 504. Its output signals $p_e$ and $p_q$ are processed by the Postprocessing Module operating in its direct signal mode. Its output signals $v_e$ and $v_q$ are processed by the Filtering Module 506 using a moving-average filter. The Masking Module operates in its bypass mode. Finally, the Matching Module computes the correlation coefficient and produces the signal d, based on which a decision for scanner match or scanner nonmatch is made.

The disclosed herein signal processing modules can be implemented in the exemplary system 200 shown in FIG. 5 entirely by software programming of the processor 202, entirely in hardware, or some modules by software programming of the processor 202 and some modules in hardware. For example, the Averaging Module and the Matching Module can be implemented in the digital hardware 208, while the Preprocessing Module, the Postprocessing Module, and the Filtering Module can be implemented in software that runs on one or more processors 202.

Figure 18:
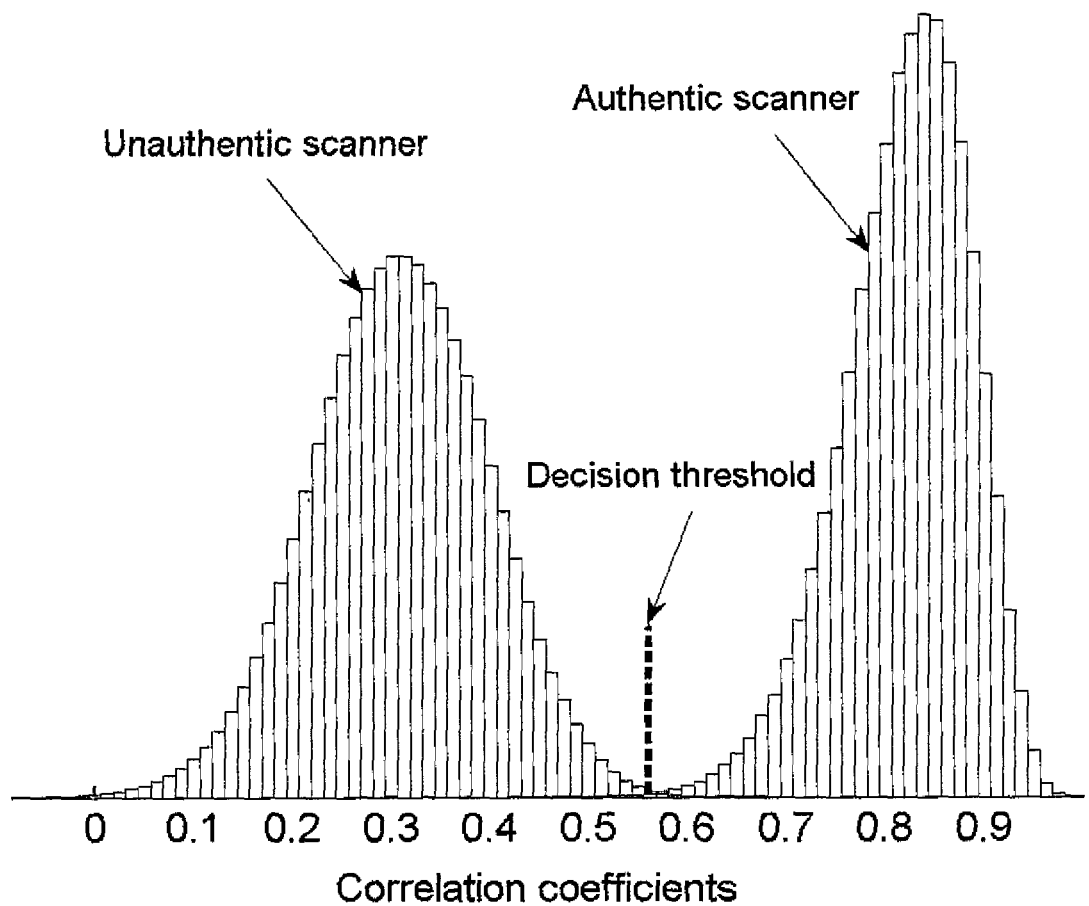
FIG. 18 shows the scanner authentication decisions in one exemplary implementation of the of the Averaging Method which employs the correlation coefficient as a similarity score.

FIG. 18 shows the normalized histograms (integrating 1) of the correlation coefficients and the scanner authentication decisions of the exemplary implementation shown in FIG. 11 when the query image has been acquired with the authentic scanner and when the query image has been acquired with an unauthentic scanner. The tested images have been acquired with 27 swipe capacitive scanners of AuthenTec, taken from all 10 fingers of 2 individuals, with 10 images per finger (5,400 images in total). Only a single image was used for scanner enrollment and a single image for scanner verification, and each image was matched against all other images. With the exemplary decision threshold of 0.56 (also shown in FIG. 18), the empirical Equal Error Rate (i.e., when the False Accept Rate is equal to the False Reject Rate) is about $1 \cdot 10^{-3}$.

The performance (as accuracy) of the exemplary implementations we just described earlier is not the best one possible the methods disclosed herein can deliver; rather, it is just an example for their potential. The methods should be considered as a set of tools for achieving the purpose of scanner authentication. Therefore, the modules and their modes as to be implemented in a particular target application should be chosen and their parameters optimized once the specific application requirements and constraints are defined.

The Averaging Method is computationally very efficient. The main reason for this efficiency is the one-dimensional signal processing and its simplicity (for example, it is not necessary to compute even conventional convolution). The second reason is the absence of any transforms from one domain into another (like the Fourier transform). These two reasons result in a linear dependence between the number of computations needed and the number of pixels used. Each module has different modes of operation, allowing granularity with varying degrees of complexity depending on the computational and time constraints.

Another advantage of the disclosed methods is their robustness under a wide variety of conditions. All modules and modes of the disclosed methods are unconditionally stable as there are no feedback loops in any form and at any level. Due to their simplicity, the disclosed methods can tolerate round-off effects due to finite precision limitations in parameter, coefficients and signal quantization. This enables implementing them in systems, using microprocessors and/or dedicated computational hardware, with fixed-point arithmetic. All computations revolve around multiplication and accumulation of two signal samples and do not involve transforms from one domain to another (transforms are often susceptible to numerical problems). The signal inversion mode may, however, requires care in implementing it in fixed-point systems. Finally, the disclosed methods have an edge over even future methods that require floating-point computations.

As the methods do not require changes in the fingerprint scanners, they can be implemented in systems that have already been manufactured and even sold to customers by software and/or programmable hardware upgrades. Furthermore the implementations of the methods disclosed herein do not incur additional material and manufacturing costs.

D.5 Applications and Advantages of the Exemplary Implementations

The herein described exemplary implementations provide methods for bipartite authentication which comprises biometric authentication (of a user) and biometric scanner authentication. The scanner authentication uses methods for computing a verification decision about the biometric scanner used to obtain the user biometric data, based on the extracted biometric scanner pattern.

The fingerprint scanner 110 that is legitimately constructively connected to system 130 in FIG. 2, system 132 in FIG. 3, and system 134 in FIG. 4, and that is used for the biometric enrollment of the legitimate user for the purpose of biometric authentication is hereinafter referred to as an authentic fingerprint scanner. Any other fingerprint scanner is hereinafter referred to as unauthentic fingerprint scanner. A digital image acquisition of a fingertip that is performed with the authentic fingerprint scanner is hereinafter referred to as authentic fingerprint image acquisition. Any other digital image acquisition of the same fingertip that is performed with an unauthentic fingerprint scanner is hereinafter referred to as unauthentic fingerprint image acquisition.

D.5.1 Estimating the Scanner Pattern

One exemplary implementation is directed to a method for estimating the scanner pattern. Estimating the scanner pattern comprises: (1) applying once or multiple times an object to the sensor of the fingerprint scanner; (2) acquiring at least one digital image, which step is hereinafter referred to as image acquisition; (3) processing the pixel values to extract and subsequently encode a sequence of numbers containing sufficient information to represent the fingerprint scanner, the sequence of numbers is hereinafter referred to as scanner pattern; and (4) storing the scanner pattern for future use.

In one exemplary implementation of the scanner pattern estimation method, the scanner pattern is estimated from a digital image or digital images acquired with a predetermined object applied to the fingerprint scanner. The predetermined object is chosen such that the digital image acquired with an ideal (perfect) fingerprint scanner when this predetermined object is applied to the scanner would give a digital image with uniform (i.e., constant) values for all pixels in the image. The preferred predetermined object depends on the specific sensing technology of the particular fingerprint scanner. For capacitive fingerprint scanners, the preferred predetermined object is air. Other predetermined objects for capacitive fingerprint scanners include a liquid (e.g., water) and a solid object with a predetermined dielectric constant; however, other predetermined objects can also be used.

D.5.2 Scanner Authentication Using the Scanner Pattern

Another exemplary implementation is directed to a method for detecting unauthentic fingerprint scanners and unauthentic fingerprint image acquisitions by using the scanner pattern. This method is hereinafter referred to as scanner authentication and includes enrolling the authentic fingerprint scanner and verifying the authenticity of the fingerprint scanner. Enrolling the authentic fingerprint scanner, hereinafter referred to as scanner enrollment, includes: (1) acquiring with the authentic fingerprint scanner at least one digital image; (2) estimating the scanner pattern from the at least one digital image using the methods for scanner pattern estimation disclosed above; and (3) storing the template scanner features into the system for future reference.

Verifying the authenticity of a fingerprint scanner, hereinafter referred to as scanner verification, includes: (1) acquiring with the fingerprint scanner at least one digital image; (2) estimating the scanner pattern from the at least one digital image using the methods for scanner pattern estimation disclosed above; (3) comparing the query scanner features with the template scanner features to compute a similarity score between the query scanner features and the template scanner features; and (5) converting the similarity score into a decision that the two sets of scanner patterns either do or do not arise from the same fingerprint scanner. The decision is hereinafter referred to as scanner match if the similarity score is within a predetermined range of values, and the decision is referred to as scanner non-match if the similarity score is outside the predetermined range of values. When the decision is scanner match, then the digital image is considered as being acquired with the authentic fingerprint scanner, and the acquisition is an authentic fingerprint image acquisition. When the decision is scanner non-match, the digital image is considered as being acquired with an unauthentic fingerprint scanner, and the acquisition is an unauthentic fingerprint image acquisition.

The listing of query scanner features and template scanner features will partially agree and partially disagree depending on whether or not they originated from the same fingerprint scanner, and this will be captured in the similarity score. It is also possible that the two lists of scanner features differ in the number of features they contain, in which case only the common entries are used in computing the similarity score.

D.5.3 Bipartite Enrollment

Figure 12:
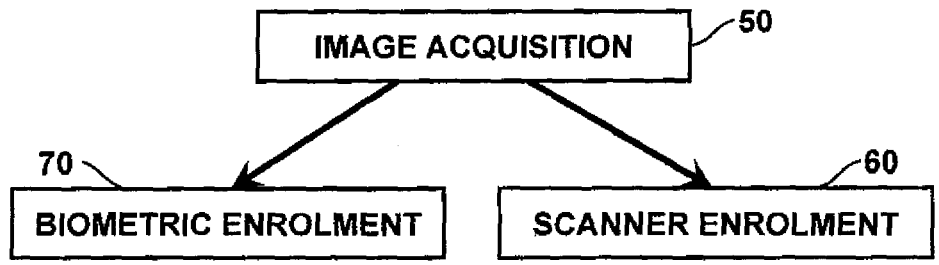
FIG. 12 is an exemplary flow diagram of the method for bipartite enrollment according to one exemplary implementation.

Another exemplary implementation is directed to a method for enrolling the template biometric features and the template scanner features. This method is hereinafter referred to as bipartite enrollment, and is illustrated by flow chart 40 of FIG. 12. Bipartite enrollment comprises: (1) acquiring at least one digital image with the authentic fingerprint scanner in acquiring step 50; (2) enrolling the template biometric features in enrolling step 70; and (3) enrolling the template scanner features in enrolling step 60.

In the preferred exemplary implementation of bipartite enrollment three digital images are acquired, but acquiring one, two, or more than three digital images is also possible. In the preferred exemplary implementation of bipartite enrollment, both the biometric enrollment and the scanner enrollment use the same acquired image or the same set of acquired images.

In another exemplary implementation of bipartite enrollment, the scanner enrollment uses another acquired image or another set of acquired images than the image or images acquired for the biometric enrollment. The scanner enrollment is performed with a predetermined object applied to the fingerprint scanner. It is best to acquire the image or the set of images used for the scanner enrollment after acquiring the image or images used for the biometric enrollment. It is also possible to acquire the image or the set of images used for the scanner enrollment before acquiring the image or images used for the biometric enrollment.

D.5.4 Bipartite Verification

Figure 13:
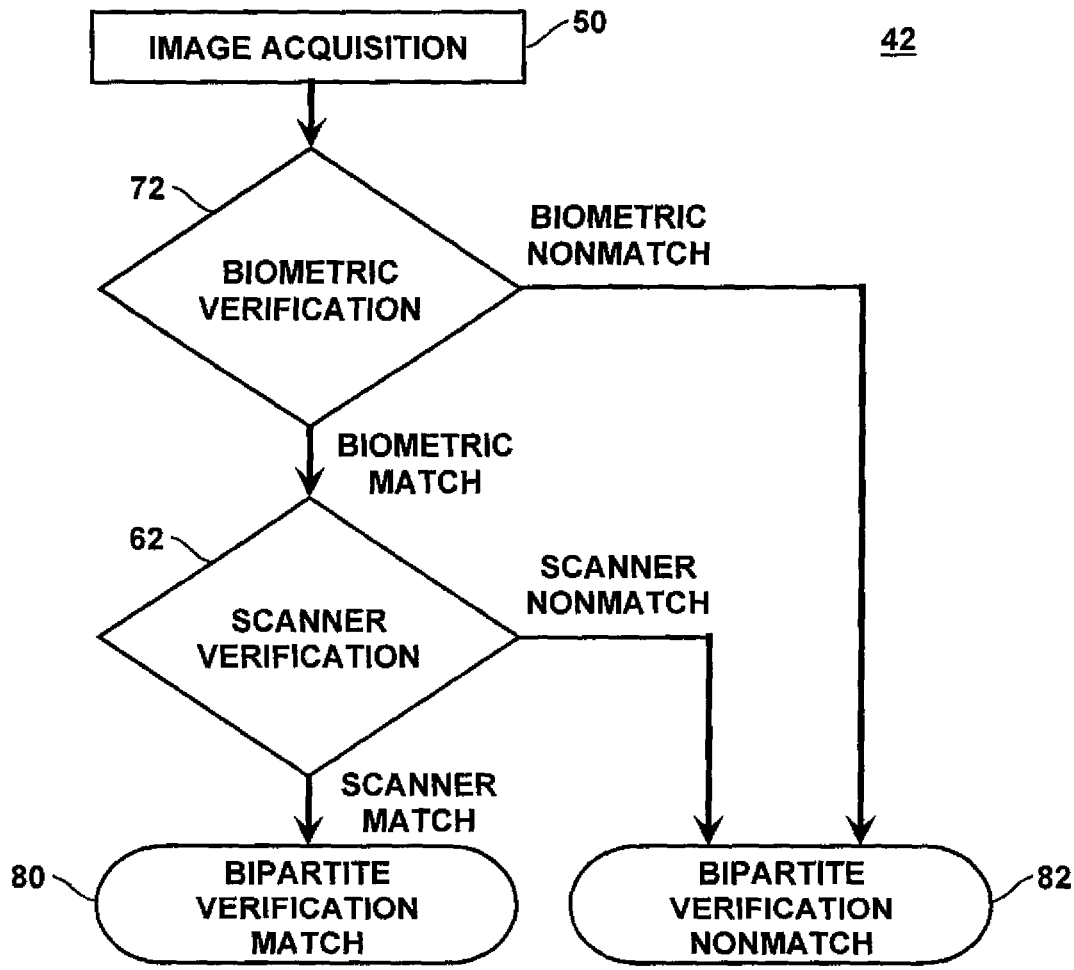
FIG. 13 is an exemplary flow diagram of the method for bipartite verification according to one exemplary implementation.

Another exemplary implementation is directed to a method for verifying the query biometric features and the query scanner features. This method is hereinafter referred to as bipartite verification. The preferred exemplary implementation for bipartite verification is shown by flow chart 42 in FIG. 13. Bipartite verification comprises: (1) acquiring at least one digital image with the authentic fingerprint scanner in acquiring step 50, if the quality of the at least one digital image is not satisfactory, one or more additional digital images may be acquired until digital images with satisfactory quality are acquired to replace the unsatisfactory images; (2) performing biometric verification step 72; (3) performing scanner verification step 62 if the decision in biometric verification step 72 is biometric match; (4) ending with bipartite verification match in step 80 if the decision of scanner verification step 62 is scanner match; ending the bipartite verification with bipartite verification non-match step 82 if the decision of the biometric verification step 72 is biometric non-match ending the bipartite verification with bipartite verification non-match step 82 if the decision of the scanner verification step 62 is scanner non-match.

Figures 14, 15:
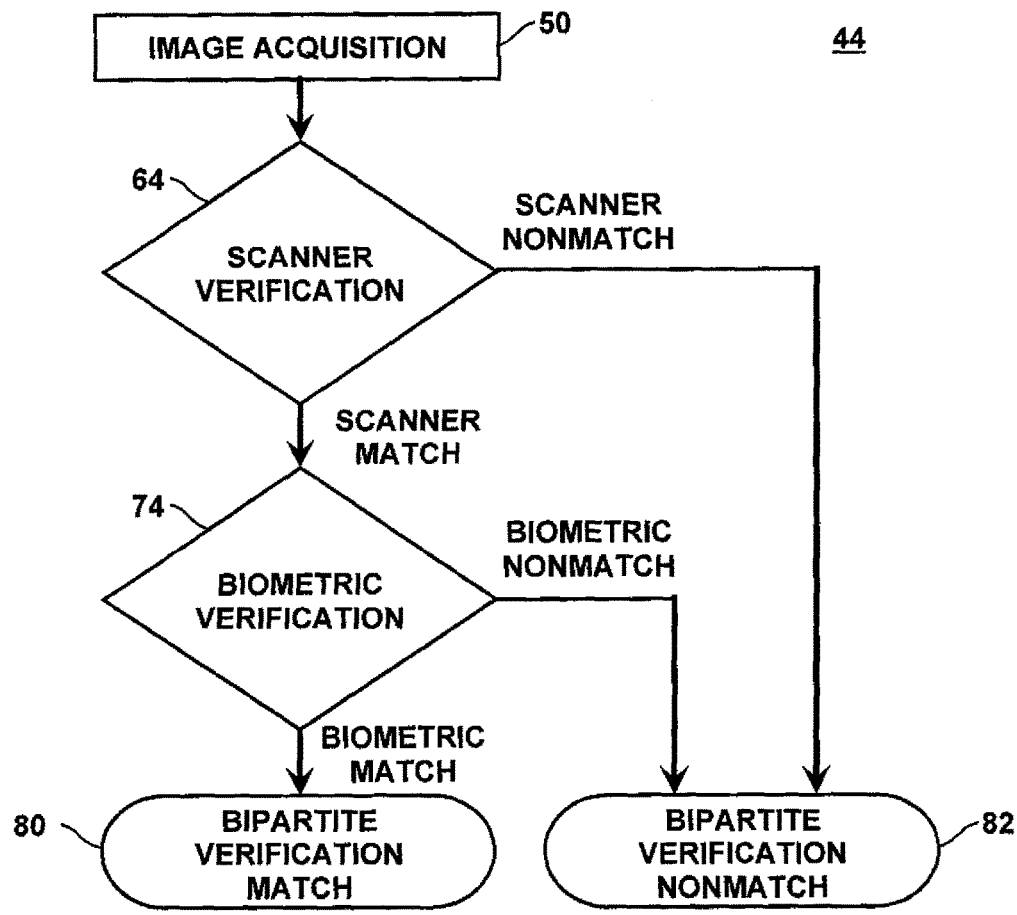
FIG. 14 is a flow diagram of the method for bipartite verification according to another exemplary implementation.
FIG. 15 is a table with exemplary implementations of the method for bipartite authentication depending on the object used for scanner enrollment and for scanner verification and the corresponding levels of security each implementation provides.

Another exemplary implementation for bipartite verification is shown by flowchart 44 in FIG. 14. This exemplary implementation includes: (1) acquiring at least one digital image with the authentic fingerprint scanner in acquiring step 50, if the quality of the at least one digital image is not satisfactory, one or more additional digital images may be acquired until digital images with satisfactory quality are acquired to replace the images with unsatisfactory quality; (2) performing scanner verification step 64; (3) performing biometric verification step 74 if the decision of scanner verification step 64 is scanner match.; (4) ending with bipartite verification match step 80 if the decision of biometric verification step 74 is biometric match; (5) ending with bipartite verification non-match step 82 if the decision of scanner verification step 64 is scanner non-match; and (6) ending with bipartite verification non-match step 82 if the decision of biometric verification step 74 is biometric non-match.

In the preferred exemplary implementation of the bipartite verification method, both the biometric verification and the scanner verification use one and the same acquired digital image.

In another exemplary implementation of the bipartite verification method, the scanner verification uses another acquired image than the image acquired for the biometric verification. In this exemplary implementation, the scanner verification uses a digital image acquired with a predetermined object applied to the fingerprint scanner. It is best to acquire the image used for the scanner verification after acquiring the image used for the biometric verification. It is also possible to acquire the image used for the scanner verification before acquiring the image used for the biometric verification.

Depending on the object used for the scanner enrollment and for the scanner verification, the bipartite authentication provides different levels of security. Possible exemplary implementations of the bipartite authentication method and the corresponding levels of security each of them provides are shown as rows in the table of FIG. 15. A fingerprint scanner's pattern can be estimated from two types of images depending on the type of the object applied to the fingerprint scanner:

A predetermined, known a priori, object. Since the object is known, the differences (in the general sense, not only limited to subtraction) between the image acquired with the predetermined object and the theoretical image that would be acquired if the fingerprint scanner were ideal reveal the scanner pattern because the image does not contain a fingerprint pattern.

A fingertip of a person that, generally, is not known a priori. The acquired image in this case is a composition of the fingerprint pattern, the scanner pattern, and the scanner noise.

In the exemplary implementation designated as "Scenario A" in FIG. 15, both the scanner enrollment and the scanner verification use an image or images acquired with a predetermined object applied to the fingerprint scanner. Thus, the images used for the biometric enrollment and for the scanner enrollment are different. The images used for the biometric verification and for the scanner verification are also different. Hence, this implementation provides weak security, but its implementation is simple and it is useful in applications that do not require a high level of security. The security level of this exemplary implementation can be increased by other methods.

In the exemplary implementation designated as "Scenario B" in FIG. 15, the scanner enrollment uses an image or images acquired with a predetermined object applied to the fingerprint scanner. Thus, the images used for the biometric enrollment and for the scanner enrollment are different. The images used for the biometric verification and for the scanner verification, however, are the same. For the scanner verification, the scanner pattern is estimated from a digital image or digital images acquired with the fingertip of the user applied to the fingerprint scanner. This exemplary implementation provides a medium level of security, and it is useful in applications that do not require a high level of security. The security level of this exemplary implementation can be increased by other methods.

In the exemplary implementation designated as "Scenario C" in FIG. 15, the images used for the biometric enrollment and for the scanner enrollment are the same, and the scanner enrollment uses a digital image or digital images acquired with the fingertip of the user applied to the fingerprint scanner. The images used for the biometric verification and for the scanner verification are also the same, and the scanner verification uses a digital image or digital images acquired with the fingertip of the user applied to the fingerprint scanner. This exemplary implementation provides strong security. This is the preferred exemplary implementation.

D.5.5 Exemplary Implementations for Improved Security of User Biometric Authentication The method for bipartite authentication can be used to improve the biometric authentication of a user to a system by detecting attacks on the fingerprint scanner that replace a digital image containing a legitimate user's fingerprint pattern and acquired with the authentic fingerprint scanner by a digital image that still contains the fingerprint pattern of the legitimate user but has been acquired with an unauthentic fingerprint scanner. This type of attack will become an important security threat as the widespread use of the biometric technologies makes the biometric information essentially publicly available. In particular, since the biometric information has a low level of secrecy, an attacker may possess complete information about the fingerprint of the legitimate user, which includes:

possession of digital images of the fingerprint of the legitimate user acquired with an unauthentic fingerprint scanner, including images acquired in nearly ideal conditions and with very high resolution;

possession of any complete or partial information about user's fingertip obtained from a latent fingerprint, i.e., from an impression left by user's fingertip on a surface;

possession of fingerprint features (e.g., minutiae) extracted from user's fingerprint image;

ability to artificially produce digital images that are synthesized from partial or complete information about user's fingerprint.

An attacker who has full physical access to the network 120 and system 130, 132, or 134 in FIGS. 2-4, may replace the digital image acquired by the authentic fingerprint scanner by another, unauthentic digital image (i.e., acquired with an unauthentic fingerprint scanner or artificially synthesized) that contains the fingerprint pattern of the legitimate user. In this case, the biometric verification will output a biometric match (with high probability). Thus, without additional verification, the unauthentic digital image would be accepted as legitimate and would lead to positive biometric authentication. By using the method of bipartite authentication, however, the system will additionally perform scanner verification which will determine (with high probability) that the unauthentic digital image has not been acquired with the authentic fingerprint scanner, and thus, the bipartite verification will end with bipartite verification non-match (with high probability). Therefore, the attack on the fingerprint scanner will be detected.

A very significant advantage of each exemplary implementation is that it can be implemented in systems that have already been manufactured and even sold to customers by upgrading their system software, firmware, and/or hardware (if using programmable hardware blocks), which can be done even online. The methods and apparatus taught in the prior art for identifying devices by designing special hardware, in particular analog and/or digital circuits, typically incur material and manufacturing cost and are not applicable to systems (including fingerprint scanners) that have already been manufactured.

Since scanner authentication is essentially only one part of the whole authentication process (see bipartite authentication above), objective and subjective time constraints are usually in place for such scanner authentication. Furthermore, the conventional fingerprint verification algorithms typically are very computationally intensive. This problem can be particularly severe in portable devices. Therefore, the scanner authentication should impose as little additional computational burden as possible. Although the time requirements for the scanner enrollment can be loose (i.e., users would tolerate longer time to enroll their biometrics and devices), the scanner verification should take very little time, such as one second or even much less. As a consequence, this computational efficiency is a key element of the exemplary implementations, leading to straight forward and computationally efficient implementations.

D.6 Encryption Schemes

In addition to authenticating the device for use by an individual inputting the enrolled and query fingerprint images. The fingerprint scanner's unique scanner pattern can be used to encrypt and decrypt information, respectively, transmitted from or received to the device. The unique scanner pattern, represented as a sequence of numbers, can used to generate an encryption or de-encryption key to secure information transfers to or from the device. As shown in FIG. 5, encryption/de-encryption module 214 is configured to receive the sequence of numbers representative of the unique scanner pattern, and then apply a stored encryption algorithm to generate the encryption/de-encryption key. Most if not all encryption schemes are suitable for use in a system using the unique scanner pattern to generate the key (or keys). Examples of various selected encryption schemes applicable to the exemplary embodiments described herein are discussed below but are not meant to be limiting, and as will be understood by those skilled in the art other encryption schemes and variations of schemes can also be utilized.

D.6.1 Symmetric-Key Encryption Schemes

Figure 20:
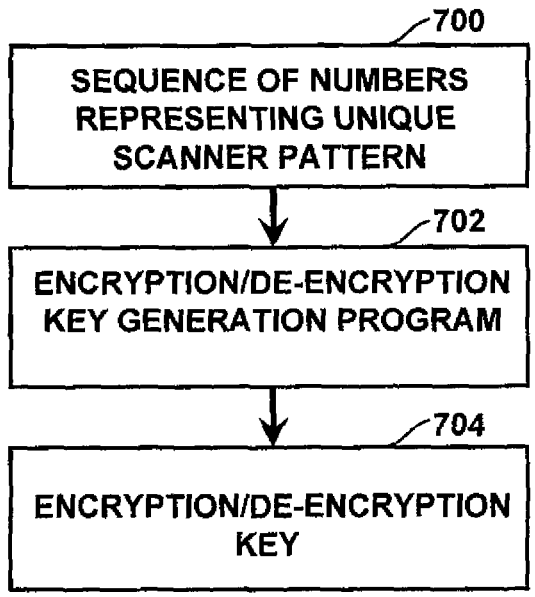
FIG. 20 is a block diagram representing a symmetric-key encryption module.

The encryption/de-encryption module 214 (shown in FIG. 5) configured as a symmetric-key encryption scheme uses the same key to encrypt the transmitted information and to de-encrypt the received information. As shown in FIG. 20, module 214 is configured to include block 700 for receiving the sequence of numbers representing the unique scanner pattern which are then supplied to encryption/de-encryption key generator program at block 702. As will be understood by those of skill in the art, any suitable key generator program can be used for generating the keys including, for example, symmetric key algorithms such as DES (Data Encryption Standard) and AES (Advanced Encryption Standard). The output of key generation program block 702 is encryption/de-encryption key 704 which can be used by the device for, respectively, encrypting information to be transmitted from the device or de-encrypting information that is received by the device. As will be understood by those skilled in the art, key 704 can be provided to recipients before, during or after transmission of the encrypted message by any well-known way or method.

D.6.2 Public-Key Encryption Schemes

Figure 21:
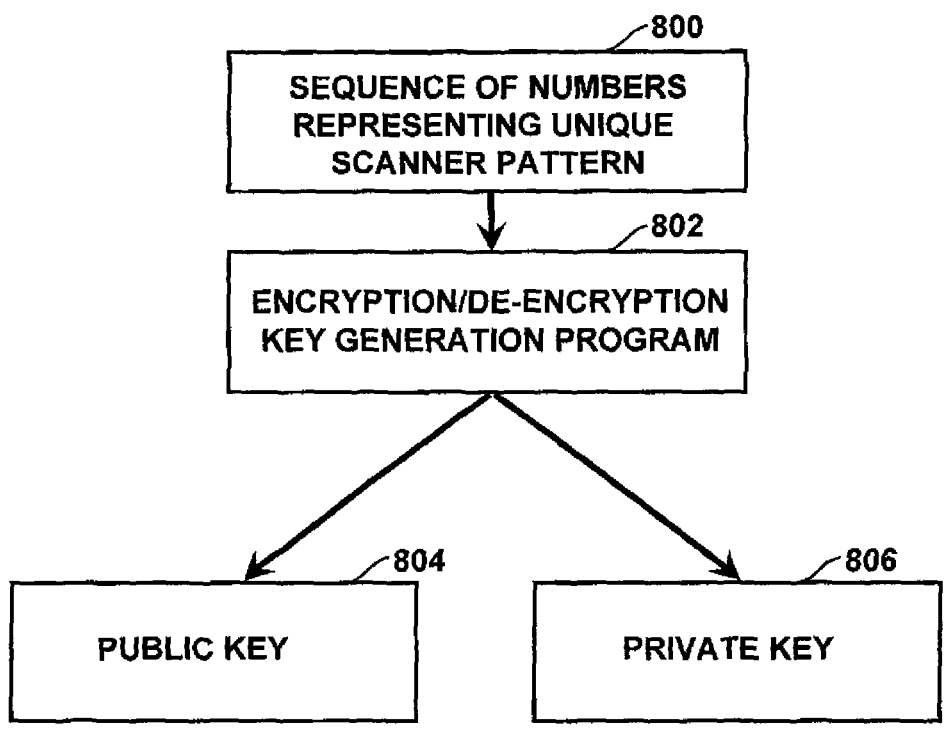
FIGS. 21 and 22 are block diagrams representing a public-key encryption module.
Figure 22:
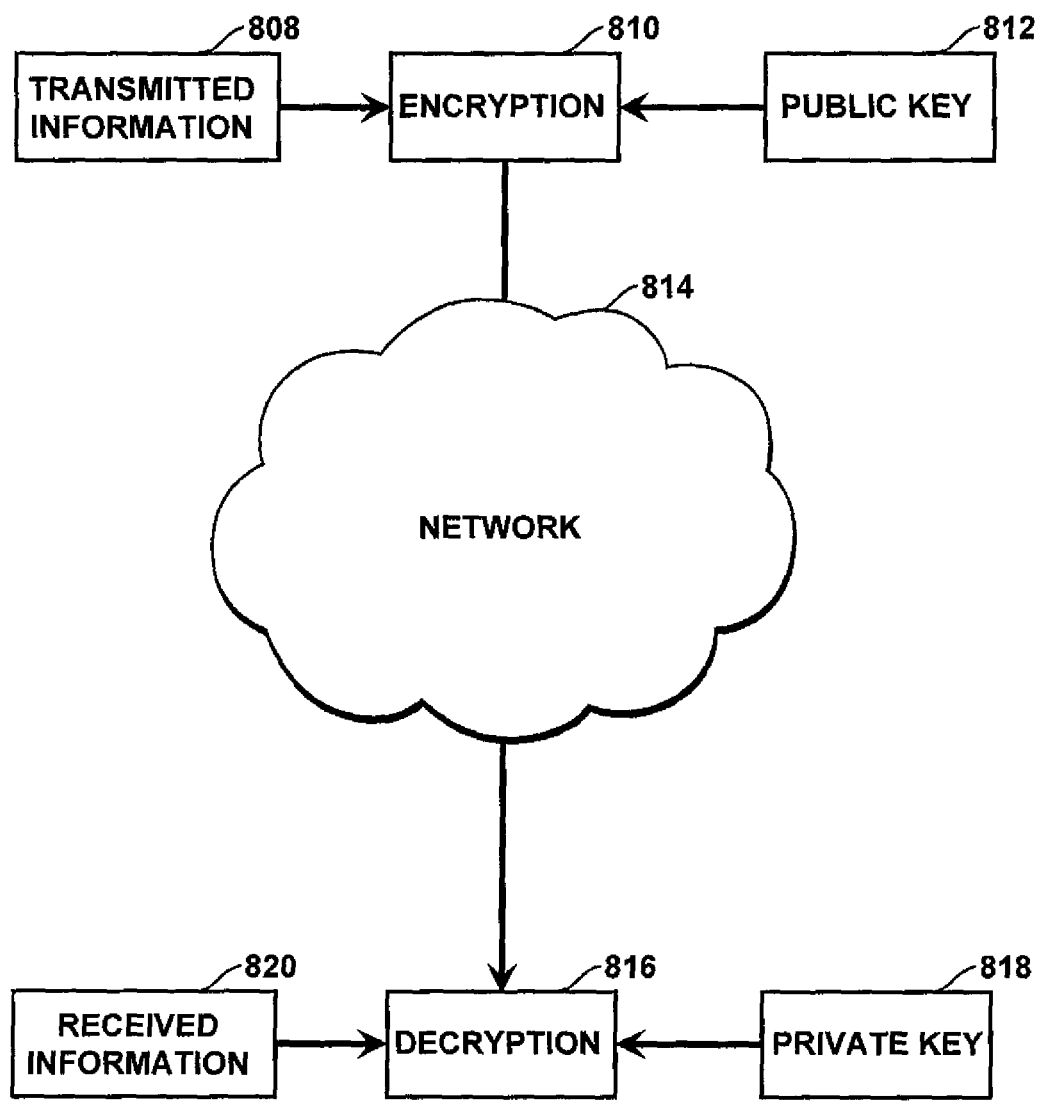

The encryption/de-encryption module 214 (shown in FIG. 5) configured as a public-key encryption scheme uses different keys for encryption and decryption, and the decryption key cannot be feasibly derived from the encryption key. As shown in FIG. 21, module 214 is configured to include block 800 for receiving the sequence of numbers representing the unique scanner pattern which are then applied to an encryption/de-encryption key generator program block 802, which generates public key 804 and private key 806. As will be understood by those of skill in the art, any suitable key generator program can be used for generating the public and private keys including, for example, DSS (Digital Signature Standard) and RSA encryption algorithms, and the public and private keys can be provided at any time by any suitable method to recipients and transmitters of the information to be encrypted. As shown in FIG. 22, information to be transmitted (block 808) is encrypted (block 810) using public key 812. The encrypted information is then transmitted over a wireless or wired network 814 and received by decryption (block 816). Using private key 818 the received information is decrypted as shown in block 820.

D.6.3 Group-Key Encryption Schemes

In group-key encryption schemes, a group key is distributed among a group of users for allowing decryption of a multicast or broadcast message which is solely intended for the users of the group. As in the symmetric-key encryption scheme, the same key is distributed but to a much wider group of users. Accordingly, the group-key can be generated similarly to that shown in FIG. 20 for symmetric-key generation.

The exemplary methods and apparatuses disclosed for authentication and encryption are suited for any system that uses biometric scanners for fingerprints, and especially for systems that operate in uncontrolled (i.e., without human supervision) environments. The methods are particularly suited for portable devices, such as PDAs, cell phones, smart phones, multimedia phones, wireless handheld devices, and generally any mobile devices, including laptops, netbooks, etc., because these devices can be easily stolen, which gives an attacker physical access to them and the opportunity to interfere with the information flow between the fingerprint scanner and the system or transmitted information over wireless or wired networks can be easily intercepted. For example, an attacker may be able to replace the digital image that is acquired with the authentic fingerprint scanner with another digital image, even of the legitimate user, but acquired with unauthentic fingerprint scanner, in order to influence the operation of the authentication algorithms that are running in the system. This possibility exists even in systems that have trusted computing functionality (e.g., equipped with a Trusted Platform Module, TPM, that provides complete control over the software, running in the system) since the attacker needs not modify the software in order to achieve successful authentication; only replacement of the digital image may be sufficient. However, the method and apparatus for bipartite authentication, disclosed herein, provides a mechanism to determine the authenticity of the fingerprint scanner with which the digital image has been acquired and thus detect such an attack. Furthermore, use of the fingerprint scanner to generate an encryption key provides a mechanism for preventing transmitted information from being intercepted and accessed.

While the foregoing written description of the exemplary embodiments of the inventions enables one of ordinary skill in the art to make and use what is considered presently to be the preferred implementation or best mode, those of ordinary skill will understand and appreciate the existence of variations, combinations, and equivalents of the specific implementation methods and apparatuses, and examples described herein. The inventions should therefore not be limited by the above described implementations, including methods, apparatuses, and examples, but by all such implementations within the scope and spirit of the appended claims.

While the technology herein has been described in connection with exemplary illustrative non-limiting implementations, the invention is not to be limited by the disclosure. For example, while exemplary illustrative non-limiting implementations have been described in connection with self-contained biometric scanners, any sort of biometric scanner capable of being connected to a wired and/or wireless network may be used. Although exemplary illustrative non-limiting implementations have been described in connection with the use of fingerprint scanners other types of biometric scanners could be used instead.

What is claimed:

1. A method for encrypting or de-encrypting information transmitted from or received at a device, said method comprising:
   using an electronic processing circuit configured to perform the following,
   acquiring, storing in memory, and processing at least one enrolled image input to an enrolled biometric scanner for comparison to at least one query image subsequently input to a biometric scanner;
   processing said at least one enrolled image and said at least one query image to determine pixel relationships common to both the at least one enrolled image and the at least one query image;
   computing a first sequence of numbers from the processed at least one enrolled image and a second sequence of numbers from the processed at least one query image, wherein the first sequence of numbers contains information which represents the enrolled biometric scanner that acquired said at least one enrolled image and the second sequence numbers contain information which represents the biometric scanner to which said at least one query image was input; and
   using the first sequence of numbers or the second sequence of numbers to generate an encryption key and/or a de-encryption key for processing the information transmitted from or received at said device.

2. The method of claim 1, wherein the enrolled biometric scanner is an enrolled fingerprint scanner, and the biometric scanner is a fingerprint scanner.

3. The method of claim 1, wherein said biometric scanner is a swipe scanner and said processing the at least one enrolled image and the at least one query image includes;
   averaging at least two pixel values of the at least one enrolled image and the at least one query image to compute a vector of pixels;
   filtering said vector of pixels; and
   computing the first and second sequences of numbers from said vector of pixels.

4. The method of claim 3, further including:
   comparing the information of the first sequence of numbers and the information of the second sequence of numbers to determine whether the enrolled biometric scanner and biometric scanner are the same; and
   authenticating said device when it is determined that the enrolled biometric scanner and the biometric scanner are the same.

5. The method of claim 3, wherein a symmetric-key encryption scheme is used, and
   wherein transmitting and receiving devices use the same key for encryption and decryption.

6. The method of claim 3, wherein a public-key encryption scheme is used, and
   wherein each receiving device has a unique private key for decryption derived from the sequence of numbers, and a public key for transmitting information.

7. The method of claim 3, wherein a group-key encryption scheme is used,
   wherein transmitting and receiving devices use the same key for group communications.

8. The method of claim 1, wherein said biometric scanner is an area scanner, and
   wherein said processing the at least one enrolled image and the at least one query images includes:
   using wavelets of said at least one enrolled image and the at least one query image to compute wavelet coefficients;
   performing wavelet reconstruction by setting to zero at the least the low-low (LL)-subband coefficients to compute enrolled residuals and query residuals; and
   computing the first sequence of numbers and the second sequence of numbers from said enrolled and query residuals, respectively.

9. The method of claim 8, further including:
   comparing the information of the first sequence of numbers and the information of the second sequence of numbers to determine whether the enrolled biometric scanner and the biometric scanner are the same; and
   authenticating said device when it is determined that the enrolled biometric scanner and the biometric scanner are the same.

10. The method of claim 8, wherein a symmetric-key encryption scheme is used, and
    wherein transmitting and receiving devices use the same key for encryption and decryption.

11. The method of claim 8, wherein a public-key encryption scheme is used, and
    wherein each receiving device has a unique private key for decryption derived from at least one of the first sequence of numbers or the second sequence of numbers, and a public key for transmitting information.

12. The method of claim 8, wherein a group-key encryption scheme is used, and
    wherein transmitting and receiving devices use the same key for group communications.

13. A system for encrypting or de-encrypting information transmitted from or received at a device, said system comprising:
    means for acquiring, storing in memory, and processing at least one enrolled image input to an enrolled biometric scanner for comparison to at least one query image subsequently input to a biometric scanner;
    means for processing said at least one enrolled image and said at least one query image to determine pixel relationships common to both the at east one enrolled image and the at least one query image;
    means for computing a first sequence of numbers from the processed at least one enrolled image and a second sequence of numbers contains information which represents the enrolled biometric scanner that acquired said at least one enrolled image and the second sequence of numbers contains information which represents the biometric scanner to which said at least one query image was input; and
    means for generating from the first sequence of numbers or the second sequence of numbers an encryption key and/or a de-encryption key for processing the information transmitted from or received at said device.

14. The system of claim 13, wherein the enrolled biometric scanner is an enrolled fingerprint scanner, and the biometric scanner is a fingerprint scanner.

15. The system of claim 13, wherein said biometric scanner is a swipe scanner, and
    wherein said means for processing is configured to:
    average at least two pixel values of said at least one enrolled image and the at east one query image to compute a vector of pixels, filter said vector of pixels, and compute the first and second sequences of numbers from said vector of pixels.

16. The system of claim 15, further including:

means for comparing the information of the first sequence of numbers and the information of the second sequence of numbers to determine whether the enrolled biometric scanner and the biometric scanner are the same; and means for authenticating said device when it is determined that the enrolled biometric scanner and the biometric scanner are the same.

17. The system of claim 15, wherein a symmetric-key encryption scheme is used, and wherein transmitting and receiving devices use the same key for encryption and decryption.

18. The system of claim 15, wherein a public-key encryption scheme is used, and wherein each receiving device has a unique private key for decryption derived from the sequence of numbers, and a public key for transmitting information.

19. The system of claim 15, wherein a group-key encryption scheme is used, and wherein transmitting and receiving devices use the same key for group communications.

20. The system of claim 13, wherein said biometric scanner is an area scanner, and wherein said processing means includes:

means for decomposing said at least one enrolled image and said at least one query image using wavelets to compute wavelet coefficients;

means for performing wavelet reconstruction by setting to zero at the least the low-low (LL)-subband coefficients to compute enrolled residuals and query residuals; and means for computing the first sequence of numbers and the second sequence of numbers from said enrolled and query residuals, respectively.

21. The system of claim 20, further including:

means for comparing the information of the first sequence of numbers and the information of the second sequence of numbers to determine whether the enrolled biometric scanner and the biometric scanner are the same; and means for authenticating said device when it is determined that the enrolled biometric scanner and the biometric scanner are the same.

22. The system of claim 20, wherein a symmetric-key encryption scheme is used, and wherein transmitting and receiving devices use the same key for encryption and decryption.

23. The system of claim 20, wherein a public-key encryption scheme is used, and wherein each receiving device has a unique private key for decryption derived from at least one of the first sequence of numbers or the second sequence of numbers, and a public key for transmitting information.

24. The system of claim 20, wherein a group-key encryption scheme is used, and wherein both-the-transmitting and receiving devices use the same key for group communications.

* * * * *